(12) United States Patent
Cheng et al.

(10) Patent No.: US 8,423,806 B2
(45) Date of Patent: *Apr. 16, 2013

(54) POWER MANAGEMENT SYSTEM CAPABLE OF SAVING POWER AND OPTIMIZING OPERATING EFFICIENCY OF POWER SUPPLIES FOR PROVIDING POWER WITH BACK-UP OR REDUNDANCY TO PLURAL LOADS

(75) Inventors: Bruce C. H. Cheng, Taipei (TW); Chi-Hsing Huang, Taipei (TW); Milan M. Jovanović, Cary, NC (US)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,483

(22) Filed: Jun. 29, 2012

(65) Prior Publication Data

US 2012/0284539 A1 Nov. 8, 2012

Related U.S. Application Data

(63) Continuation of application No. 12/427,192, filed on Apr. 21, 2009, now Pat. No. 8,261,102.

(60) Provisional application No. 61/048,294, filed on Apr. 28, 2008.

(51) Int. Cl.
*G06F 1/00* (2006.01)

(52) U.S. Cl.
USPC ............... 713/300; 713/340; 307/18; 307/29; 307/31; 307/43; 307/52; 307/53

(58) Field of Classification Search .................. 713/300, 713/340; 307/18, 29, 31, 43, 52, 53
See application file for complete search history.

(56) References Cited

U.S. PATENT DOCUMENTS

| | | | |
|---|---|---|---|
| 6,392,901 B1 | 5/2002 | Colver et al. |
| 6,459,171 B1 | 10/2002 | Leifer |
| 6,597,073 B1 | 7/2003 | Check |
| 6,614,133 B2 | 9/2003 | Belson et al. |
| 7,105,950 B2 | 9/2006 | Bernat et al. |
| 7,435,141 B2 | 10/2008 | Tan et al. |
| 7,627,709 B2 | 12/2009 | Bacom et al. |
| 7,679,217 B2 | 3/2010 | Dishman et al. |
| 7,773,385 B2 | 8/2010 | Belady |
| 7,904,734 B1 | 3/2011 | Singla et al. |
| 2003/0080624 A1 | 5/2003 | Belson et al. |
| 2004/0003305 A1 | 1/2004 | Tokunaga |
| 2007/0029979 A1 | 2/2007 | Williams et al. |
| 2007/0114852 A1 | 5/2007 | Lin |

(Continued)

*Primary Examiner* — Jaweed A Abbaszadeh
(74) *Attorney, Agent, or Firm* — Kirton McConkie; Evan R. Witt

(57) ABSTRACT

The present invention relates to a power management system comprising at least one power management subsystem. Each power management subsystem comprises a first power module coupled to a first load and comprising at least one first power supply for supplying power to the first load; a second power module coupled to a second load and comprising at least one second power supply, wherein at least one second power supply is retractably installed in the second power module and selectively coupled to the second load; and a pass-through module comprising at least one pass-through unit retractably installed in the second power module to replace with the at least one second power supply and selectively connecting the first power module to the second load for allowing the first power module to supply power to the second load.

18 Claims, 49 Drawing Sheets

U.S. PATENT DOCUMENTS

| | | |
|---|---|---|
| 2008/0140898 A1 | 6/2008 | Bacom et al. |
| 2008/0176608 A1 | 7/2008 | Budampati et al. |
| 2008/0258556 A1 | 10/2008 | Ewing et al. |
| 2009/0167089 A1 | 7/2009 | Dishman et al. |
| 2009/0254768 A1 | 10/2009 | Livescu et al. |
| 2010/0097044 A1 | 4/2010 | Gipson |
| 2010/0164292 A1 | 7/2010 | Freeman et al. |

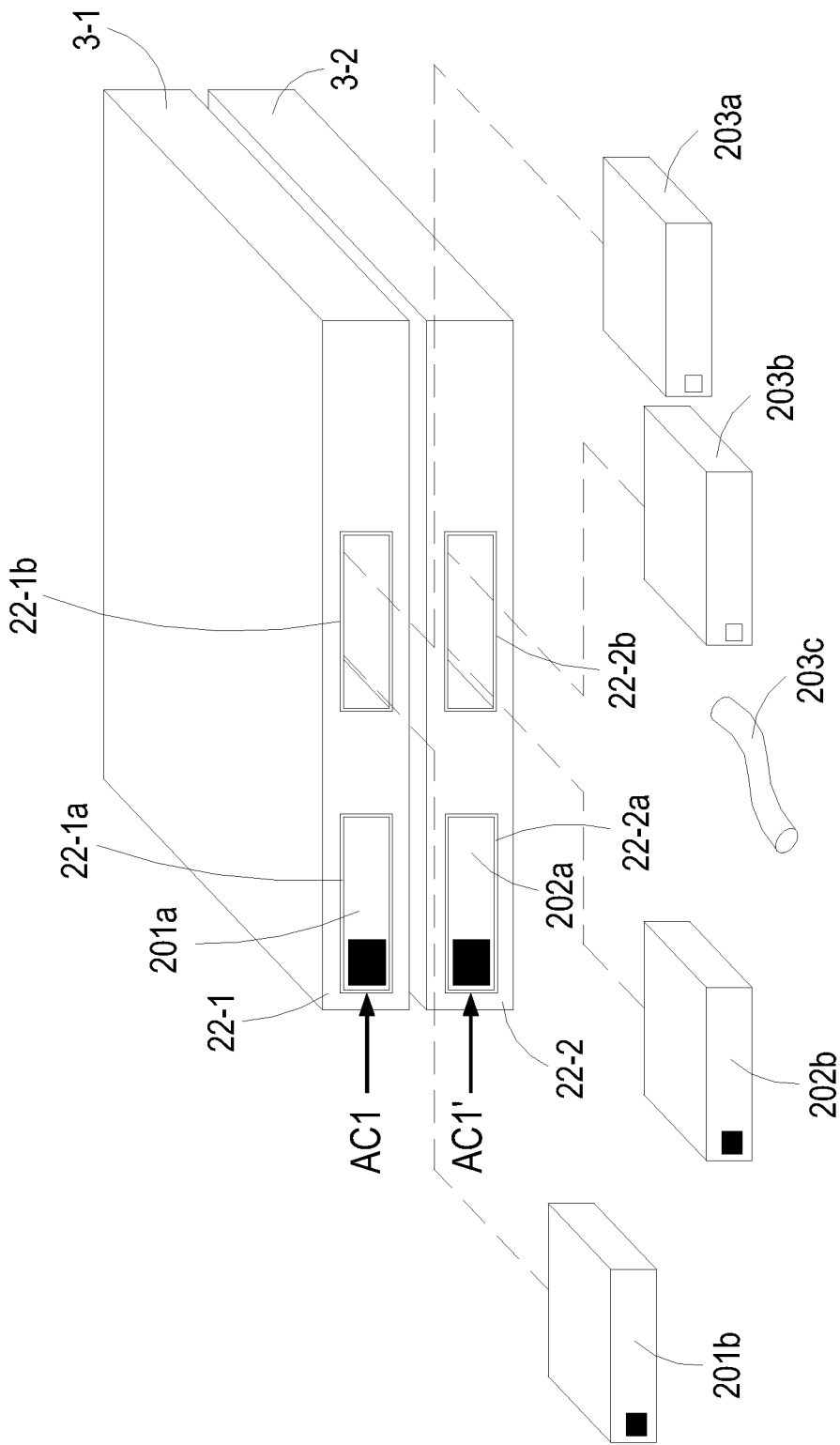

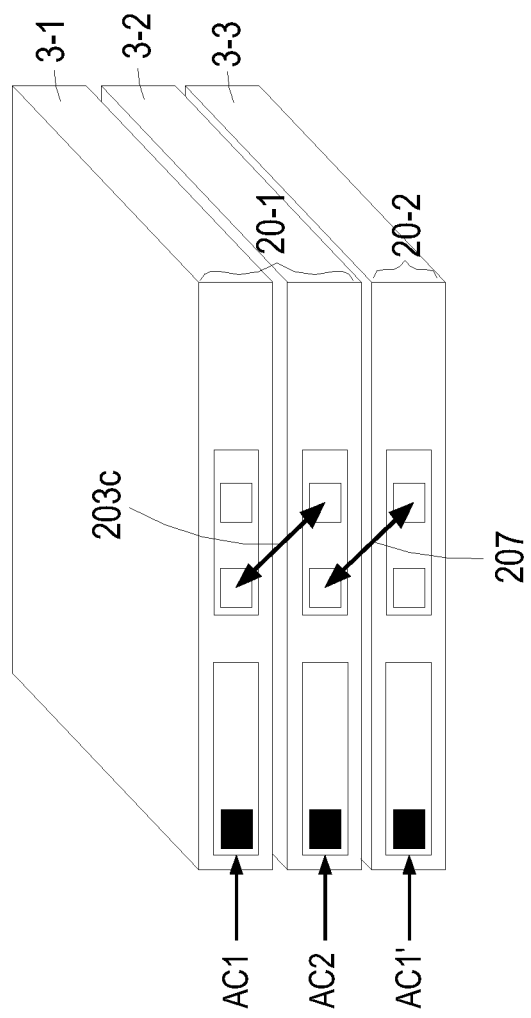

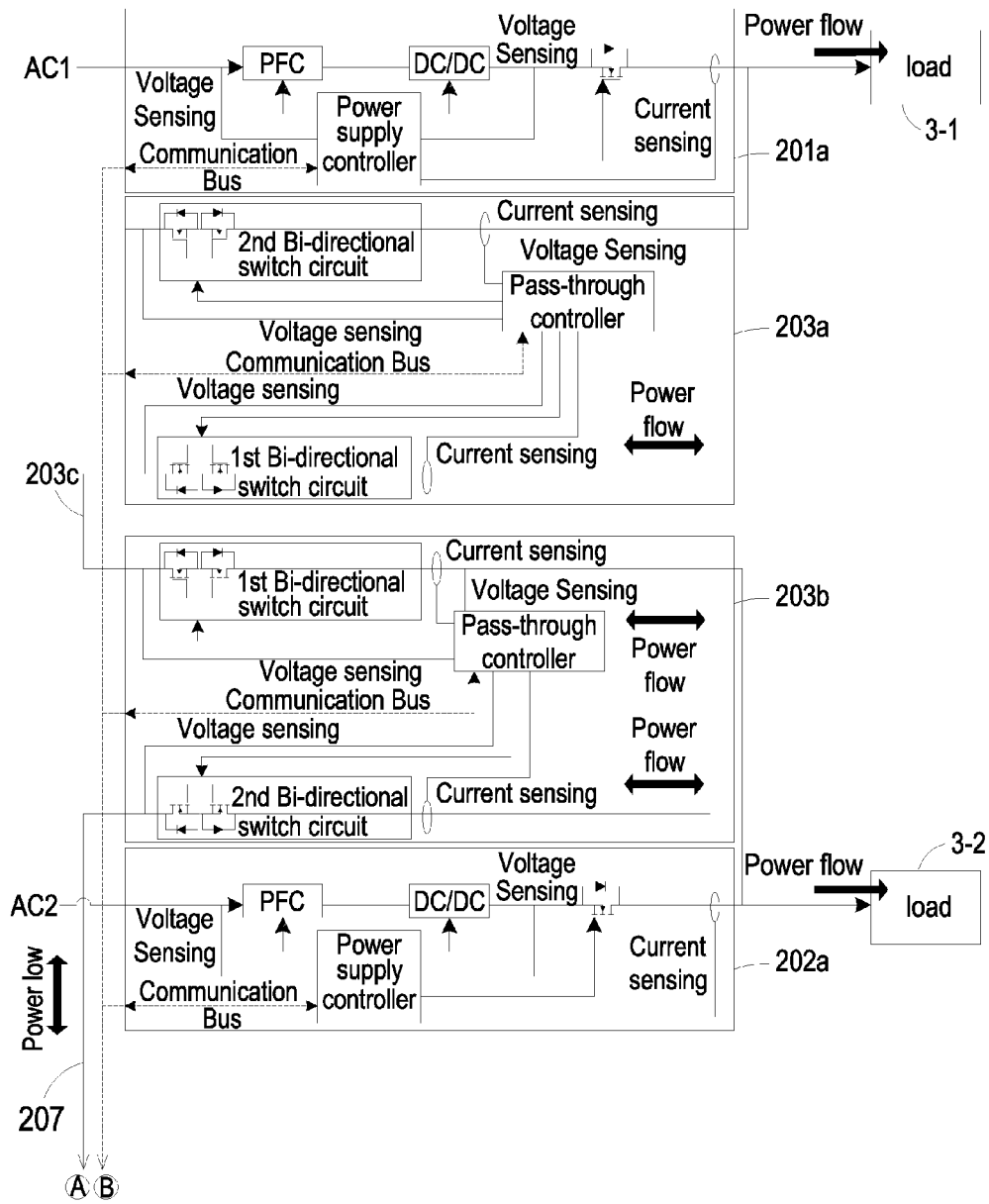
FIG. 10B(1/2)

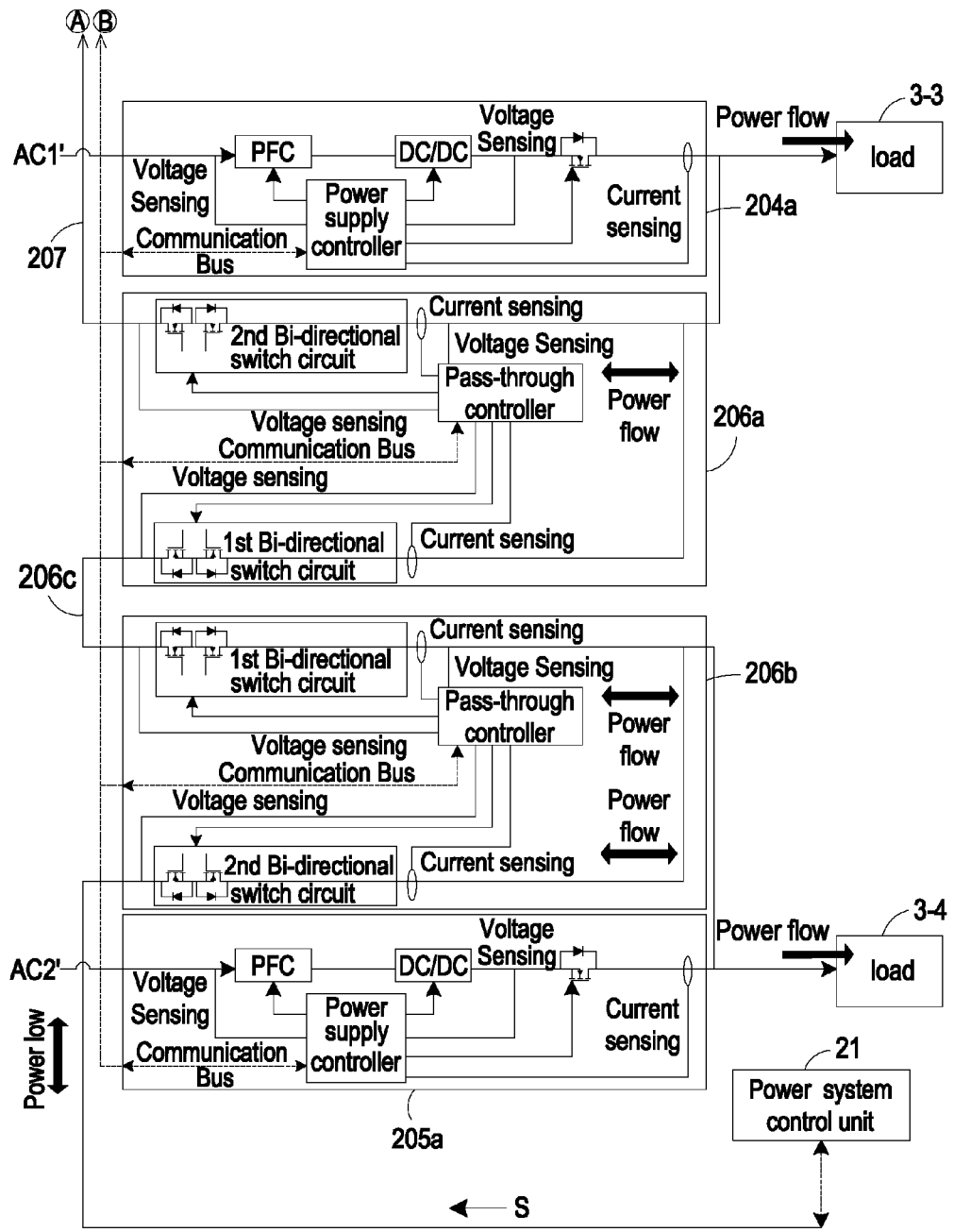
FIG. 10B(2/2)

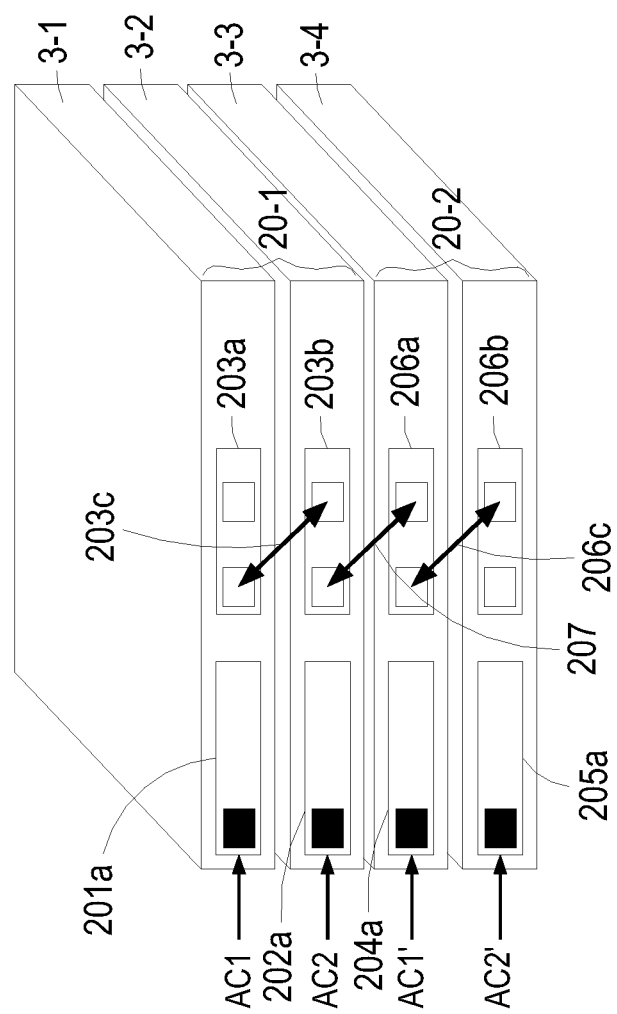

POWER MANAGEMENT SYSTEM CAPABLE OF SAVING POWER AND OPTIMIZING OPERATING EFFICIENCY OF POWER SUPPLIES FOR PROVIDING POWER WITH BACK-UP OR REDUNDANCY TO PLURAL LOADS

CROSS-REFERENCE TO RELATED APPLICATIONS

This application is a continuation of U.S. application Ser. No. 12/427,192, filed Apr. 21, 2009, entitled, "Power Management System Capable of Saving Power and Optimizing Operating Efficiency for Power Supplies for Providing Power with Back-up or Redundancy to Plural Loads," which application claims the benefit of U.S. Provisional Application No. 61/048,294, filed Apr. 28, 2008, entitled "Power Management System Capable of Saving Power and Optimizing Operating Efficiency of Power Supplies for Providing Power with Back-up or Redundancy to Plural Loads."

FIELD OF THE INVENTION

The present invention relates to a power management system of power supplies for providing power to a plurality of loads, and more particularly to a power management system capable of saving power and optimizing operating efficiency of power supplies for supplying power with back-up or redundancy to a plurality of loads, such as servers, computer systems, telecom equipments, etc.

BACKGROUND OF THE INVENTION

All electronic components consume some energy to provide their functions. Operating efficiency is a key measure of interest, as this directly impacts operating costs. For AC to DC power supplies, efficiency is a comparison of input power consumed versus output power produced. A power supply requiring 100 watts of AC input power to produce 90 watts of DC output is considered 90% efficient. The more efficient the power supplies are, the less it costs to operate them.

The operating efficiency of the power supply, such as Switched Mode Rectifier (SMR), varies with output load. The "sweet spot" where the power supplies operate most economically usually occurs with output load levels between 50% and 70% of rated capacity. Provisioning guidelines for power equipment often utilize worst-case scenarios that can cause the power plant to be underutilized in daily operation. Operating power supplies at very low output power levels can decrease the efficiency, therefore increasing operating costs.

In addition, it is widely recognized in the world of Data Centers that servers are typically operated at less than 25% of the rated power supplies used in these servers. It is also well known that power supplies are not at its best efficiency when operating at 25% of their rated power. Today's power supplies are most efficient when operate approximately between 40% and 80% of their rated load.

When a server is designed, a power budget is created. The power budget includes the worst case power consumptions for all components from all approved component suppliers. For example, a 2 Gb memory stick from supplier A might draw 6 W. A similar 2 Gb one from supplier B might draw 8 W. That is 25% difference in power consumption. Similar conditions exist for Hard Drives, PCI cards as well as individual components on the server Mother Board.

The power budget would have to include the highest power consumption to assure sufficient power availability for the servers. There are components that are not yet available at the time of design but might be available during the life of the servers for upgrading purposes. Examples are the servers might be designed with 2 GHz with 1000 MHz Front-Side-Bus today, but it must accommodate a future upgrade to 2.2 GHz with 1333 MHz FSB a year down the road. The power budget must account for future upgrade for sufficient power availability.

These servers are general purposes servers which designed to serve a wide range of users from extreme computing extensive applications to lesser computing data bases. The servers may have been designed to accommodate 2 processor sockets of various speeds, 12 slots for memory sticks of up to 4 Gb each, 6 slots for hard drives of up to 250 Gb each and 4 slots for PCI cards for up to 25 W per card.

Only a small percentage of users are capable of taking advantages of these fully load servers. Typical servers might only use half of the available memory slots, hard drive slots or that of PCI slots. Typical servers might use 2 Gb or less memory sticks instead of the 4 Gb ones, 160 Gb or less hard drives instead of 250 Gb ones, or 12 W PCI cards instead of the 25 W cards.

A plurality of power supplies might be designed for providing power to multiple servers that have different loading capability. The power supplies might also be designed for multiple server generations. Many servers naturally are well under-utilizing their power availability. All of this adds up to the typical servers draw less than 50% of the available power from their rated power supplies.

In addition to the under-utilizing, many Data Centers also uses power supply redundancy as a mean to guard against possible power supply failures or loss of facility power. Please refer to FIG. 1. Power supply redundancy is the use of two power supplies 11, 12 in the same server 1a to provide reliability. Each power supply 11, 12 is hot-swappable in the same server 1a. Each power supply 11, 12 is capable of supplying power to the server 1a on its own. In the event of one power supply 11, 12 fails or one input voltage from facility AC1, AC2 is loss, the remaining power supply 11, 12 with its remaining input voltage from facility AC1, AC2 will keep the server 1a operating while the failed power supply 11, 12 can be replaced or the input voltage from facility AC1, AC2 can be restored. As shown in FIG. 1, the use of power supply redundancy brings the operating of the power supply 11, 12 to less than 25% from less than 50% of its rated power capability as power supply 10.

FIG. 2 shows typical power efficiency profile of power supply with respect to delivered power. At 25% load the power supply efficiency is at 85% as compared to its efficiency of 89% at 50% load.

FIGS. 3A and 3B show two similar servers operating side by side with redundancy power supplies. With servers 1b, 1c operate at less than 50% of the rated power supplies, and the power supplies 13, 14, 15, 16 themselves operate at less than 25% of their own rated capability. Operating power supplies at very low output power levels can decrease the efficiency, therefore increasing operating costs.

It is desired to develop a power management system capable of saving power and optimizing operating efficiency of the power supplies for providing power with back-up or redundancy to plural loads, such as servers, computer systems, telecom equipments, etc.

SUMMARY OF THE INVENTION

It is an object of the present invention to provide a power management system capable of saving power and optimizing operating efficiency of power supplies for providing power with back-up or redundancy to plural loads, such as servers, computer systems, telecom equipments, etc.

A further object of the present invention is to provide a power management system capable of distributing power delivered from at least one of plural power supplies to plural loads so as to provide reliability, provide desired efficiency of the power supplies and save cost.

A still object of the present invention is to provide a method to combine server loads, creating a power sharing network, to bring their combined loads from the typical less than 25% into the more efficient load range of for example 50%.

In accordance with a first aspect of the present invention, there is provided a power management system comprising at least one power management subsystem. Each power management subsystem comprises: a first power module coupled to a first load and comprising at least one first power supply for supplying power to the first load; a second power module coupled to a second load and comprising at least one second power supply, wherein at least one second power supply is retractably installed in the second power module and selectively coupled to the second load; and a pass-through module comprising at least one pass-through unit retractably installed in the second power module to replace with the at least one second power supply and selectively connecting the first power module to the second load for allowing the first power module to supply power to the second load.

In accordance with a second aspect of the present invention, there is provided a power management system comprising: a power management subsystem comprising two power modules and a pass-through module, each power module comprising at least one power supply, the pass-through module electrically coupled between two output terminals of two power modules for providing a uni-directional or bi-directional conducting path in response to a control signal; and a power system control unit coupled to the pass-through module for providing the control signal to the pass-through module and controlling the operations of turn on and turn off and the power delivery directions of the pass-through module so as to enhance the power efficiency of the power management subsystem.

In accordance with a third aspect of the present invention, there is provided a power management system comprising: a first power management subsystem, the first power management subsystem comprising two power modules and a first pass-through module, each power modules comprising at least one power supply, the first pass-through module electrically coupled between two output terminals of the two power modules for providing a uni-directional or bi-directional conducting path in response to a control signal; a second power management subsystem, the second power management subsystem comprising at least one power module and a second pass-through module, each power module comprising at least one power supply, the second pass-through module electrically coupled to the power module and the first pass-through module of the first power management subsystem for providing a uni-directional or bi-directional conducting path in response to the control signal; and a power system control unit coupled to the first and second pass-through modules of the first and second power management subsystems for providing the control signal to the first and second pass-through modules and controlling the operations of turn on and turn off and the power delivery directions of the first and second pass-through modules so as to enhance the power efficiency of the power management system.

In accordance with a fourth aspect of the present invention, there is provided a power management system. The power management system comprises: a plurality of loads; at least one power module, wherein each power module comprises at least one power supply and is coupled to one of the loads for providing power to the load; and a pass-through module comprising at least one pass-through unit, wherein the pass-through unit is selectively connecting the power module to at least one of the other loads for allowing the power module to supply power to the at least one of the other loads and adding or conditioning the output of the power module to provide an desired efficiency of the power module.

The above contents of the present invention will become more readily apparent to those ordinarily skilled in the art after reviewing the following detailed description and accompanying drawings, in which:

BRIEF DESCRIPTION OF THE DRAWINGS

FIGS. 7D and 7E structurally illustrate a power management system of FIGS. 7A and 7B;

FIG. 9C structurally illustrates a power management system of FIG. 9A;

FIG. 10B partially shows a circuit block diagram of FIG. 10A;

FIG. 10C structurally illustrates a power management system of FIG. 10A;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 4A:
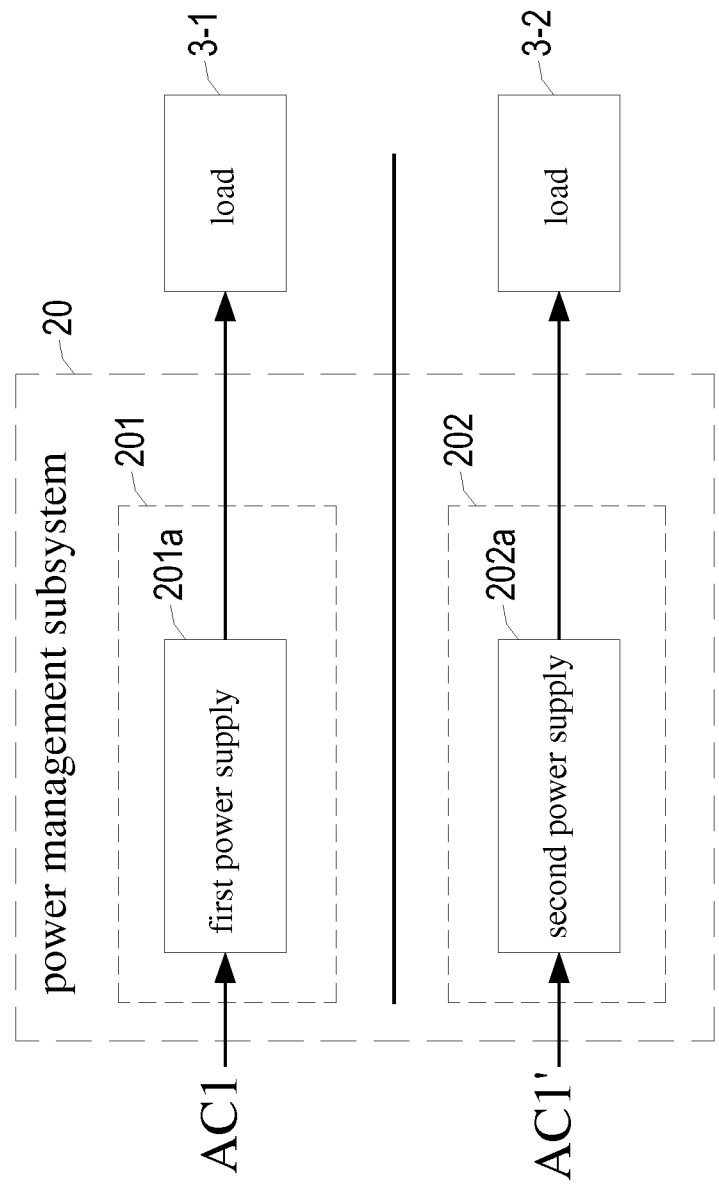
FIGS. 4A and 4B schematically illustrate a power management system capable of saving power and optimizing operating efficiency of power supplies for providing power with back-up or redundancy to plural loads according to a first preferred embodiment of the present invention.
Figure 4B:
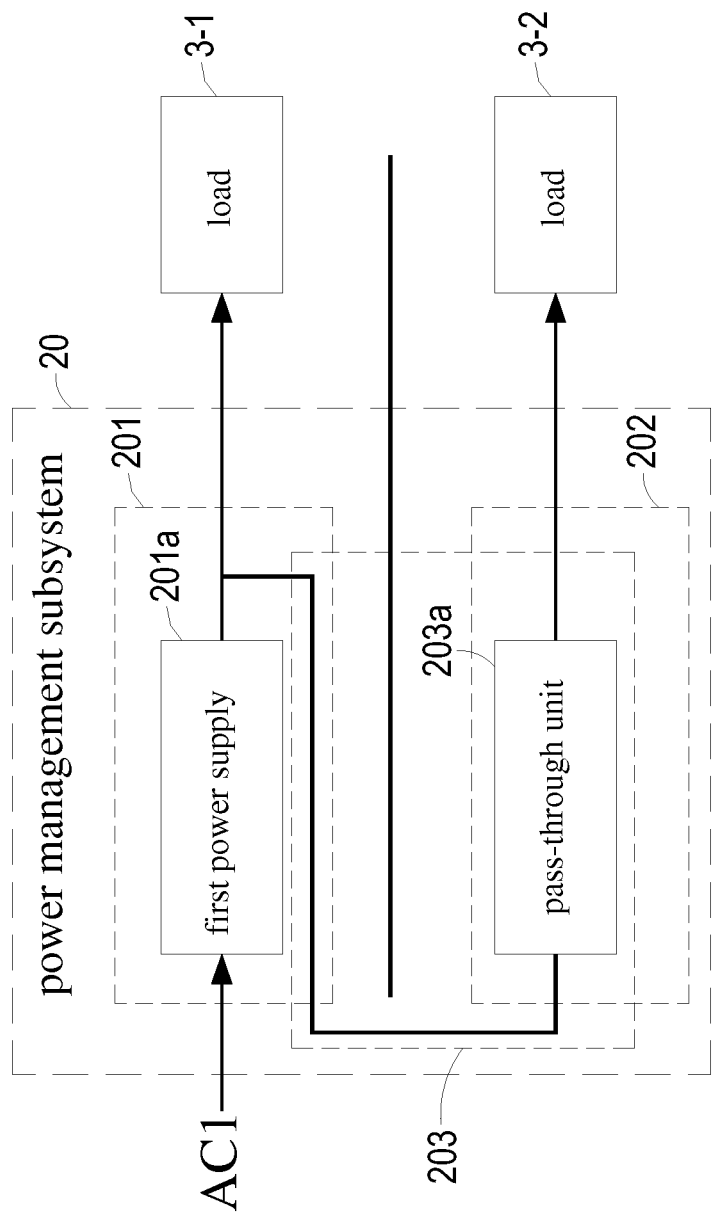

FIGS. 4A and 4B schematically illustrate a power management system capable of saving power and optimizing operating efficiency of power supplies for providing power with back-up or redundancy to plural loads according to a first preferred embodiment of the present invention. As shown in FIGS. 4A and 4B, the power management system 2 comprises at least one power management subsystem 20 and a plurality of loads, such as device circuits of servers, computer systems or telecom equipments. The power management subsystem 20 comprises a first power module 201, a second power module 202 and a pass-through module 203. The first power module 201 is coupled to a first load 3-1 and comprises one or more first power supply 201a for supplying power to the first load 3-1. The second power module 202 is coupled to a second load 3-2 and comprises one or more second power supply 202a. The one or more second power supply 202a is retractably installed in the second power module 202 and selectively coupled to the second load 3-2. The pass-through module 203 comprises one or more pass-through unit 203a retractably installed in the second power module 202 to replace with the one or more second power supply 202a and selectively connecting the first power module 201 to the second load 3-2 for allowing the first power module 201 to supply power to the second load 3-2 therethrough. Namely, the power management system 2 comprises a plurality of loads such as first load 3-1 and second load 3-2, at least one power module such as first power module 201, and a pass-through module 203. The first power module 201 comprises at least one first power supply 201a and coupled to the first load 3-1 for providing power to the first load 3-1. The pass-through module 203 comprises at least one pass-through unit 203a. The pass-through unit 203a is selectively connecting the first power module 201 to the other load such as the second load 3-2 for allowing the first power module 201 to supply power to the second load 3-2 and adding or conditioning the output of the first power module 201 to provide desired efficiency of the first power module 201.

Figure 5A:
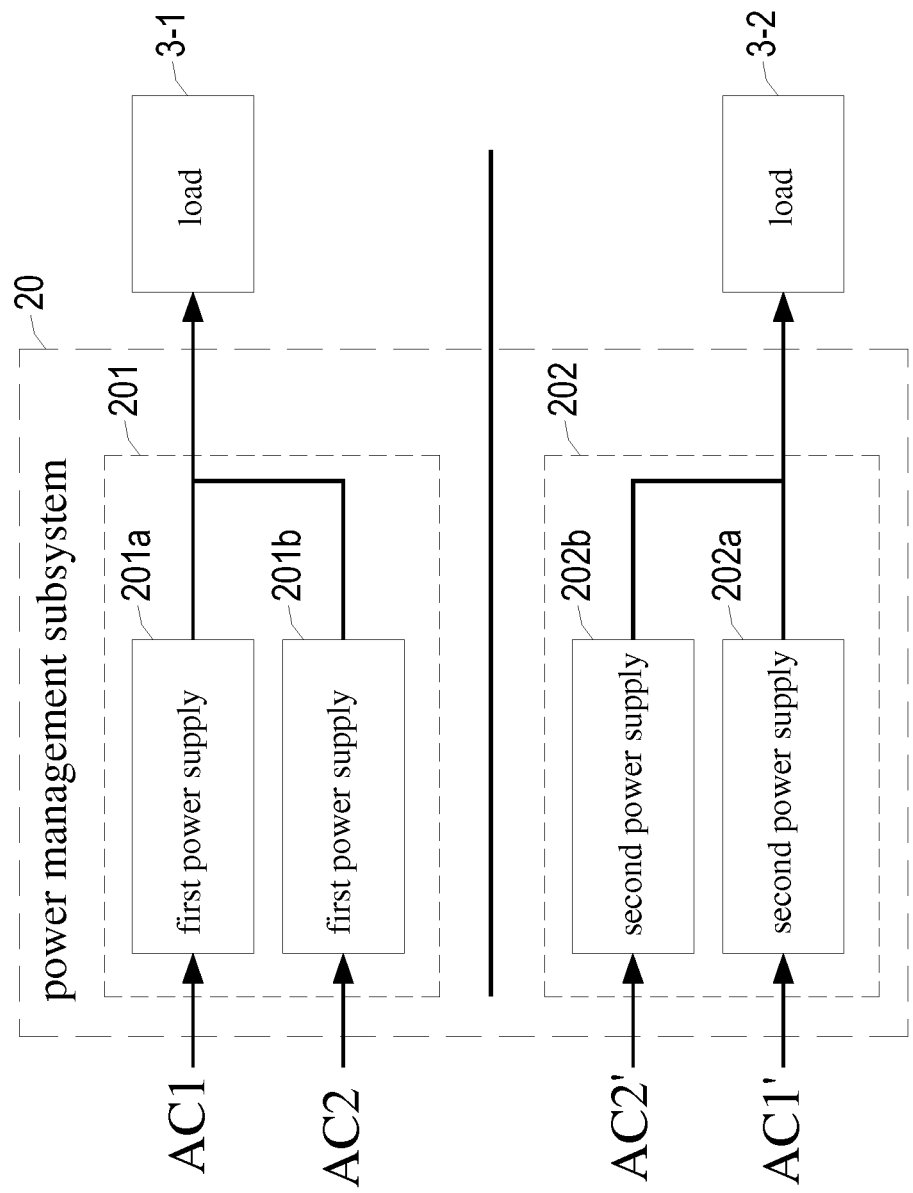
FIGS. 5A and 5B schematically illustrate a power management system capable of saving power and optimizing operating efficiency of power supplies for providing power with back-up or redundancy to plural loads according to a second preferred embodiment of the present invention.
Figure 5B:
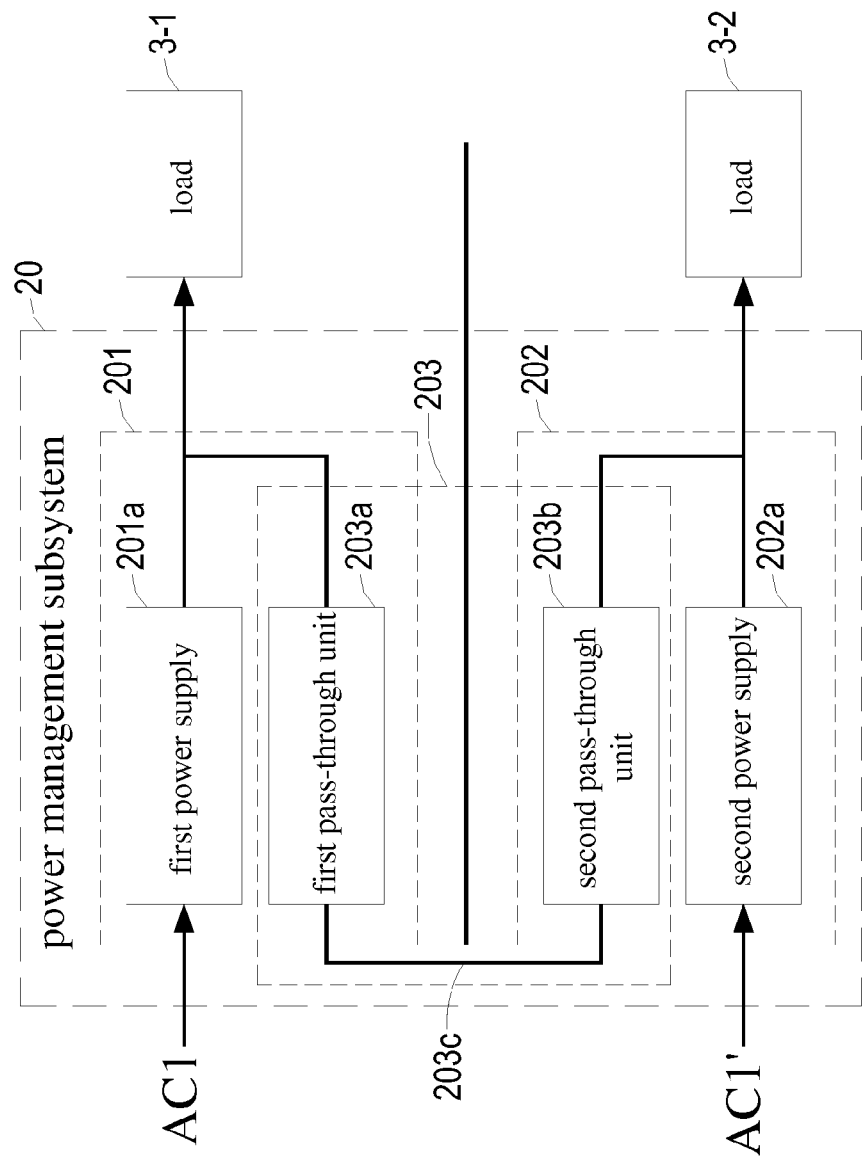

FIGS. 5A and 5B schematically illustrate a power management system capable of saving power and optimizing operating efficiency of power supplies for providing power with back-up or redundancy to plural loads according to a second preferred embodiment of the present invention. As shown in FIGS. 5A and 5B, the power management system 2 comprises at least one power management subsystem 20 and a plurality of loads, such as device circuits of servers, computer systems or telecom equipments. The power management subsystem 20 comprises a first power module 201, a second power module 202 and a pass-through module 203. The output terminal of the first power module 201 is coupled to a first load 3-1 and the first power module 201 comprises plural first power supplies 201a, 201b, wherein the output terminals of the plural first power supplies 201a, 201b are coupled together and further connecting to the first load 3-1. Each of the first power supplies 201a, 201b is retractably installed in the first power module 201 and selectively coupled to the first load 3-1. The output terminal of the second power module 202 is coupled to a second load 3-2 and the second power module 202 comprises plural second power supplies 202a, 202b. Each of the second power supplies 202a, 202b is retractably installed in the second power module 202 and selectively coupled to the second load 3-2. The pass-through module 203 comprises a first pass-through unit 203a and a second pass-through unit 203b. The first pass-through unit 203a is coupled to the second pass-through unit 203b via a power cable 203c. The first pass-through unit 203a is retractably installed in the first power module 201 to replace with one first power supply 201b as shown in FIG. 5A and selectively connecting the second power module 202 to the first load 3-1 for allowing the second power module 202 to supply power to the first load 3-1 via the pass-through module 203. The second pass-through unit 203b is retractably installed in the second power module 202 to replace with one second power supply 202b as shown in FIG. 5A and selectively connecting the first power module 201 to the second load 3-2 for allowing the first power module 201 to supply power to the second load 3-2.

In an embodiment, the first power supply 201a of the first power module 201 and the second power supply 202a of the second power module 202 have power supply controllers for communicating with each other via a communication bus (not shown). The power supply controllers of the first power supply 201a and the second power supply 202a can obtain the information about the load conditions, the input voltage and the output voltage of the power supplies so that the power supply controllers can control the operations of the first power supply 201a and the second power supply 202a according to the obtained information and allow the first power module 201 to supply power to the second load 3-2 via the pass-through module 203 and add or condition the output of the first power module 201 to provide desired efficiency of the first power module 201 or allow the second power module 202 to supply power to the first load 3-1 via the pass-through module 203 and add or condition the output of the second power module 202 to provide desired efficiency of the second power module 202.

Figure 6:
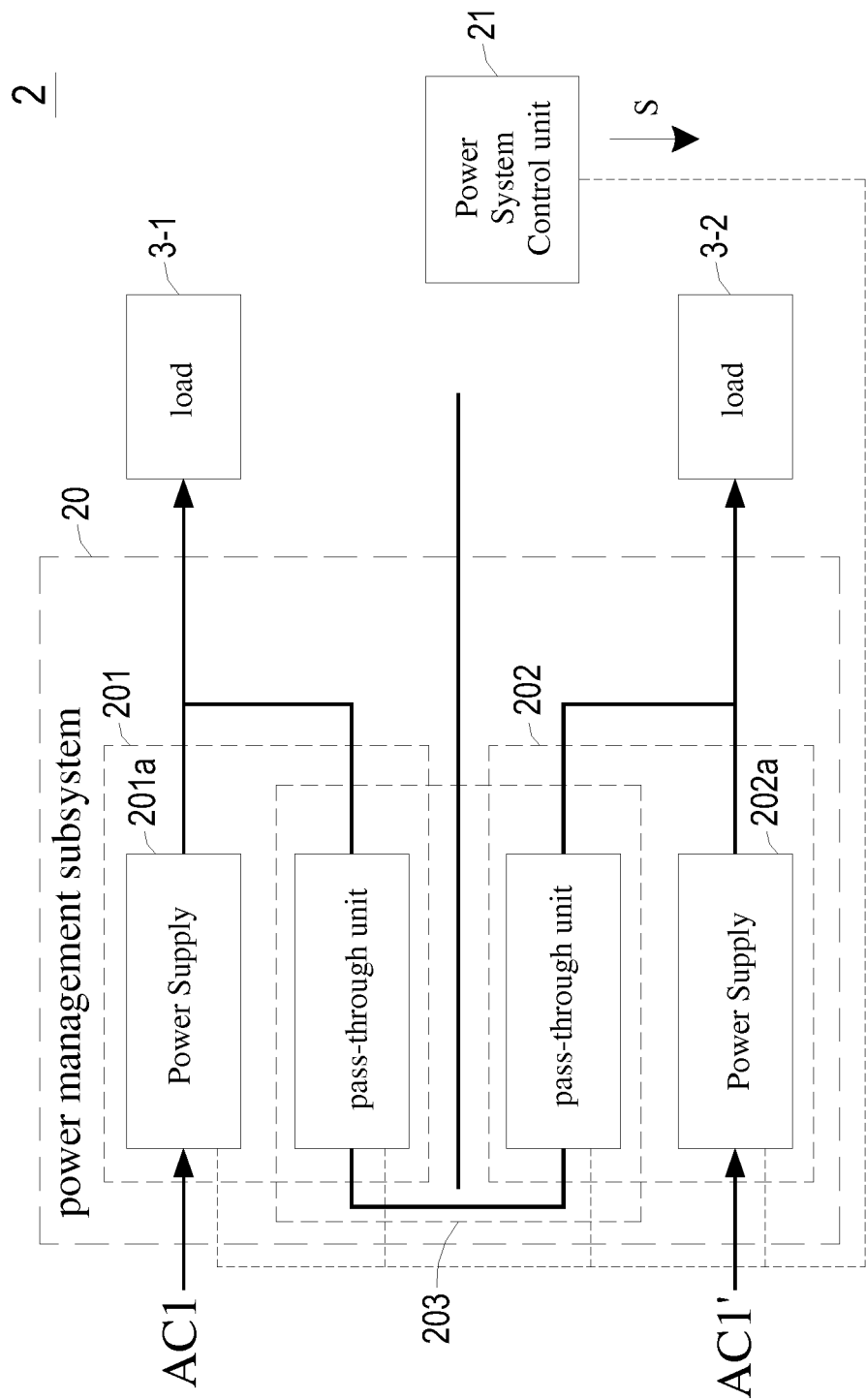
FIG. 6 schematically illustrates a power management system capable of saving power and optimizing operating efficiency of power supplies for providing power with back-up or redundancy to plural loads according to a third preferred embodiment of the present invention.

FIG. 6 schematically illustrates a power management system capable of saving power and optimizing operating efficiency of power supplies for providing power with back-up or redundancy to plural loads according to a third preferred embodiment of the present invention. As shown in FIG. 6, the power management system 2 includes at least one power management subsystem 20, a power system control unit 21 and a plurality of loads. The power management subsystem 20 includes two power modules such as first power module 201 and second power module 202, and a pass-through module 203 (PTM). Each of the first power module 201 and the second power module 202 includes at least one power supply 201a, 202a, and the pass-through module 203 is electrically coupled between the output terminals of the first power module 201 and the second power modules 202 for providing an uni-directional or bi-directional conducting path in response to a control signal S. The power system control unit 21 is coupled to the pass-through module 203 for providing the control signal S to the pass-through module 203 and controlling the operations of turn on and turn off and the power delivery directions of the pass-through module 203 so as to enhance the power efficiency of the power management subsystem 20 and provide reliability.

When the power supplies 201a and 202a of two power modules 201, 202 are normal and their input voltages are normally provided from external power sources AC1 and AC1' (AC1 and AC1' can be same or different power source), the power system control unit 21 receives the information from the power supplies 201a, 202a and the information from the pass-through module 203 and issue a control signal S to the pass-through module 203 and the power supplies 201a, 202a to turn off the pass-through module 203, allow the power supply 201a of the first power module 201 to supply power to the first load 3-1 and allow the power supply 202a of the second power module 202 to supply power to the second load 3-2, respectively. Namely, the first load 3-1 is powered by the power supply 201a of the first power module 201, the second load 3-2 is powered by the power supply 202a of the second power module 202 and the pass-through module 203 is turned off. Therefore, each power supply 201a, 202a now operates at server's load of near 50% rated power supply which has 4% higher efficiency than stand alone server.

In addition, power redundancy for each load is preserved. In the event either one of the power supplies 201a, 202a fails or its input voltage from facility AC1, AC1' is lost, the remaining power supply 201a, 202a will be able to continue supporting both loads 3-1, 3-2 until the failed power supply 201a, 202a is serviced or the lost input voltage from facility AC1, AC1' is restored. For example, when the power supply 201a of the first power module 201 fails and/or its input voltage from facility AC1 is lost, the power system control unit 21 receives the information from the power supplies 201a, 202a and the information from the pass-through module 203 and issue a control signal S to the pass-through module 203 and the power supplies 201a, 202a to control the power delivery directions of the pass-through module 203 so that the power delivered form the output terminal of the power supply 202a can pass through the pass-through module 203 and flow toward the first load 3-1 so as to provide power to the first load 3-1 and enhance the efficiency of the power supply 202a. Therefore, the power supply 202a of the second power module 202 will be able to continue supporting both loads 3-1, 3-2 until the failed power supply 201a of the first power module 201 is serviced or the lost input voltage from facility AC 1 is restored.

When the power supply 202a of the second power module 202 fails and/or its input voltage from facility AC1' is lost, the power system control unit 21 receives the information from the power supplies 201a, 202a and the information from the pass-through module 203 and issue a control signal S to the pass-through module 203 and the power supplies 201a, 202a to control the power delivery directions of the pass-through module 203 so that the power delivered form the output terminal of the power supply 201a of the first power module 201 can pass through the pass-through module 203 and flow toward the second load 3-2 so as to provide power to the second load 3-2 and enhance the power efficiency of the power supply 201a. Therefore, the power supply 201a of the first power module 201 will be able to continue supporting both loads 3-1, 3-2 until the failed power supply 202a of the second power module 202 is serviced or the lost input voltage from facility AC1' is restored.

Even pass-through module 203 fails, with mechanism to disconnect itself from the power supply outputs, each load will continue to be supported by its own power supply 201a, 202a. It expects to reduce system cost and improve system reliability. The pass-through module 203 is expected to be simpler to design and lower cost due to its non-power processing function comparing with a power supply.

Figure 7A:
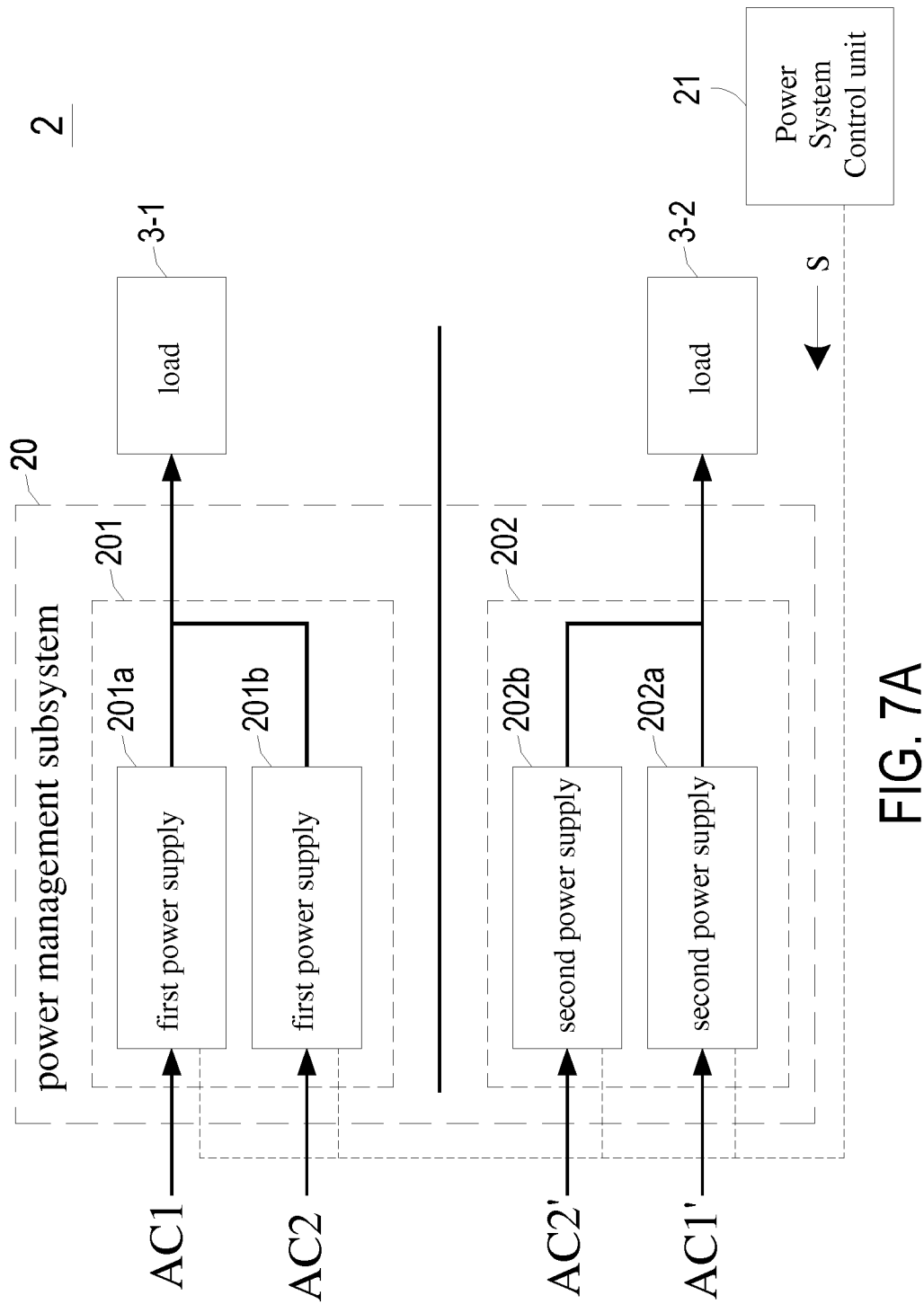
FIGS. 7A and 7B schematically illustrate a power management system capable of saving power and optimizing operating efficiency of power supplies for providing power with back-up or redundancy to plural loads according to a fourth preferred embodiment of the present invention.
Figure 7B:
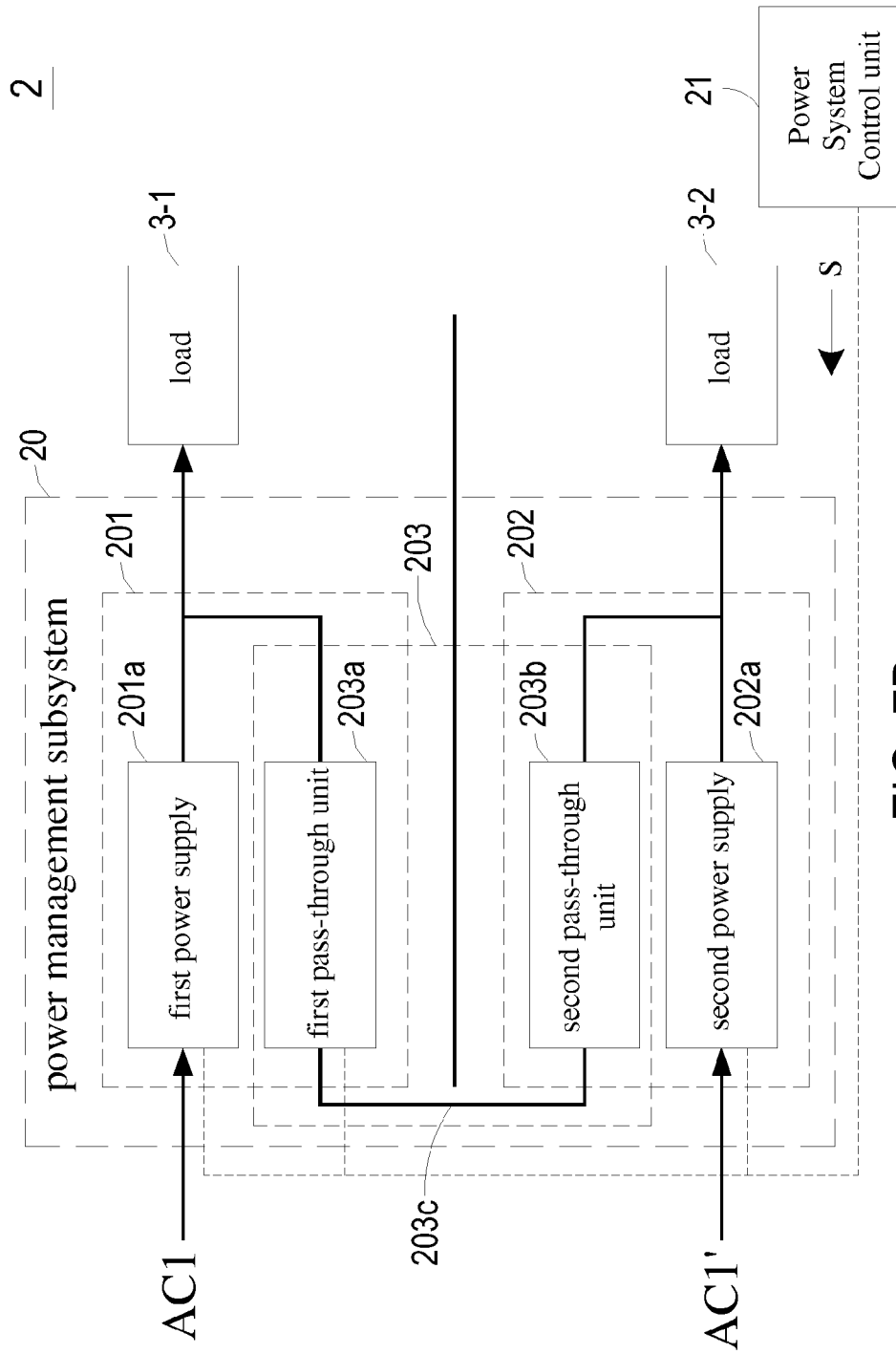
Figure 7C:
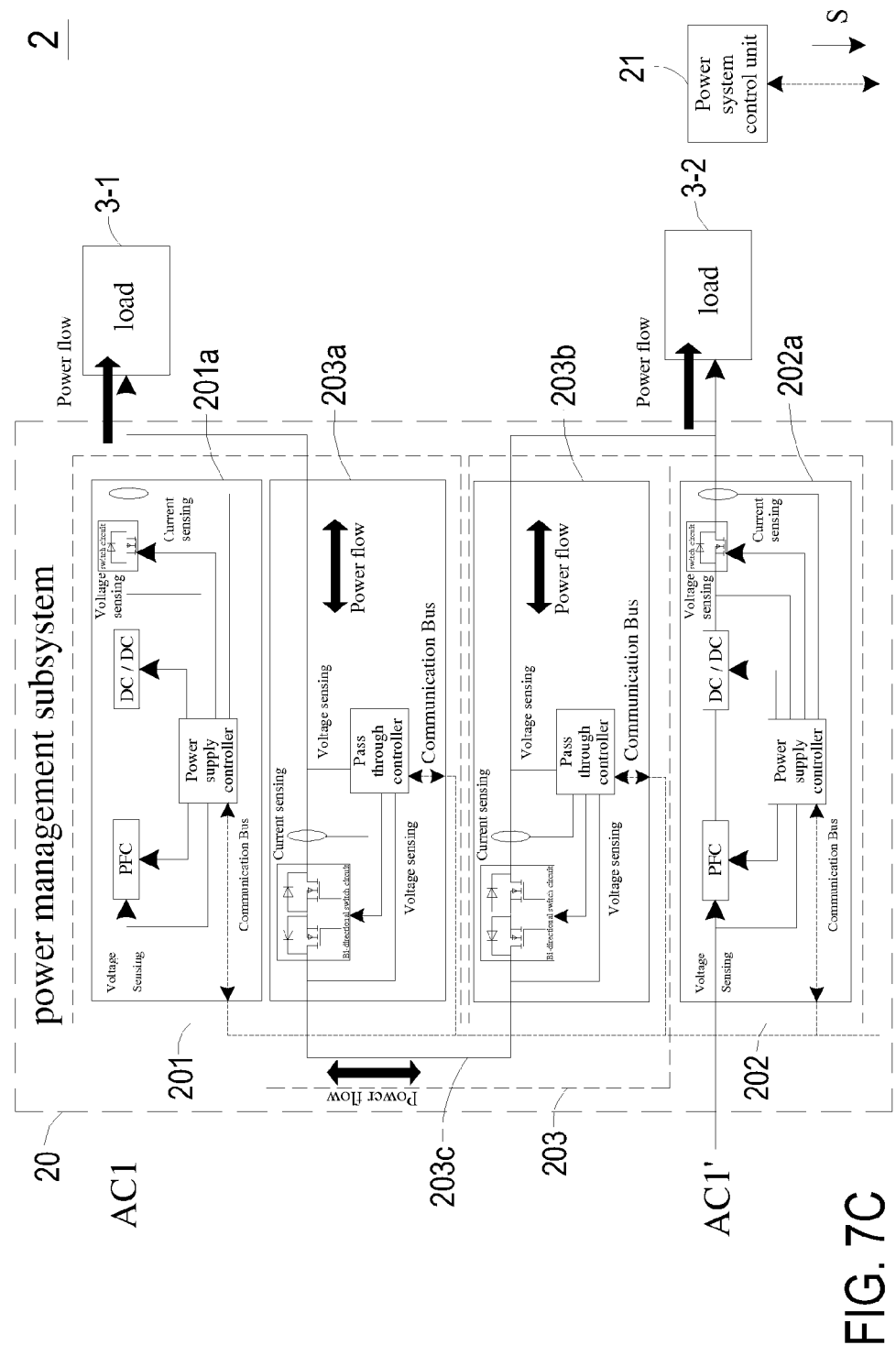
FIG. 7C shows a circuit block diagram of FIG. 7B.
Figure 7D:
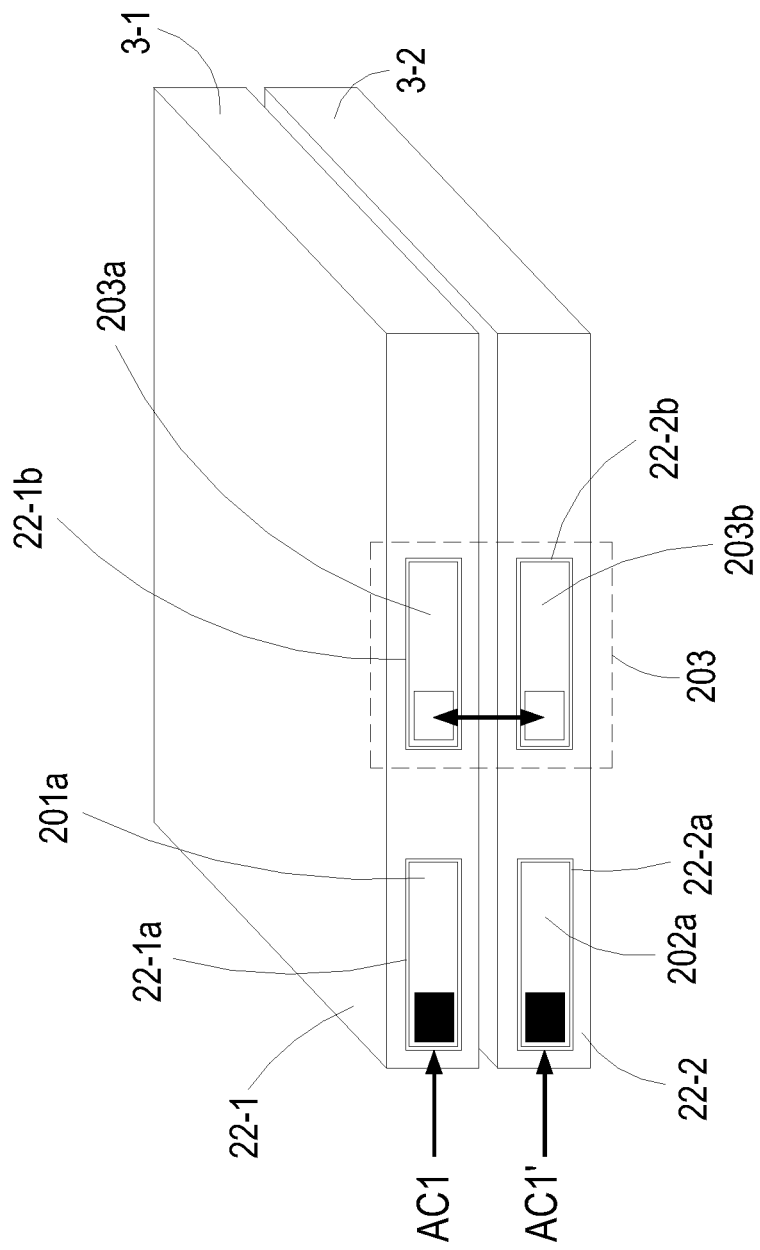

FIGS. 7A and 7B schematically illustrate a power management system capable of saving power and optimizing operating efficiency of power supplies for providing power with back-up or redundancy to plural loads according to a fourth preferred embodiment of the present invention. FIG. 7C shows a circuit block diagram of FIG. 7B. FIGS. 7D and 7E structurally illustrate a power management system of FIGS. 7A and 7B. As shown in FIGS. 7A~7E, the power management system 2 includes at least one power management subsystem 20, a power system control unit 21 and a plurality of loads. The power management subsystem 20 comprises a first power module 201, a second power module 202 and a pass-through module 203. The first power module 201 is coupled to a first load 3-1 and comprises plural first power supplies 201a, 201b, wherein the output terminals of the plural first power supplies 201a, 201b are coupled together and further connecting to the first load 3-1. Each of the first power supply 201a, 201b is retractably installed in the first power module 201 and selectively coupled to the first load 3-1. The second power module 202 is coupled to a second load 3-2 and comprises plural second power supplies 202a, 202b. Each of the second power supply 202a, 202b is retractably installed in the second power module 202 and selectively coupled to the second load 3-2. The pass-through module 203 comprises a first pass-through unit 203a and a second pass-through unit 203b. The first pass-through unit 203a is coupled to the second pass-through unit 203b via a power cable 203c. The first pass-through unit 203a is retractably installed in the first power module 201 to replace with one first power supply 201b and selectively connecting the second power module 202 to the first load 3-1 for allowing the second power module 202 to supply power to the first load 3-1 via the pass-through module 203. The second pass-through unit 203b is retractably installed in the second power module 202 to replace with one second power supply 202b and selectively connecting the first power module 201 to the second load 3-2 for allowing the first power module 201 to supply power to the second load 3-2. Namely, the pass-through module 203 is electrically coupled between the output terminals of two power modules 201, 202 for providing a uni-directional or bi-directional conducting path in response to a control signal S. The power system control unit 21 is coupled to the pass-through module 203 for providing the control signal S to the pass-through module 203 and controlling the operations of turn on and turn off and the power delivery directions of the pass-through module 203 so as to enhance the efficiency of the power management subsystem 20 and provide reliability.

The first power module 201 and the second power module 202 are employed for providing power to a corresponding load, for example first load 3-1 and second load 3-2. The first power module 201 and the second power module 202 respectively comprises a first casing 22-1 and a second casing 22-2, which can also receive a corresponding device circuit of load (such as a blade server). The first casing 22-1 includes a first receptacle 22-1a and a second receptacle 22-1b for receiving the hot-swappable first power supplies 201a, 201b of the first power module 201, respectively. The second casing 22-2 includes a first receptacle 22-2a and a second receptacle 22-2b for receiving the hot-swappable second power supplies 202a, 202b of the second power module 202, respectively. The first receptacles 22-1a, 22-2a of the first casing 22-1 and the second casing 22-2 are employed for receiving the hot-swappable power supplies 201a, 202a, respectively. The second receptacles 22-1b, 22-2b of the first casing 22-1 and the second casing 22-2 are used for receiving either hot-swappable redundant power supply 201b, 202b or at least one hot-swappable pass-through unit 203a, 203b of the pass-through module 203, as shown in FIG. 7E.

Figure 1:
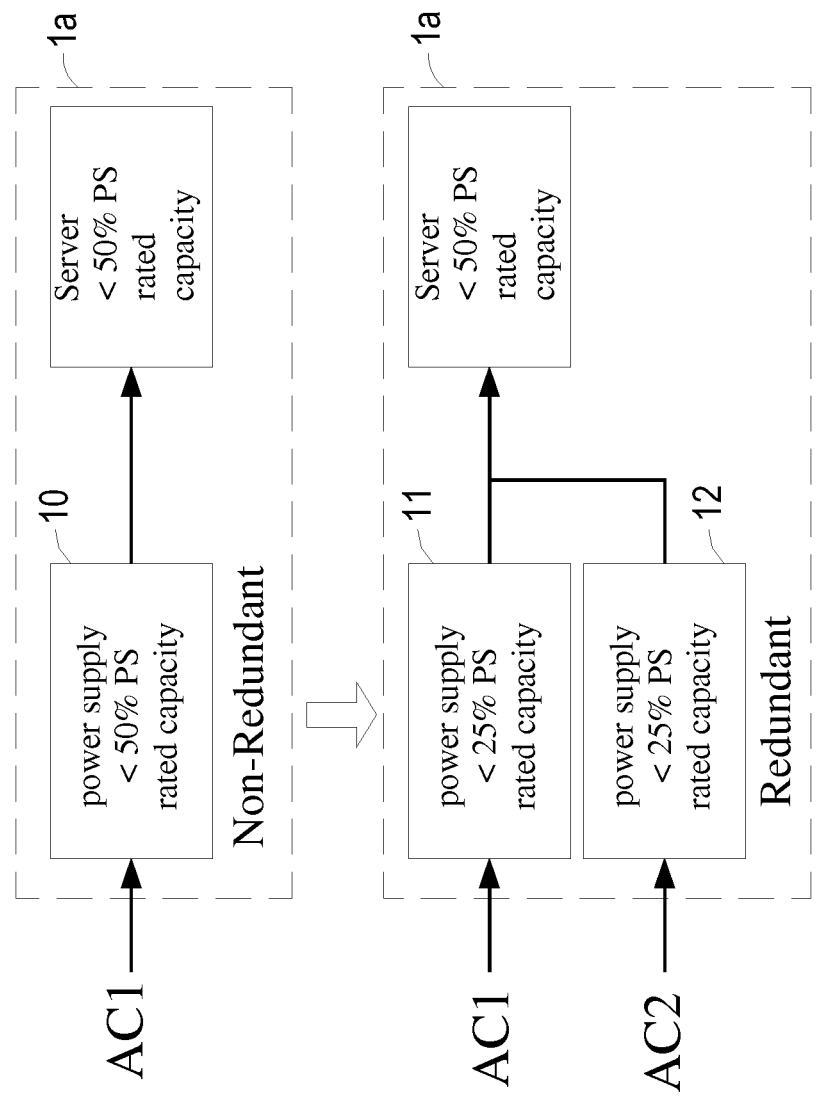
FIG. 1. schematically illustrates a power system for providing power to a server using power supply redundancy.
Figure 2:
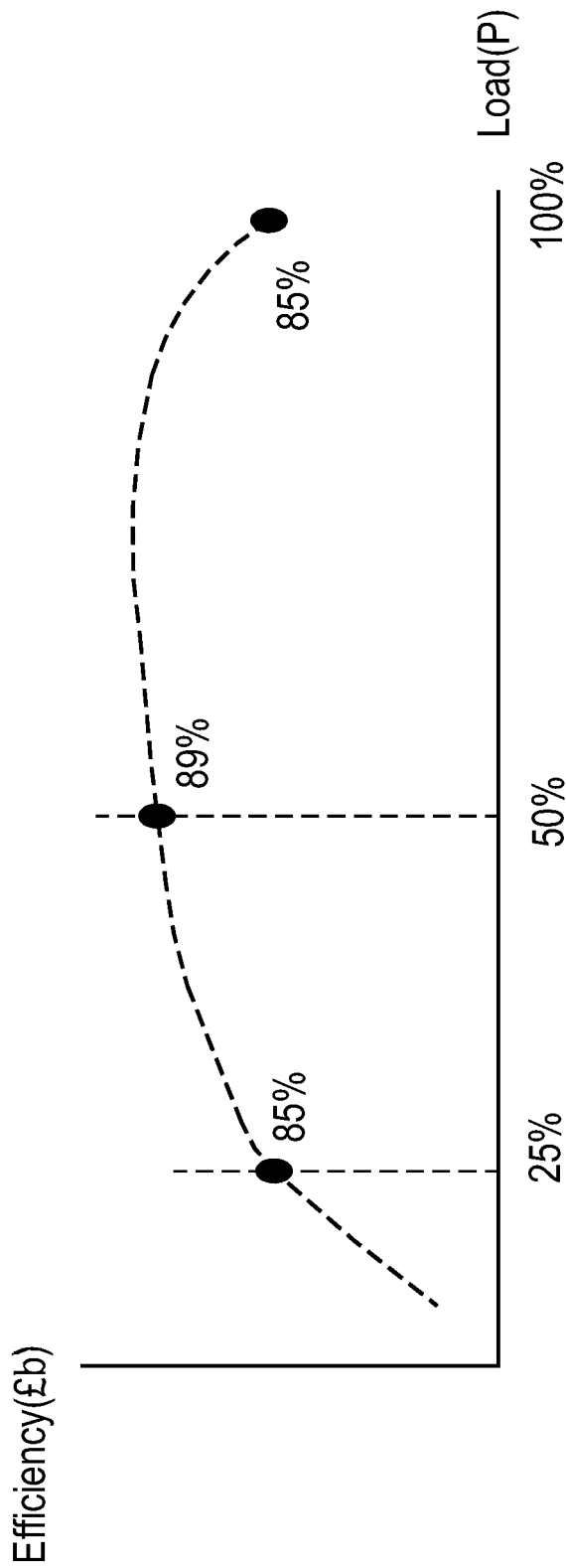
FIG. 2 shows typical power efficiency profile of power supply with respect to delivered power.
Figure 3A:
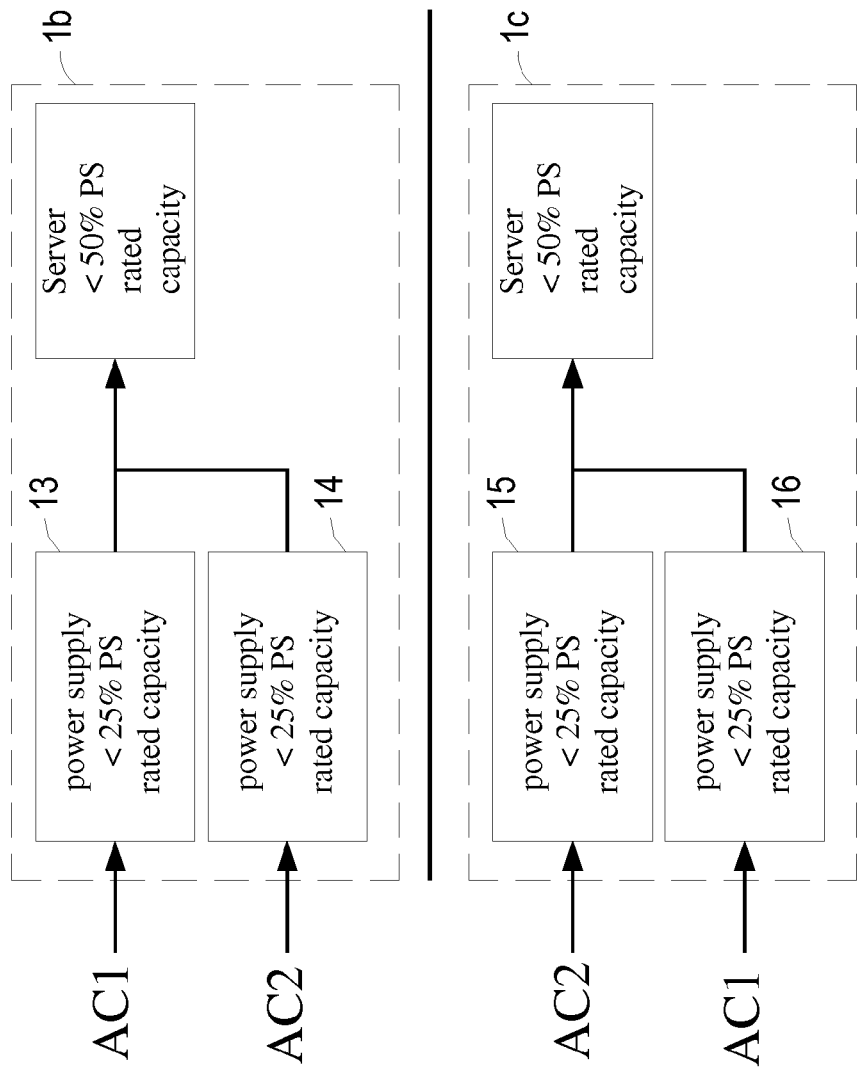
FIGS. 3A and 3B show two similar servers operating side by side with redundancy power supplies.
Figure 3B:
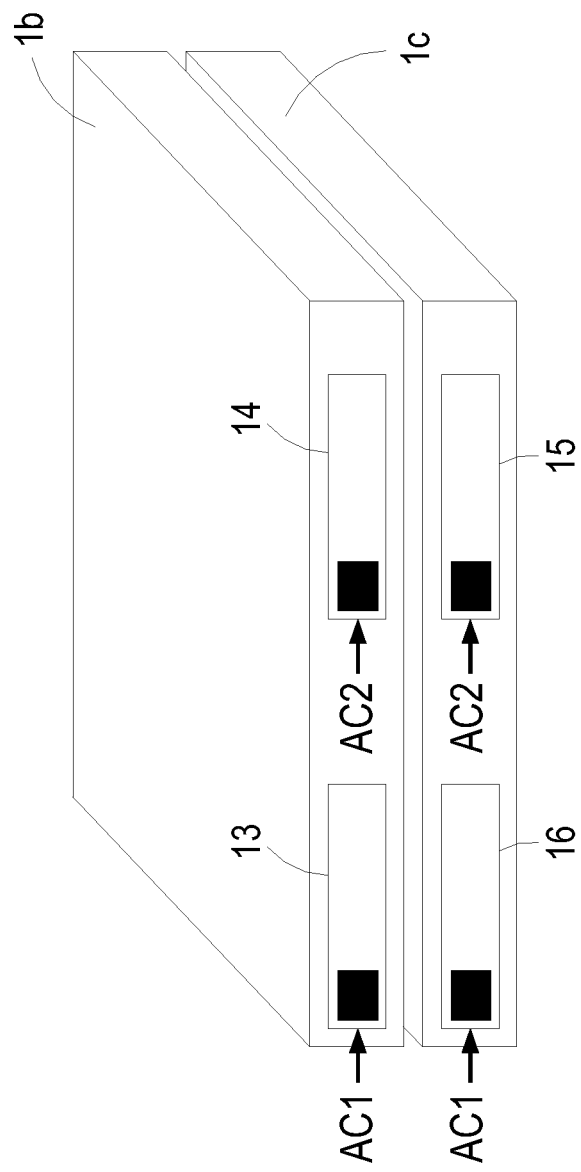

As shown in FIGS. 7A~7E, the first power module 201 and the second power module 202 include power supplies 201a, 201b, 202a, 202b, and the pass-through module 203 includes first pass-through unit 203a and second pass-through unit 203b. Generally, each of the power supplies 201a, 201b, 202a, 202b can be for example any single-stage or multi-stage, isolated or non-isolated ac/dc or dc/dc converter. Comparing with the power system as shown in FIG. 3, one hot-swappable power supply, for example 201b and 202b, are removed and replaced with one hot-swappable pass-through unit, for example 203a and 203b. For simplicity purposes, a pass-through unit is a straight electrical connection from the output of the power supply 201a to that of the power supply 202a.

As shown in FIG. 7B, the power supply 201a of the first power module 201 has an output terminal and the first pass-through unit 203a has a first connecting terminal directly connected to the output terminal of the power supply 201a. The power supply 201a and the first pass-through unit 203a (as shown in FIG. 7C) are connected together through the same connector inside the first casing 22-1. In addition, the power supply 202a of the second power module 202 has an output terminal and the second pass-through unit 203b has a first connecting terminal directly connected to the output terminal of the power supply 202a. The power supply 202a and the second pass-through unit 203b (as shown in FIG. 7C) are connected together through the same connector inside the second casing 22-2.

Each of the first pass-through unit 203a and the second pass-through unit 203b has a second connecting terminal opposite to the first connecting terminal. The first pass-through unit 203a and the second pass-through unit 203b are connected together by an external power cable 203c between their second connecting terminals, as shown in FIGS. 7D and 7E. By connecting the two loads' power modules 201, 202 together, a power network for two loads 3-1, 3-2 is created.

As shown in FIGS. 7A, 7B and 7C, each power supply 201a, 201b, 202a, 202b includes, but not limited to, a PFC, a DC/DC converter, a switch circuit and a power supply controller. The PFC is employed for converting AC power from the power source into a DC power. The DC/DC converter is employed for receiving the DC power from the PFC and converting the DC power into a DC power required for the load. The power supply controller is coupled to the PFC, the DC/DC converter and the switch circuit for issuing the information about the operation status of the power supply to the power system control unit 21 of the power management system 2, receiving the controlling signal S from the power system control unit 21 and controlling the operations of the PFC, the DC/DC converter and the switch circuit. The power supply controller can obtain the operation information of power supply by using plural sensors to sense the input voltage and the output current of the power supply. In an embodiment, each power supply 201a, 201b, 202a, 202b further includes an energy storage and power conditioning circuit coupled to the conducting path between the PFC and the DC/DC converter for increasing hold-up time (not shown). In another embodiment, the power supply controllers of the power supplies 201a, 201b, 202a, 202b can communicate with each other so that the power supply controller of the power supply can control the operations of the power supply according to the a control signal or information from other power supply (not shown). In another embodiment, the power supply controllers of the power supplies 201a, 202a can communicate with the pass-through units of the pass-through module for providing a control signal to the pass-through units of the pass-through module and controlling the operations of turn on and turn off and the power delivery directions of the pass-through units of the pass-through module (not shown).

In an embodiment, each pass-through unit 203a, 203b includes at least one conducting path, at least one bi-directional switch circuit, a pass-through controller, a first connecting terminal and a second connecting terminal. The first connecting terminals of the pass-through units 203a, 203b are coupled to the output terminals of the power supplies 201a, 202a, respectively. The second connecting terminals of the two pass-through units 203a and 203b are coupled together via an external power cable 203c as shown in FIG. 7D. The bi-directional switch circuit of the pass-through unit 203a is electrically connected between the first connecting terminal and the second connecting terminal for selectively allowing the power delivered form the output terminal of the power supply 201a of the first power module 201 to pass through the first pass-through unit 203a and flow to the second pass-through unit 203b via the external power cable 203c so as to provide power to the second load 3-2 and add or condition the output of the first power module 201 to enhance the efficiency of the first power module 201. In addition, the bi-directional switch circuit of the pass-through unit 203b is electrically connected between the first connecting terminal and the second connecting terminal for selectively allowing the power delivered form the output terminal of the power supply 202a of the second power module 202 to pass through the second pass-through unit 203b and flow to the first pass-through unit 203a via the external power cable 203c so as to provide power to the first load 3-1 and add or condition the output of the second power module 202 to enhance the power efficiency of the second power module 202. The pass-through controller of each pass-through unit 203a, 203b is coupled to the bi-directional switch circuit and the power system control unit 21 of the power management system 2 for issuing the information about the power flow, receiving the control signal S from the power system control unit 21 and controlling the operations of the bi-directional switch circuit so as to control the power delivery directions between the two power modules 201, 202. The pass-through controller can obtain the information of power flow by using plural sensors to sense the voltage. The power system control unit 21 of the power management system 2 can communicate with the power supply controller of the power supply 201a, 202a and the pass-through controllers of the pass-through units 203a, 203b.

In an embodiment, at least one of the pass-through units 203a, 203b further includes an energy storage and power conditioning unit coupled to the conducting path (not shown). In another embodiment, at least one of the pass-through units 203a, 203b includes only a power cable or a power cable coupled with an energy storage and power conditioning unit (not shown).

When the power supplies 201a and 202a are normal and their input voltages are normally provided from external power source AC1, AC1', the power system control unit 21 will receive the information from the power supply controllers and the information from the pass-through controllers and issue a control signal S to the pass-through controllers and the power supply controllers to turn off the bi-directional switch of the pass-through units 203a, 203b, allow the power supply 201a to supply power to the first load 3-1 and allow the power supply 202a to supply power to the second load 3-2. Namely, the first load 3-1 is powered by power supply 201a, the second load 3-2 is powered by power supply 202a and the pass-through module 203 is turned off. Therefore, each power supply now operates at server's load of near 50% rated power supply which has 4% higher efficiency than stand alone server.

In addition, power redundancy for each load is preserved. In the event either one of the power supplies 201a, 202a fails or its input voltage from facility AC1, AC1' is lost, the remaining power supply 201a, 202a will be able to continue supporting both loads until the failed power supply 201a, 202a is serviced or the lost input voltage from facility AC1, AC1' is restored. For example, when the power supply 201a fails and/or its input voltage from facility AC1 is lost, the power system control unit 21 will receive the information from the power supply controllers and the information from the pass-through controllers and issue a control signal S to the pass-through controllers and the power supply controllers to turn on the bi-directional switches and control the power delivery directions so that the power delivered form the output terminal of the power supply 202a of the second power module 202 can pass through the second pass-through unit 203b and flow to the first pass-through unit 203a via the external power cable 203c so as to provide power to the first load 3-1 and enhance the power efficiency of the power supply 202a. Therefore, the power supply 202a of the second power module 202 will be able to continue supporting both loads until the failed power supply 201a of the first power module 201 is serviced or the lost input voltage from facility AC1 is restored. When the power supply 202a of the second power module 202 fails and/or its input voltage from facility AC1' is lost, the power system control unit 21 will receive the information from the power supply controllers and the information from the pass-through controllers and issue a control signal S to the pass-through controllers and the power supply controllers to turn on the bi-directional switches and control the power delivery directions so that the power delivered form the output terminal of the power supply 201a of the first power module 201 can pass through the first pass-through unit 203a and flow to the second pass-through unit 203b via the external power cable 203c so as to provide power to the second load 3-2 and enhance the efficiency of the power supply 201a. Therefore, the power supply 201a of the first power module 201 will be able to continue supporting both loads until the failed power supply 202a of the second power module 202 is serviced or the lost input voltage from facility AC1' is restored.

Either the first pass-through unit 203a or the second pass-through unit 203b fails, with mechanism to disconnect itself from the power supply outputs, each load will continue to be supported by its own power supply 201a, 202a.

In addition to the approximate 4% improvement on efficiency, the network now has only 2 ac line cords rather than 4 ac line cords on the 2 stand alone servers. Less number of line cords greatly reduces the task of cable management behind the servers in the server rack due to clutter and heat blocking of the line cords.

In addition, the network can employ only two power supplies 201a, 202a and two pass-through units 203a, 203b rather than four power supplies 201a, 201b, 202a, 202b on the two stand alone servers. It also expects to reduce system cost and improve system reliability. The pass-through unit is expected to be simpler to design and lower cost due to its non-power processing function comparing with a power supply.

Figure 8A:
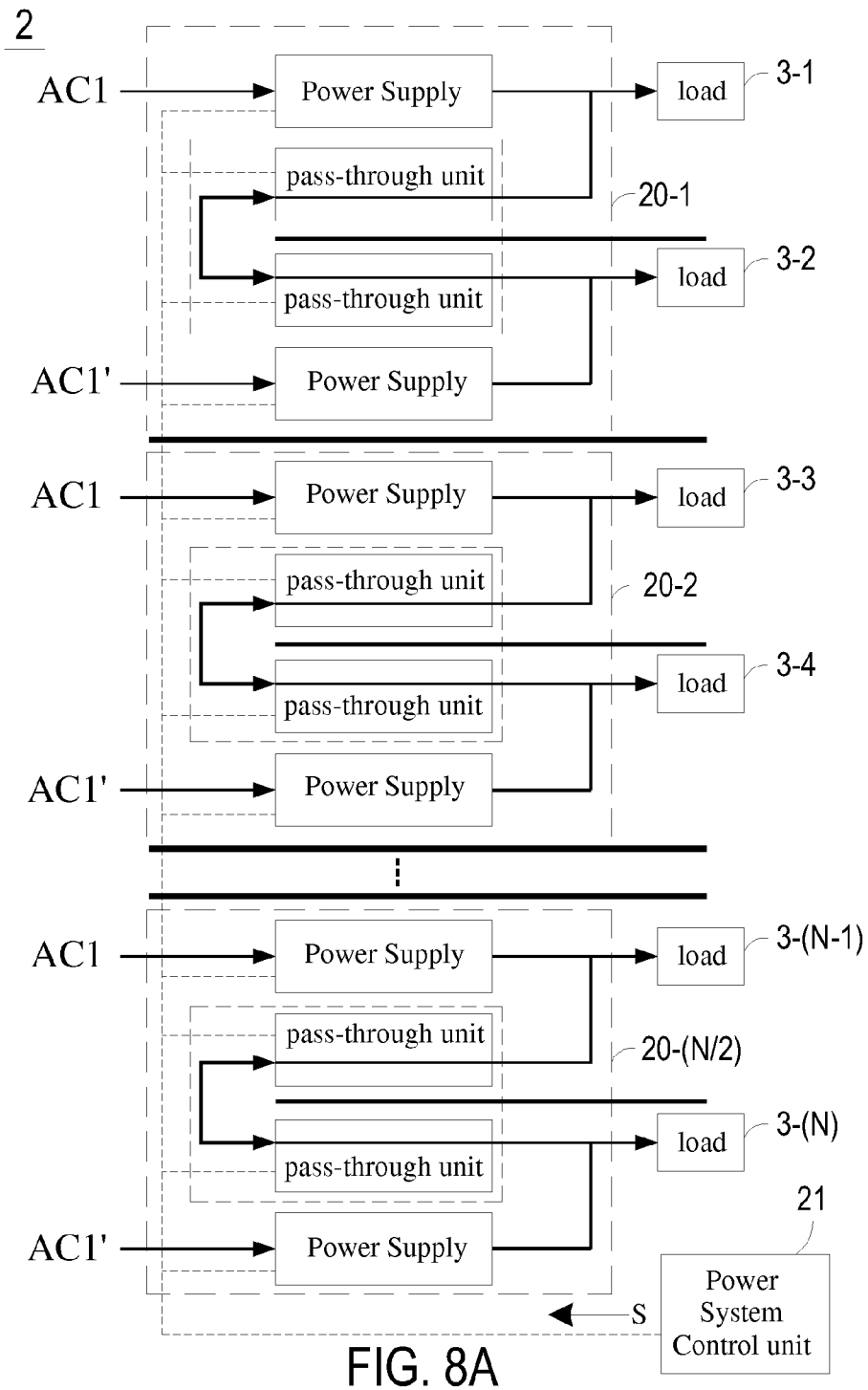
FIG. 8A shows a network power sharing arrangement using the power management system of FIGS. 7A and 7B.
Figure 8B:
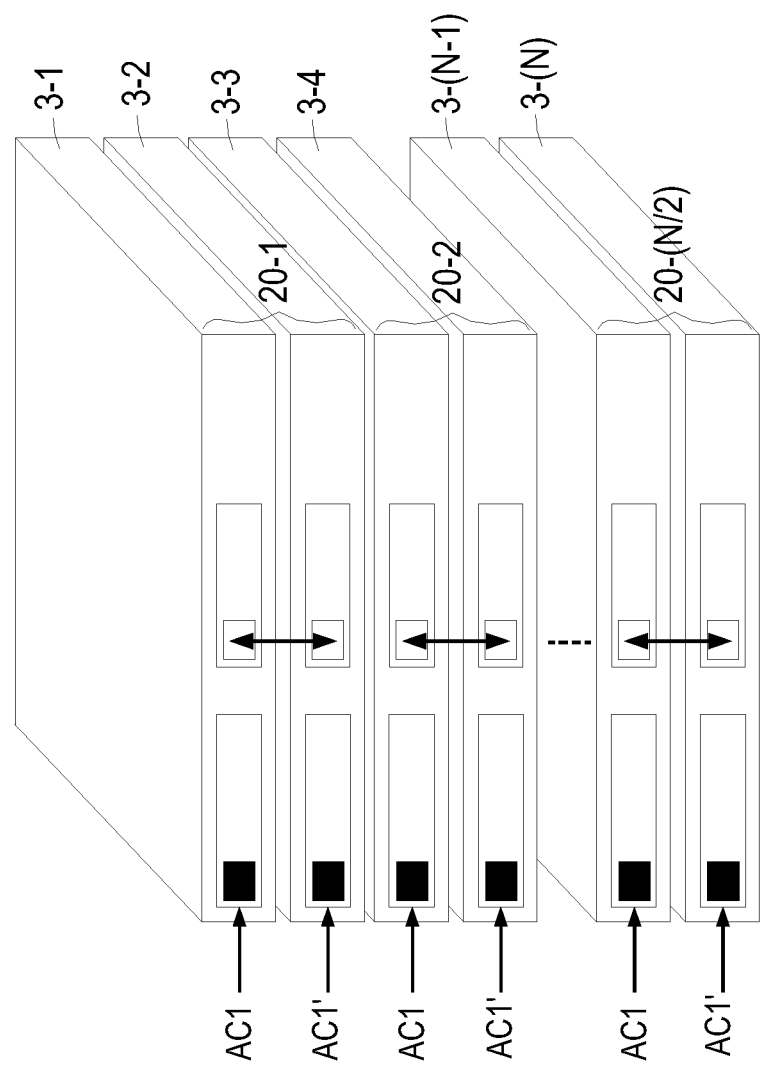
FIG. 8B structurally illustrates a power management system of FIG. 8A.

FIG. 8A shows a network power sharing arrangement using the power management system of FIGS. 7A and 7B. FIG. 8B structurally illustrates a power management system of FIG. 8A. As shown in FIGS. 8A and 8B, each load is powered by its own power supply and being backup/redundant by the power supply in the other server. Only 2 power supplies operating in 2 servers instead of the typical 4 power supplies operating. The combined total power does not exceed 1 rated power supply. This increases system efficiency.

As shown in FIG. 8A, the power management system 2 of the present invention includes a plurality of power management subsystems 20-1, 20-2 . . . 20-(N/2), a power system control unit 21 and a plurality of loads 3-1, 3-2, 3-3, 3-4 . . . 3-(N−1), 3-(N), wherein N is a positive even numbers. The operations, functions and structures of the power management subsystems 20-1, 20-2 . . . 20-(N/2) are similar to that of FIGS. 7A~7E, and aren't redundantly described herein. The power system control unit 21 is coupled to the pass-through modules of the power management subsystems 20-1, 20-2 . . . 20-(N/2) for providing the control signal S to the pass-through modules and controlling the operations of turn on and turn off and the power delivery directions of the pass-through modules so as to enhance the power efficiency of the power management subsystem 20-1, 20-2 . . . 20-(N/2) and provide reliability.

Figure 9A:
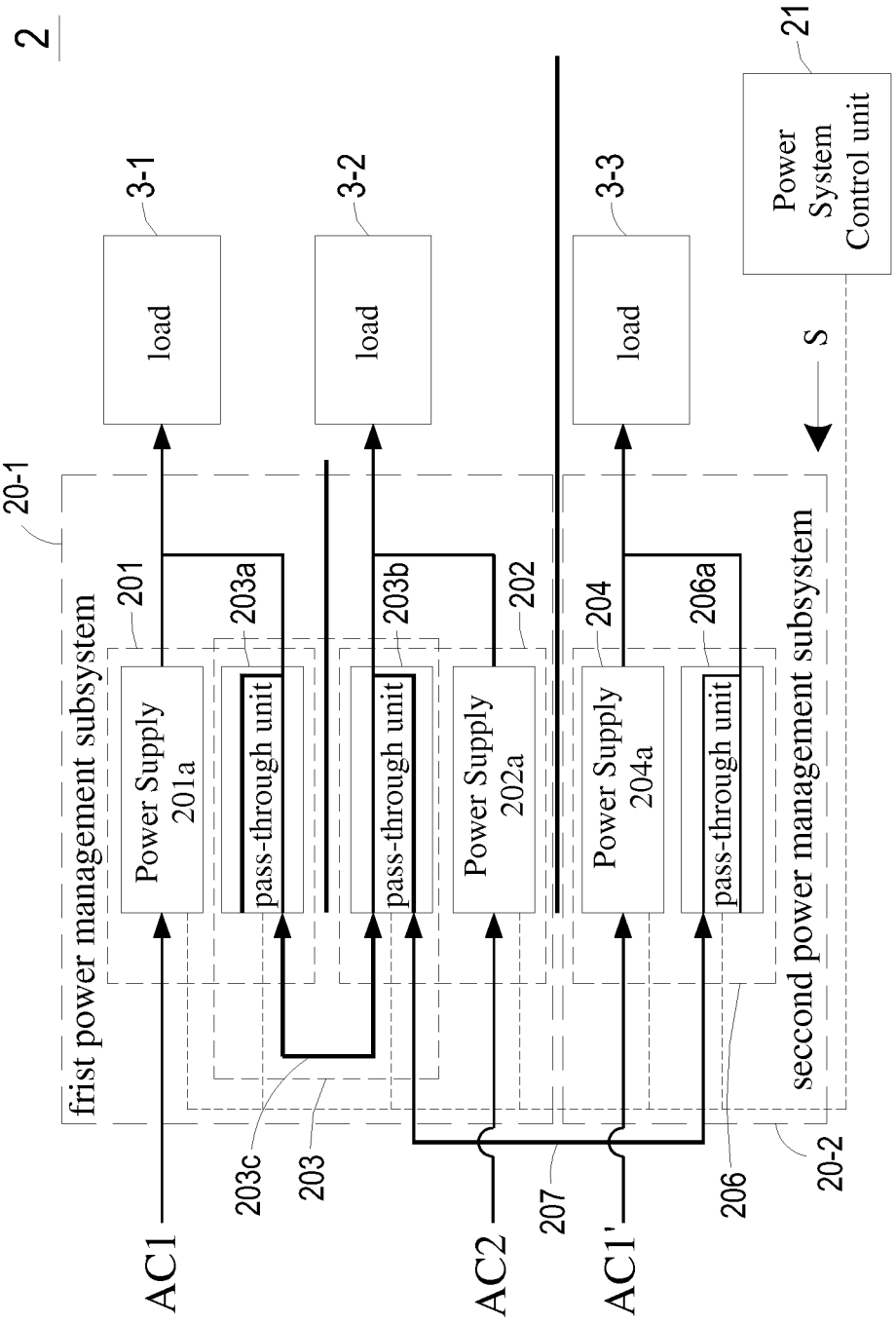
FIG. 9A schematically illustrates a power management system capable of saving power and optimizing operating efficiency of power supplies for providing power with back-up or redundancy to plural loads according to a fifth preferred embodiment of the present invention.
Figure 9B:
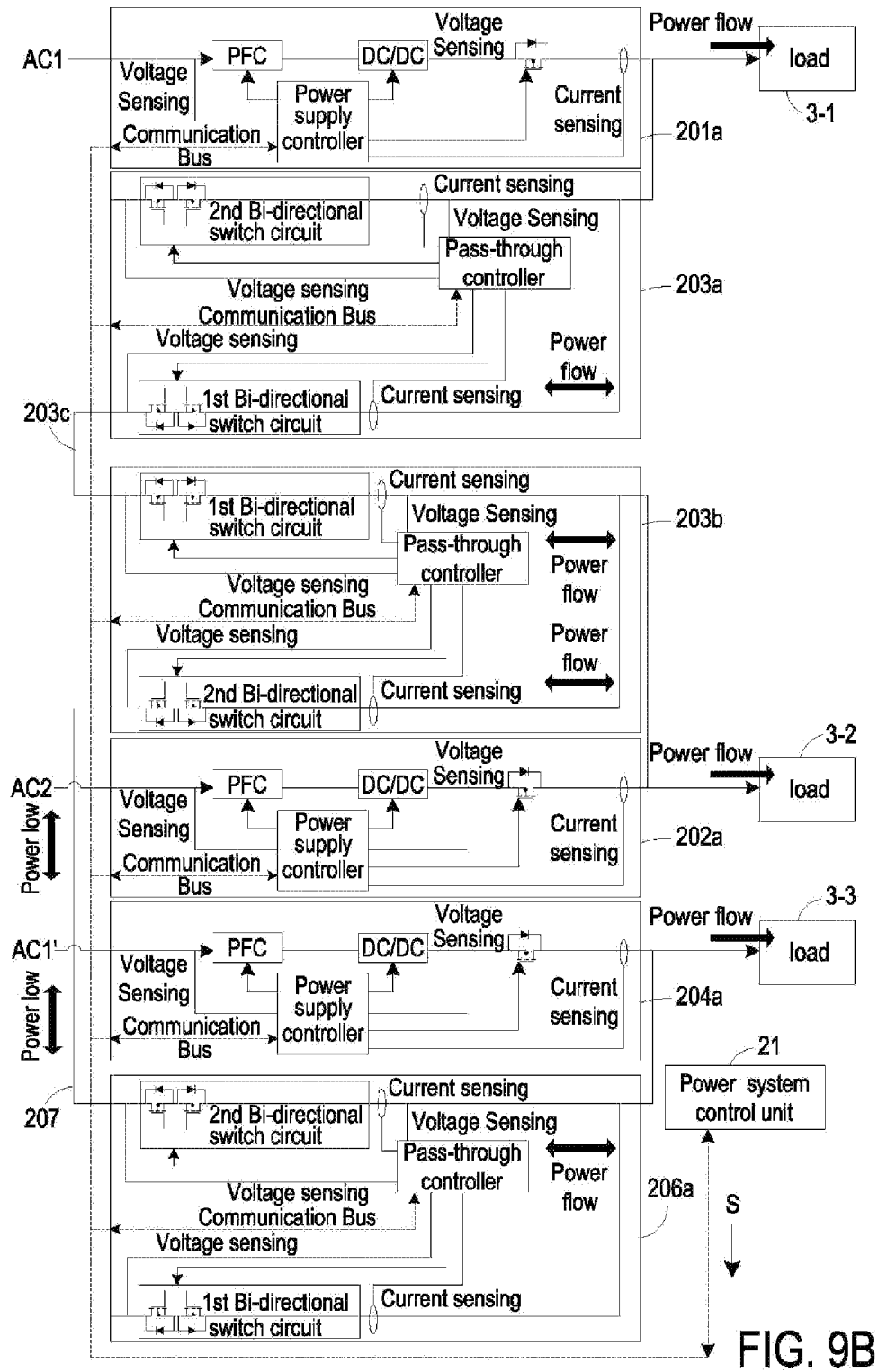
FIG. 9B partially shows a circuit block diagram of FIG. 9A.

FIG. 9A schematically illustrates a power management system capable of saving power and optimizing operating efficiency of power supplies for providing power with back-up or redundancy to plural loads according to a fifth preferred embodiment of the present invention. FIG. 9B partially shows a circuit block diagram of FIG. 9A. FIG. 9C structurally illustrates a power management system of FIG. 9A. As shown in FIGS. 9A~9C, the power management system 2 can be employed for managing power distribution to for example three loads 3-1~3-3 and includes a first power management subsystem 20-1, a second power management subsystem 20-2, a power system control unit 21 and a plurality of loads. The first power management subsystem 20-1 includes two power modules such as first power module 201 and second power module 202 and a first pass-through module 203. Each power module 201, 202 includes at least one power supply 201a, 202a, and the first pass-through module 203 is electrically coupled between the output terminals of two power modules 201, 202 for providing a uni-directional or bi-directional conducting path in response to a control signal S. The second power management subsystem 20-2 includes a third power module 204 and a second pass-through module 206. The third power module 204 includes at least one power supply 204a, and the second pass-through module 206 is electrically coupled to the output terminal of the third power module 204 for providing a uni-directional or bi-directional conducting path in response to a control signal S. The power system control unit 21 is coupled to the first pass-through module 203 of the first power management subsystem 20-1 and the second pass-through module 206 of the second power management subsystem 20-2 for providing the control signal S to the first pass-through module 203 of the first power management subsystem 20-1 and the second pass-through module 206 of the second power management subsystem 20-2 and controlling the operations of turn on and turn off and the power delivery directions of the first pass-through module 203 of the first power management subsystem 20-1 and the second pass-through module 206 of the second power management subsystem 20-2 so as to enhance the power efficiency of the power management system 2 and provide reliability.

Two power modules of the first power management subsystem, for example a first power module 201 and a second power module 202, are employed for providing power to a corresponding load, for example first load 3-1 and second load 3-2. The operations, functions and structures of the first power management subsystems 20-1 is similar to that of FIGS. 7A~7E, and aren't redundantly described herein. The third power module 204 of the second power management subsystem 20-2 is employed for providing power to a corresponding load, for example third load 3-3. The operations, functions and structures of the second power management subsystems 20-2 is similar to that of FIGS. 7A~7E, and aren't redundantly described herein.

As shown in FIGS. 9A~9C, the first power modules 201 and the second power module 202 of the first power management subsystem 20-1 include power supplies 201a, 202a, respectively, and the first pass-through module 203 includes two pass-through units 203a and 203b. Generally, each of the power supplies 201a, 202a can be for example any single-stage or multi-stage, isolated or non-isolated ac/dc or dc/dc converter. For simplicity purposes, a pass-through unit is a straight electrical connection from the output of power supply 201a to that of power supply 202a. The third power module 204 of the second power management subsystem 20-2 includes at least one power supply 204a, and the second pass-through module 206 includes at least one pass-through unit 206a. Generally, the power supply 204a of the power module 204 can be for example any single-stage or multi-stage, isolated or non-isolated ac/dc or dc/dc converter.

As shown in FIG. 9A, the power supply 201a has an output terminal and the pass-through unit 203a has a first connecting terminal directly connected to the output terminal of the power supply 201a. The power supply 201a and pass-through unit 203a (as shown in FIG. 9A) are connected together through the same connector inside the casing of the first load 3-1. In addition, the power supply 202a has an output terminal and the pass-through unit 203b has a first connecting terminal directly connected to the output terminal of the power supply 202a. The power supply 202a and pass-through unit 203b are connected together through the same connector inside the casing of the second load 3-2. Similarly, the power supply 204a of the third power module 204 of the second power management subsystem 20-2 has an output terminal and the pass-through unit 206a of the second pass-through module 206 has a first connecting terminal directly connected to the output terminal of the power supply 204a. The power supply 204a and the pass-through unit 206a of the second pass-through module 206 are connected together through the same connector inside the casing of the third load 3-3.

Each of the pass-through units 203a and 203b of the first pass-through module 203 of the first power management subsystem 20-1 has a second connecting terminal opposite to the first connecting terminal. The pass-through units 203a and 203b are connected together by an external power cable 203c between their second connecting terminals, as shown in FIG. 9C. By connecting the two loads' power modules 201, 202 together, a power network for two loads is created. In addition, each of the pass-through units 203a and 203b further has a third connecting terminal adjacent to the second connecting terminal and opposite to the first connecting terminal. Similarly, the pass-through unit 206a of the second pass-through module 206 of the second power management subsystem 20-2 has a second connecting terminal opposite to the first connecting terminal. In addition, the pass-through unit 206a further has a third connecting terminal adjacent to the second connecting terminal and opposite to the first connecting terminal. The first pass-through module 203 and the second pass-through module 206 are connected together by an external power cable 207 between their third connecting terminals, as shown in FIG. 9C.

As shown in FIGS. 9A and 9B, each power supply 201a, 202a, 204a of the first and second power management subsystems 20-1, 20-2 includes, but not limited to, a PFC, a DC/DC converter, a switch circuit and a power supply controller. The operations, functions and structures of the power supply 201a, 202a, 204a are similar to that of FIG. 7C, and aren't redundantly described herein.

Each pass-through unit 203a, 203b, 206a of the first and second pass-through modules 203, 206 includes plural conducting paths, a first bi-directional switch circuit, a second bi-directional switch circuit, a pass-through controller, a first connecting terminal, a second connecting terminal and a third connecting terminal. The first connecting terminals of the pass-through units 203a, 203b of the first pass-through module 203 are coupled to the output terminals of the power supplies 201a, 202a of the first power management subsystem 20-1, respectively. The first connecting terminal of the pass-through unit 206a of the second pass-through module 206 is coupled to the output terminal of the power supply 204a of the second power management subsystem 20-2. The second connecting terminals of the two pass-through units 203a, 203b of the first pass-through module 203 are coupled together via an external power cable 203c as shown in FIG. 9C. The third connecting terminal of the pass-through unit 203b of the first pass-through module 203 and the third connecting terminal of the pass-through unit 206a of the second pass-through module 206 are coupled together via an external power cable 207.

The first bi-directional switch circuit of the pass-through unit 203b is electrically connected between the first connecting terminal and the second connecting terminal of the pass-through unit 203b and coupled to the pass-through controller for allowing the power delivered form the output terminal of the power supply 202a to pass through the pass-through unit 203b and flow to the pass-through unit 203a via the external power cable 203c so as to provide power to the first load 3-1 and enhance the power efficiency of the power supply 202a and allowing the power delivered form the output terminal of the power supply 201a to pass through the pass-through unit 203a and flow to the pass-through unit 203b via the external power cable 203c so as to provide power to the second load 3-2 and enhance the power efficiency of the power supply 201a. The second bi-directional switch circuit of the pass-through unit 203b of the first pass-through module 203 is electrically connected between the first connecting terminal and the third connecting terminal of the pass-through unit 203b and coupled to the pass-through controller for allowing the power delivered form the power supply 202a to pass through the pass-through unit 203b of the first pass-through module 203 and flow to the pass-through unit 206a of the second pass-through module 206 via the external power cable 207 so as to provide power to the third load 3-3 and enhance the power efficiency of the power supply 202a and allowing the power delivered form the power supply 204a to pass through the pass-through unit 206a of the second pass-through module 206 and flow to the pass-through unit 203b of the pass-through module 203 via the external power cable 207 so as to provide and share power to the second load 3-2 and enhance the power efficiency of the power supply 204a of the second power management subsystem 20-2. In addition, the power system control unit 21 can also issue a control signal S to control the power delivered from the power supply 201a to flow through the pass-through units 203a and 203b of the first pass-through module 203 and the pass-through unit 206a of the second pass-through module 206 to the third load 3-3. Similarly, the power system control unit 21 can also issue a control signal S to control the power delivered from the power supply 204a of the second power management subsystem 20-2 to flow through the pass-through unit 206a of the second pass-through module 206 and the pass-through units 203a and 203b of the first pass-through module 203 to the first load 3-1.

The pass-through controller of each pass-through unit of the first and second pass-through modules 203, 206 is coupled to the first bi-directional switch circuit, the second bi-directional switch circuit and the power system control unit 21 for issuing the information about the power flow, receiving the control signal S from the power system control unit 21 and controlling the operations of the first and second bi-directional switch circuits so as to control the power delivery directions. The pass-through controller can obtain the information of power flow by using plural sensors to sense the voltage. The power system control unit 21 of the power management system 2 can communicate with the power supply controllers of power supplies 201a, 202a, 204a and the pass-through controllers of pass-through units 203a, 203b, 206a of the first and second power management subsystems 20-1, 20-2.

The operations between the power modules 201, 202 and the first pass-through module 203 of the first power management subsystem 20-1 as shown in FIGS. 9A~9C are similar to that of the power management subsystem of FIGS. 7A~7E, and aren't redundantly described herein. The operations between the power module 204 and the second pass-through module 206 of the second power management subsystem 20-2 as shown in FIGS. 9A~9C are also similar to that of the power management subsystem of FIGS. 7A~7E, and aren't redundantly described herein.

In addition, power redundancy for each load is preserved. In the event any power supply 201a, 202a, 204a fails or its input voltage from facility AC1, AC2, AC1' is lost, the remaining power supply 201a, 202a, 204a will be able to continue supporting one or more of the loads until the failed power supply 201a, 202a, 204a is serviced or the lost input voltage from facility AC1, AC2, AC1' is restored. When the power supplies 201a and 202a fails and/or their input voltages are lost from external power source AC1, AC2, the power system control unit 21 will receive the information from the power supply controllers and the information from the pass-through controllers of the first and second power management subsystems 20-1, 20-2 and issue a control signal S to the pass-through controllers and the power supply controllers of the first and second power management subsystems 20-1, 20-2 to control the operations of the first and second bi-directional switches of the pass-through units 203a, 203b, 206a and the power delivery directions so that the power outputted from the power supply 204a of the second power management subsystem 20-2 can be provide to the first load 3-1 and the second load 3-2. Namely, loads 3-1~3-3 are powered by power supply 204a of the second power management subsystem 20-2 until the failed power supplies 201a and 202a are serviced or the lost input voltages from facility AC1, AC2 are restored. Therefore, the power supply 204a of the second power management subsystem 20-2 now operates at desired efficiency higher than that of the stand alone server.

When the power supply 201a of the first power management subsystem 20-1 and the power supply 204a of the second power management subsystem 20-2 fail and/or their input voltages are lost from external power source AC1, AC1', the power system control unit 21 will receive the information from the power supply controllers and the information from the pass-through controllers of the first and second power management subsystems 20-1, 20-2 and issue a control signal S to the pass-through controllers and the power supply controllers of the first and second power management subsystems 20-1, 20-2 to control the operations of the first and second bi-directional switches of the pass-through units 203a, 203b, 206a and the power delivery directions so that the power outputted from the power supply 202a of the first power management subsystem 20-1 can be provided to the first load 3-1 and the third load 3-3. Namely, loads 3-1~3-3 are powered by power supply 202a of the first power management subsystem 20-1 until the failed power supply 201a of the first power management subsystem 20-1 and the power supply 204a of the second power management subsystem 20-2 are serviced or the lost input voltages from facility AC1, AC1' are restored. Therefore, the power supply 202a of the first power management subsystem 20-1 now operates at desired efficiency higher than that of the stand alone server.

When the power supply 202a of the first power management subsystem 20-1 and the power supply 204a of the second power management subsystem 20-2 fail and/or their input voltages are lost from external power source AC2, AC1', the power system control unit 21 will receive the information from the power supply controllers and the information from the pass-through controllers of the first and second power management subsystems 20-1, 20-2 and issue a control signal S to the pass-through controllers and the power supply controllers of the first and second power management subsystems 20-1, 20-2 to control the operations of the first and second bi-directional switches of the pass-through units 203a, 203b, 206a and the power delivery directions so that the power outputted from the power supply 201a of the first power management subsystem 20-1 can be provided to the second load 3-2 and third load 3-3. Namely, loads 3-1~3-3 are powered by power supply 201a of the first power management subsystem 20-1 until the failed power supply 202a of the first power management subsystem 20-1 and the power supply 204a of the second power management subsystem 20-2 are serviced or the lost input voltages from facility AC2, AC1' are restored. Therefore, the power supply 201a of the first power management subsystem 20-1 now operates at desired efficiency higher than that of the stand alone server.

When the power supply 201a fails and/or its input voltages is lost from external power source AC1, the power system control unit 21 will receive the information from the power supply controllers and the information from the pass-through controllers of the first and second power management subsystems 20-1, 20-2 and issue a control signal S to the pass-through controllers and the power supply controllers of the first and second power management subsystems 20-1, 20-2 to control the operations of the first and second bi-directional switches of the pass-through units 203a, 203b, 206a and the power delivery directions so that the power outputted from the power supply 204a of the second power management subsystem 20-2 can be provided to the first load 3-1 and/or the power outputted from the power supply 202a of the first power management subsystem 20-1 can be provided to the first load 3-1. Namely, loads 3-1, 3-2 can be powered by power supply 202a of the first power management subsystem 20-1 and/or loads 3-1, 3-3 can be powered by power supply 304a of the second power management subsystem 20-2 until the failed power supply 201a is serviced or the lost input voltage from facility AC1 is restored. Therefore, the power supply 202a of the first power management subsystem 20-1 and/or the power supply 204a of the second power management subsystem 20-2 now operate at desired efficiency higher than that of the stand alone server.

When the power supply 202a fails and/or its input voltages is lost from external power source AC2, the power system control unit 21 will receive the information from the power supply controllers and the information from the pass-through controllers of the first and second power management subsystems 20-1, 20-2 and issue a control signal S to the pass-through controllers and the power supply controllers of the first and second power management subsystems 20-1, 20-2 to control the operations of the first and second bi-directional switches of the pass-through units 203a, 203b, 206a and the power delivery directions so that the power outputted from the power supply 204a of the second power management subsystem 20-2 can be provided to the second load 3-2 and/or the power outputted from the power supply 201a of the first power management subsystem 20-1 can be provided to the second load 3-2. Namely, loads 3-1, 3-2 can be powered by power supply 201a of the first power management subsystem 20-1 and/or loads 3-2, 3-3 can be powered by power supply 204a of the second power management subsystem 20-2 until the failed power supply 202a is serviced or the lost input voltage from facility AC2 is restored. Therefore, the power supply 201a of the first power management subsystem 20-1 and/or the power supply 204a of the second power management subsystem 20-2 now operate at desired efficiency higher than that of the stand alone server.

When the power supply 204a of the second power management subsystem 20-2 fails and/or its input voltages is lost from external power source AC1', the power system control unit 21 will receive the information from the power supply controllers and the information from the pass-through controllers of the first and second power management subsystems 20-1, 20-2 and issue a control signal S to the pass-through controllers and the power supply controllers of the first and second power management subsystems 20-1, 20-2 to control the operations of the first and second bi-directional switches of the pass-through units 203a, 203b, 206a and the power delivery directions so that the power outputted from the power supply 201a of the first power management subsystem 20-1 can be provided to the third load 3-3 and/or the power outputted from the power supply 202a of the first power management subsystem 20-1 can be provided to the third load 3-3. Namely, loads 3-1, 3-3 can be powered by power supply 201a of the first power management subsystem 20-1 and/or loads 3-2, 3-3 can be powered by power supply 202a of the first power management subsystem 20-1 until the failed power supply 204a of the second power management subsystem 20-2 is serviced or the lost input voltage from facility AC1' is restored. Therefore, the power supply 201a of the first power management subsystem 20-1 and/or the power supply 202a of the first power management subsystem 20-1 now operate at desired efficiency higher than that of the stand alone server.

In addition to the improvement on efficiency, the network now has only 3 ac line cords rather than 6 ac line cords on the three stand alone servers. Less number of line cords greatly reduce the task of cable management behind the servers in the server rack due to clutter and heat blocking of the line cords.

In addition, the network can employ only three power supplies 201a, 202a, 204a and three pass-through units 203a, 203b, 206a rather than six power supplies on the three stand alone servers. It also expects to reduce system cost and improve system reliability. The pass-through unit is expected to be simpler to design and lower cost due to its non-power processing function comparing with a power supply.

Figure 10A:
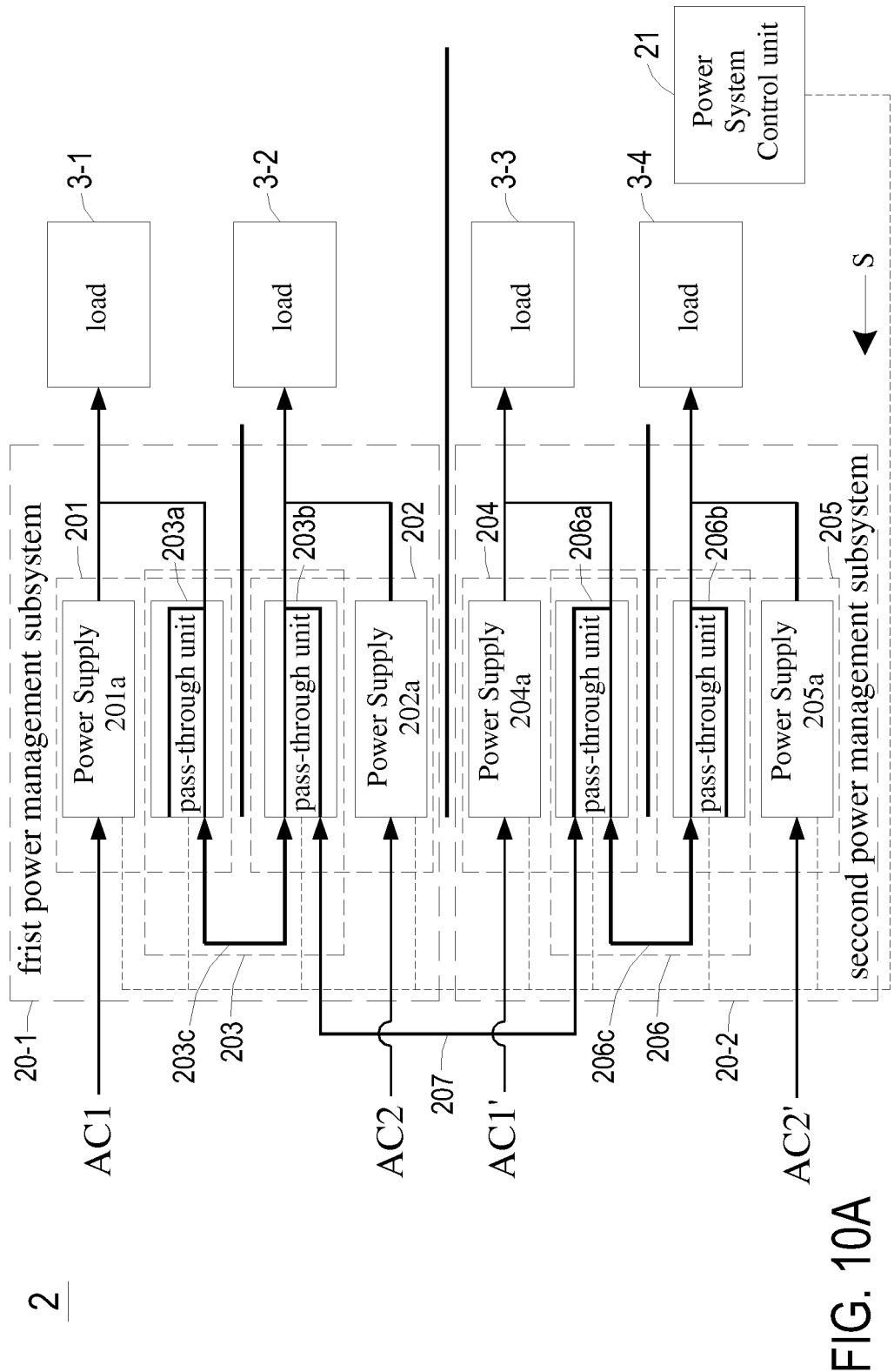
FIG. 10A schematically illustrates a power management system capable of saving power and optimizing operating efficiency of power supplies for providing power with back-up or redundancy to plural loads according to a sixth preferred embodiment of the present invention.

FIG. 10A schematically illustrates a power management system capable of saving power and optimizing operating efficiency of power supplies for providing power with back-up or redundancy to plural loads according to a sixth preferred embodiment of the present invention. FIG. 10B partially shows a circuit block diagram of FIG. 10A. FIG. 10C structurally illustrates a power management system of FIG. 10A. As shown in FIGS. 10A~10C, the power management system 2 can be employed for managing power distribution to for example four loads 3-1~3-4 and includes a first power management subsystem 20-1, a second power management subsystem 20-2, a power system control unit 21 and a plurality of loads. The first power management subsystem 20-1 includes two power modules such as first power module 201 and second power module 202 and a first pass-through module 203. Each power module 201, 202 includes at least one power supply 201a, 202a, and the first pass-through module 203 is electrically coupled between the output terminals of two power modules 201, 202 for providing a uni-directional or bi-directional conducting path in response to a control signal S. The second power management subsystem 20-2 includes two power modules such as third power module 204 and fourth power module 205 and a second pass-through module 206. Each power module 204, 205 includes at least one power supply 204a, 205a, and the second pass-through module 206 is electrically coupled between the output terminals of two power modules 204, 205 for providing a uni-directional or bi-directional conducting path in response to a control signal S. The first pass-through module 203 of the first power management subsystem 20-1 and the second pass-through module 206 of the second power management subsystem 20-2 are coupled together via a power cable 207. The power system control unit 21 is coupled to the first pass-through module 203 of the first power management subsystem 20-1 and the second pass-through module 206 of the second power management subsystem 20-2 for providing the control signal S to the first pass-through module 203 of the first power management subsystem 20-1 and the second pass-through module 206 of the second power management subsystem 20-2 and controlling the operations of turn on and turn off and the power delivery directions of the first pass-through module 203 of the first power management subsystem 20-1 and the second pass-through module 206 of the second power management subsystem 20-2 so as to enhance the power efficiency of the power management system 2 and provide reliability. The structures and functions of the first power management subsystem 20-1 are similar to those of the second power management subsystem 20-2.

Two power modules of the first power management subsystem 20-1, for example a first power module 201 and a second power module 202, are employed for providing power to a corresponding load, for example the first load 3-1 and the second load 3-2. The operations, functions and structures of the first power management subsystem 20-1 is similar to the first power management subsystem of FIGS. 9A~9C, and aren't redundantly described herein. Similarly, two power modules of the second power management subsystem 20-2, for example the third power module 204 and the fourth power module 205, are employed for providing power to a corresponding load, for example the third load 3-3 and the fourth load 3-4. The operations, functions and structures of the second power management subsystem 20-2 is similar to the first power management subsystem of FIGS. 9A~9C, and aren't redundantly described herein.

As shown in FIGS. 10A~10C, the first power module 201 and the second power module 202 of the first power management subsystem 20-1 include power supplies 201a, 202a, respectively, and the first pass-through module 203 includes two pass-through units 203a and 203b. Generally, each of the power supplies 201a, 202a can be for example any single-stage or multi-stage, isolated or non-isolated ac/dc or dc/dc converter. For simplicity purposes, a pass-through unit is a straight electrical connection from the output of the power supply 201a to that of the power supply 202a. The third power module 204 and the fourth power module 205 of the second power management subsystem 20-2 include power supplies 204a, 205a, respectively, and the second pass-through module 206 includes two pass-through units 206a, 206b. Generally, each of the power supplies 204a, 205a can be for example any single-stage or multi-stage, isolated or non-isolated ac/dc or dc/dc converter. For simplicity purposes, a pass-through unit is a straight electrical connection from the output of the power supply 204a to that of the power supply 205a.

As shown in FIG. 10A, the power supply 201a has an output terminal and the pass-through unit 203a has a first connecting terminal directly connected to the output terminal of the power supply 201a. The power supply 201a and pass-through unit 203a are connected together through the same connector inside the casing of the first load 3-1. In addition, the power supply 202a has an output terminal and the pass-through unit 203b has a first connecting terminal directly connected to the output terminal of the power supply 202a. The power supply 202a and pass-through unit 203b are connected together through the same connector inside the casing of the second load 3-2. Similarly, the power supply 204a has an output terminal and the pass-through unit 206a has a first connecting terminal directly connected to the output terminal of the power supply 204a. The power supply 204a and pass-through unit 206a are connected together through the same connector inside the casing of the third load 3-3. In addition, the power supply 205a has an output terminal and the pass-through unit 206b has a first connecting terminal directly connected to the output terminal of the power supply 205a. The power supply 205a and pass-through unit 206b are connected together through the same connector inside the casing of the fourth load 3-4.

Each of the pass-through units 203a and 203b of the first pass-through module 203 of the first power management subsystem 20-1 has a second connecting terminal opposite to the first connecting terminal. The pass-through units 203a and 203b are connected together by an external power cable 203c between their second connecting terminals, as shown in FIG. 10C. By connecting the two loads' power modules 201, 202 together, a power network for two loads 3-1, 3-2 is created. In addition, each of the pass-through units 203a and 203b further has a third connecting terminal adjacent to the second connecting terminal and opposite to the first connecting terminal. Similarly, each of the pass-through units 206a, 206b of the second pass-through module 206 of the second power management subsystem 20-2 has a second connecting terminal opposite to the first connecting terminal. The pass-through units 206a and 206b are connected together by an external power cable 206c between their second connecting terminals, as shown in FIG. 10C. By connecting the two loads' power modules 204, 205 together, a power network for two loads 3-3, 3-4 is created. In addition, each of the pass-through units 206a, 206b further has a third connecting terminal adjacent to the second connecting terminal and opposite to the first connecting terminal. The first pass-through module 203 and the second pass-through module 206 are connected together by an external power cable 207 between their third connecting terminals of the pass-through units 203b and 206a, as shown in FIG. 10C.

As shown in FIGS. 10A and 10B, each power supply 201a, 202a, 204a, 205a of the first and second power management subsystems 20-1, 20-2 includes, but not limited to, a PFC, a DC/DC converter, a switch circuit and a power supply controller. The operations, functions and structures of the power supply 201a, 202a, 204a, 205a are similar to that of FIG. 7C, and aren't redundantly described herein. Each pass-through unit 203a, 203b, 206a, 206b of the first and second pass-through modules 203, 206 includes a housing, a first bi-directional switch circuit, a second bi-directional switch circuit, a pass-through controller, at least a first connecting terminal, at least a second connecting terminal and at least a third connecting terminal. The first connecting terminals of the pass-through units 203a, 203b of the first pass-through module 203 are coupled to the output terminals of the power supplies 201a, 202a of the first power management subsystem 20-1, respectively. Similarly, the first connecting terminals of the pass-through units 206a, 206b of the second pass-through module 206 are coupled to the output terminals of the power supplies 204a, 205a of the second power management subsystem 20-2, respectively. The second connecting terminals of the two pass-through units 203a and 203b of the first pass-through module 203 are coupled together via an external power cable 203c as shown in FIG. 10C. Similarly, the second connecting terminals of the two pass-through units 206a and 206b of the second pass-through module 206 are coupled together via an external power cable 206c as shown in FIG. 10C. The third connecting terminal of the pass-through unit 203b of the first pass-through module 203 and the third connecting terminal of the pass-through unit 206a of the second pass-through module 206 are coupled together via an external power cable 207.

The first bi-directional switch circuit of each pass-through unit 203a, 203b, 206a, 206b is electrically connected between the first connecting terminal and the second connecting terminal of the pass-through unit 203a, 203b, 206a, 206b and coupled to the pass-through controller. The second bi-directional switch circuit of each pass-through unit 203a, 203b, 206a, 206b is electrically connected between the first connecting terminal and the third connecting terminal of the pass-through unit 203a, 203b, 206a, 206b and coupled to the pass-through controller. The power system control unit 21 can issue a control signal S to the pass-through controllers of the pass-through units 203a, 203b, 206a, 206b so as to control the operations of the first and second bi-directional switch circuits of the pass-through units 203a, 203b, 206a, 206b.

The pass-through controller of each pass-through unit 203a, 203b, 206a, 206b of the first and second pass-through modules 203, 206 is coupled to the first bi-directional switch circuit, the second bi-directional switch circuit of each pass-through unit 203a, 203b, 206a, 206b and the power system control unit 21 for issuing the information about the power flow, receiving the control signal S from the power system control unit 21 and controlling the operations of the first and second bi-directional switch circuits of each pass-through unit 203a, 203b, 206a, 206b so as to control the power delivery directions. The pass-through controller can obtain the information of power flow by using plural sensors to sense the voltage. The power system control unit 21 of the power management system 2 can communicate with the power supply controllers of the power supplies 201a, 202a, 204a, 205a and the pass-through controllers of the pass-through units 203a, 203b, 206a, 206b of the first and second power management subsystems 20-1, 20-2.

The operations between the power modules 201, 202 and the first pass-through module 203 of the first power management subsystem 20-1 as shown in FIGS. 10A~10C are similar to that of the power management subsystem of FIGS. 9A~9C, and aren't redundantly described herein. The operations between the power modules 204, 205 and the second pass-through module 206 of the second power management subsystem 20-2 as shown in FIGS. 10A~10C are also similar to that of the power management subsystem of FIGS. 9A~9C, and aren't redundantly described herein. The operations among the power modules 201, 202, 204, 205, the pass-through module 203, 206, and the plural loads as shown in FIGS. 10A~10C are similar to that of the power management subsystem of FIGS. 9A~9C, and aren't redundantly described herein.

In addition to the improvement on efficiency, the network now has only 4 ac line cords rather than 8 ac line cords on the 4 stand alone servers. Less number of line cords greatly reduce the task of cable management behind the servers in the server rack due to clutter and heat blocking of the line cords.

It also expects to reduce system cost and improve system reliability. The pass-through unit is expected to be simpler to design and lower cost due to its non-power processing function comparing with a power supply.

Figure 11A:
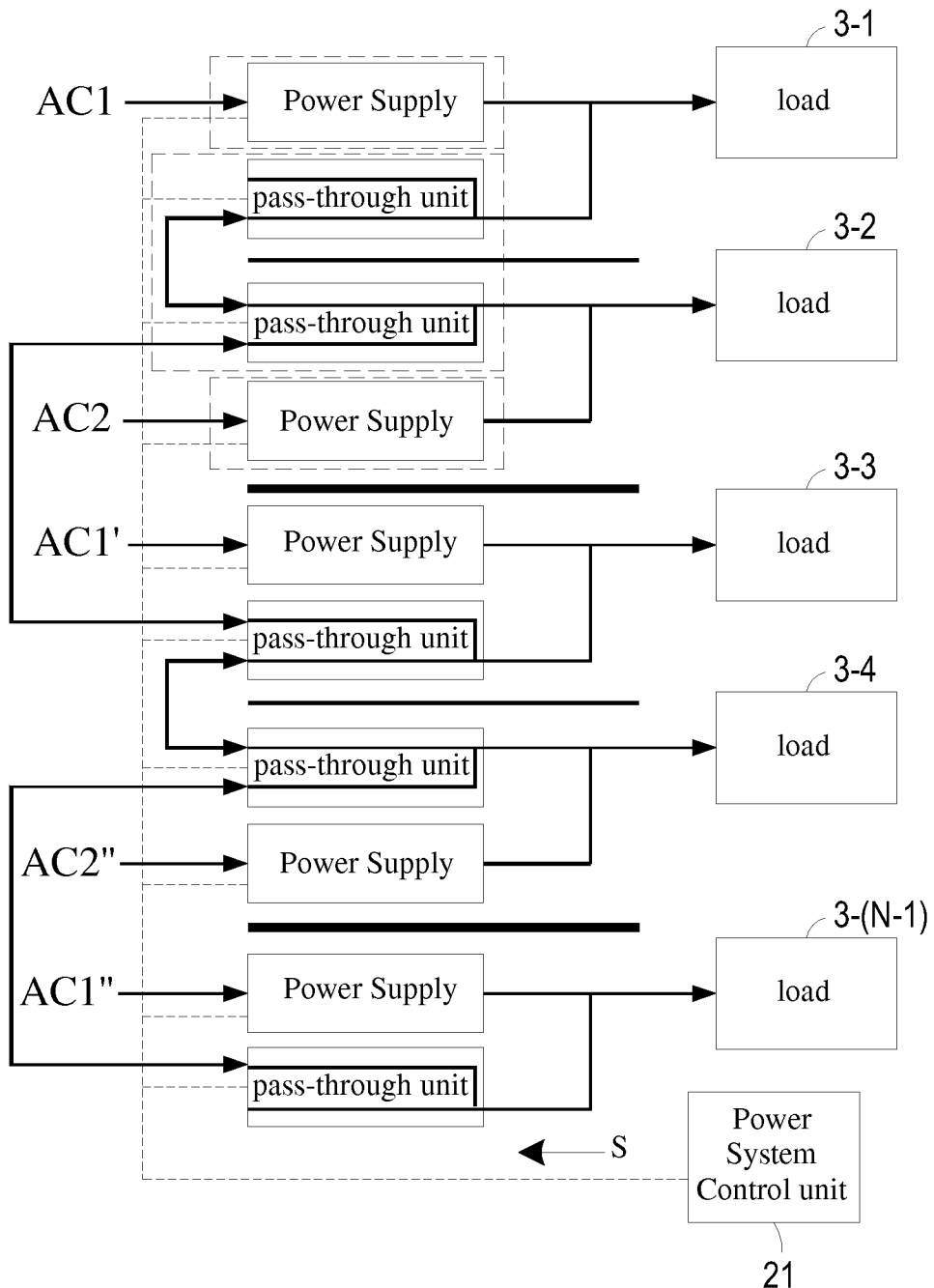
FIGS. 11A and 11B show network power sharing arrangement with the power management subsystems of FIGS. 9A~9C according to the present invention.
Figure 11B:
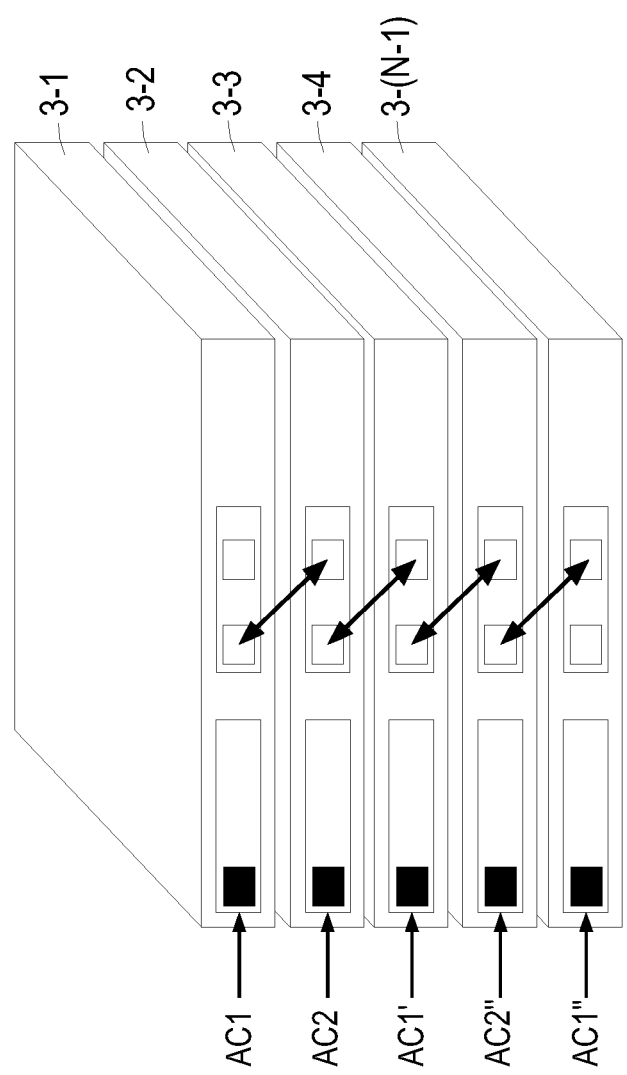

FIGS. 11A and 11B show network power sharing arrangement with the power management subsystems of FIGS. 9A~9C according to the present invention. The operations, functions and structures of the power management subsystem are similar to that of FIGS. 9A~9C, and aren't redundantly described herein. The power network uses half of number power supplies and line cords while provides higher efficiency.

Figure 12A:
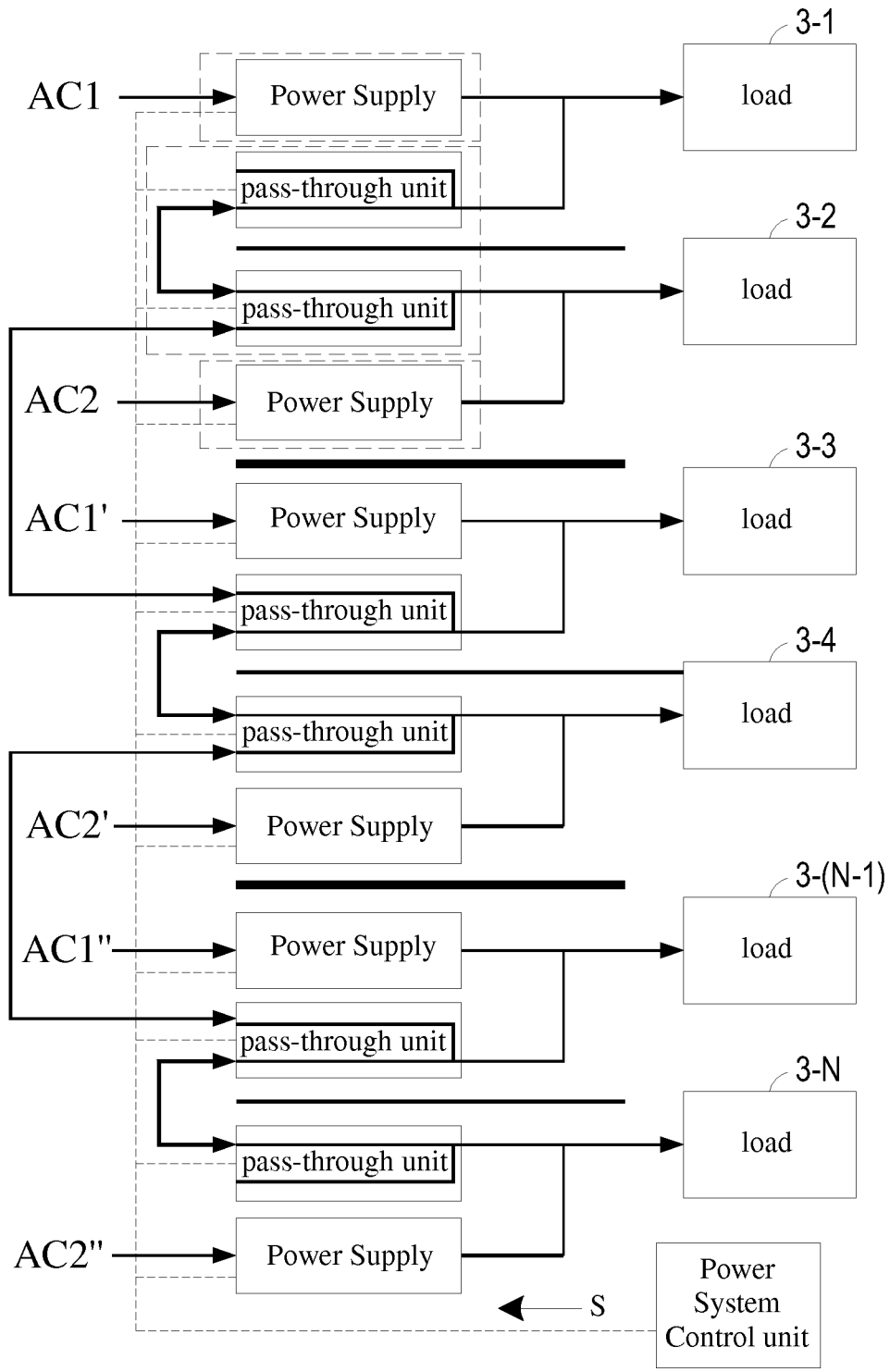
FIGS. 12A and 12B show network power sharing arrangement with the power management subsystems of FIGS. 10A~10C according to the present invention.
Figure 12B:
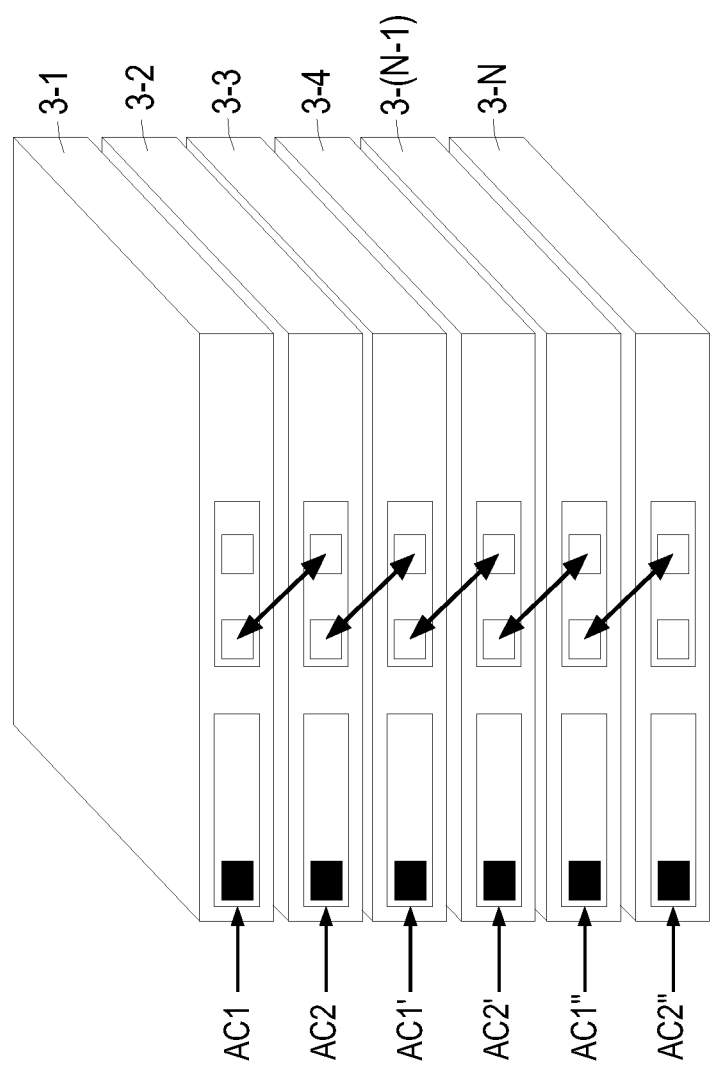

FIGS. 12A and 12B show network power sharing arrangement with the power management subsystems of FIGS. 10A~10C according to the present invention. The operations, functions and structures of the power management subsystem are similar to that of FIGS. 10A~10C, and aren't redundantly described herein. The power network uses half of number power supplies and line cords while provides higher efficiency.

Figure 13A:
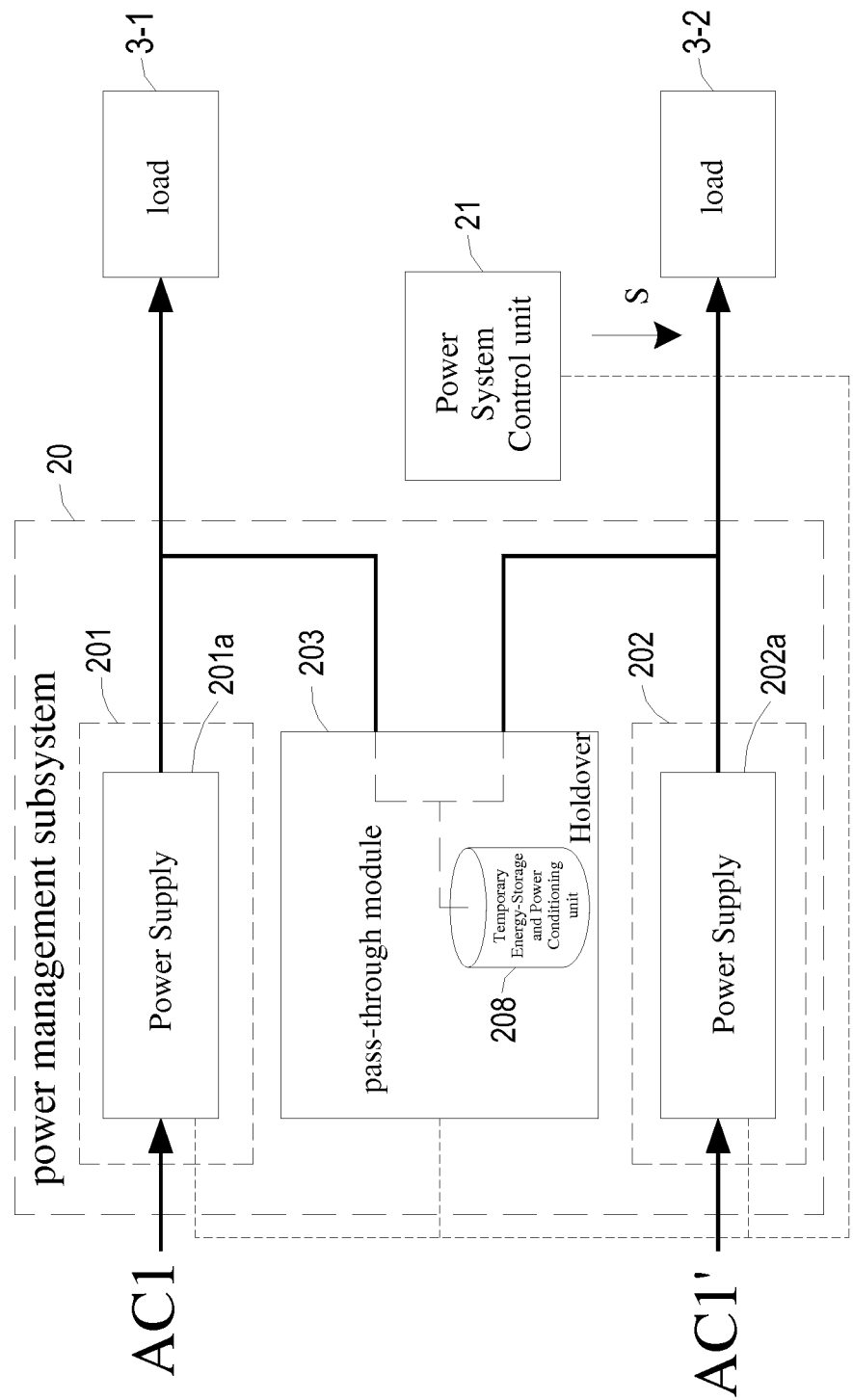
FIG. 13A schematically illustrates a power management system capable of saving power and optimizing operating efficiency of power supplies for providing power with back-up or redundancy to plural loads according to a seventh preferred embodiment of the present invention.

With power sharing arrangement, adding "Temporary Energy Storage and Power Conditioning" as holdover functions (i.e. combine pass through functions, energy storage and power conditioning functions and provides efficiency optimization capability), one power supply and one source can support at least two loads. The total combined power does not exceed 1 rated power supply. FIG. 13A schematically illustrates a power management system 2 capable of saving power and optimizing operating efficiency of power supplies for providing power with back-up or redundancy to plural loads according to a seventh preferred embodiment of the present invention. As shown in FIG. 13A, the power management system 2 includes at least one power management subsystem 20, a power system control unit 21 and a plurality of loads. The power management subsystem 20 includes two power modules 201, 202, at least one temporary energy-storage and power conditioning unit 208, and a pass-through module 203. Each power module 201, 202 includes at least one power supply 201a, 202a, and the pass-through module 203 is electrically coupled between the output terminals of two power modules 201, 202 for providing a uni-directional or bi-directional conducting path in response to a control signal S. The temporary energy-storage and power conditioning unit 208 is electrically coupled between the output terminals of two power modules 201, 202 for conditioning power and optimizing the power efficiency of the power modules 201, 202. The power system control unit 21 is coupled to the pass-through module 203 for providing the control signal S to the pass-through module 203 and controlling the operations of turn on and turn off and the power delivery directions of the pass-through module 203 so as to enhance the power efficiency of the power management subsystem 20 and provide reliability.

When the power supplies 201a and 202a of two power modules 201, 202 are normal and their input voltages are normally provided from external power sources AC1 and AC1' (AC1 and AC1' can be same or different power source), the power system control unit 21 receives the information from the power supplies 201a, 202a and the information from the pass-through module 203 and issue a control signal S to the pass-through module 203 and the power supplies 201a, 202a to turn off the pass-through module 203, allow the power supply 201a to supply power to the first load 3-1 and allow the power supply 202a to supply power to second load 3-2, respectively. Namely, the first load 3-1 is powered by power supply 201a, the second load 3-2 is powered by power supply 202a and pass-through module 203 is turned off. Therefore, each power supply 201a, 202a now operates at server's load of near 50% rated power supply which has 4% higher efficiency than stand alone server.

In addition, power redundancy for each load is preserved. In the event either one of the power supplies 201a, 202a fails or its input voltage from facility AC1, AC1' is lost, the remaining power supply 201a, 202a will be able to continue supporting both loads until the failed power supply 201a, 202a is serviced or the lost input voltage from facility AC1, AC1' is restored. For example, when the power supply 201a fails and/or its input voltage from facility AC1 is lost, the power system control unit 21 receives the information from the power supplies 201a, 202a and the information from the pass-through module 203 and issue a control signal S to the pass-through module 203 and the power supplies 201a, 202a to control the power delivery directions of the pass-through module 203 so that the power delivered form the output terminal of the power supply 202a can pass through the pass-through module 203 and flow toward the first load 3-1 so as to provide power to the first load 3-1 and enhance the efficiency of the power supply 202a. Therefore, the power supply 202a will be able to continue supporting both loads 3-1, 3-2 until the failed power supply 201a is serviced or the lost input voltage from facility AC1 is restored. When the power supply 202a fails and/or its input voltage from facility AC1' is lost, the power system control unit 21 receives the information from the power supplies 201a, 202a and the information from the pass-through module 203 and issue a control signal S to the pass-through module 203 and the power supplies 201a, 202a to control the power delivery directions of the pass-through module 203 so that the power delivered form the output terminal of the power supply 201a can pass through the pass-through module 203 and flow toward the second load 3-2 so as to provide power to the second load 3-2 and enhance the efficiency of the power supply 201a. Therefore, the power supply 201a will be able to continue supporting both loads 3-1, 3-2 until the failed power supply 202a is serviced or the lost input voltage from facility AC1' is restored.

Even pass-through module 203 fails, with mechanism to disconnect itself from the power supply outputs, each load will continue to be supported by its own power supply 201a, 202a.

Figure 13B:
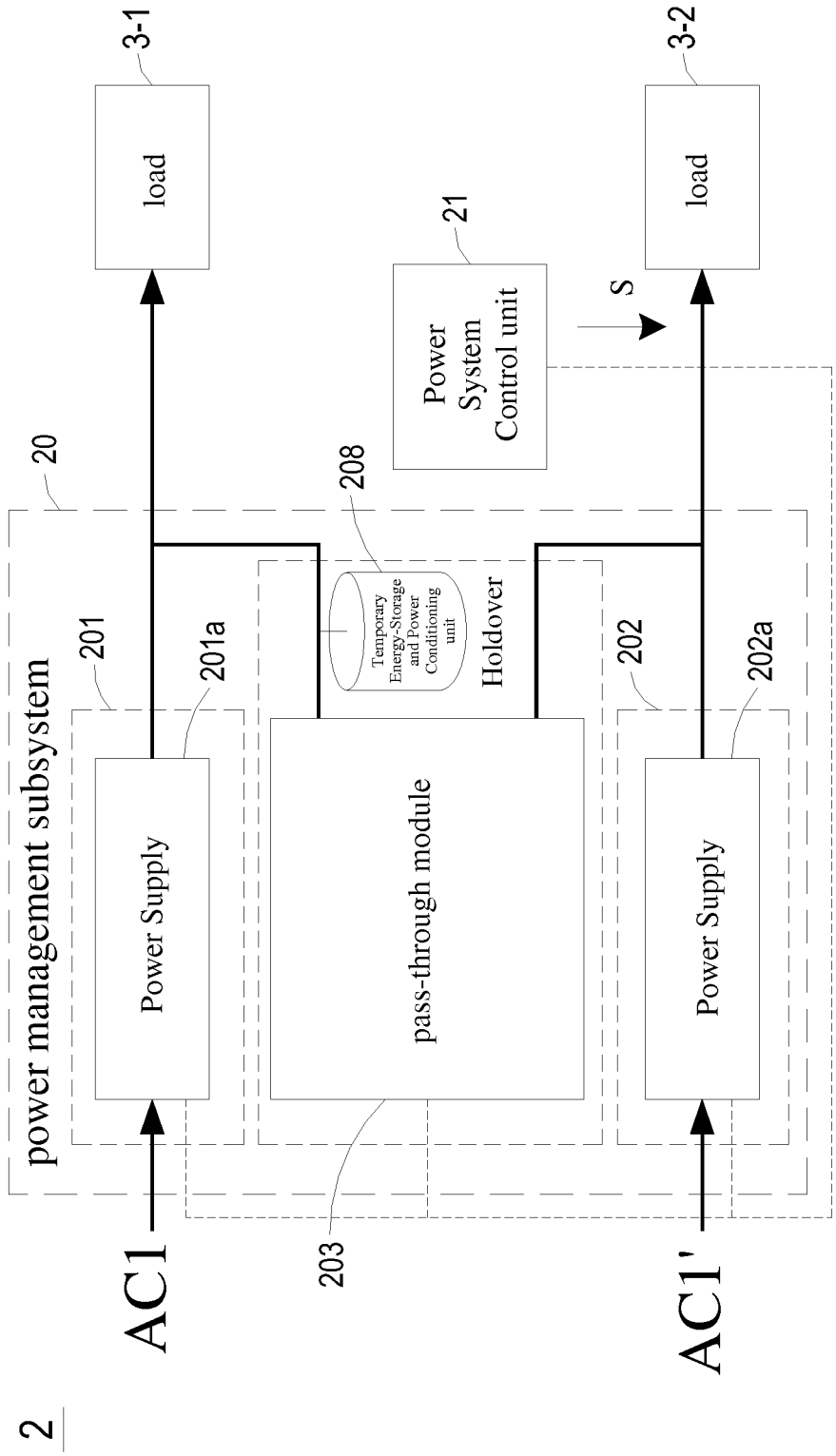
FIGS. 13B and 13C schematically show the temporary energy-storage and power conditioning unit disposed in different positions according to the power management system of FIG. 13A.
Figure 13C:
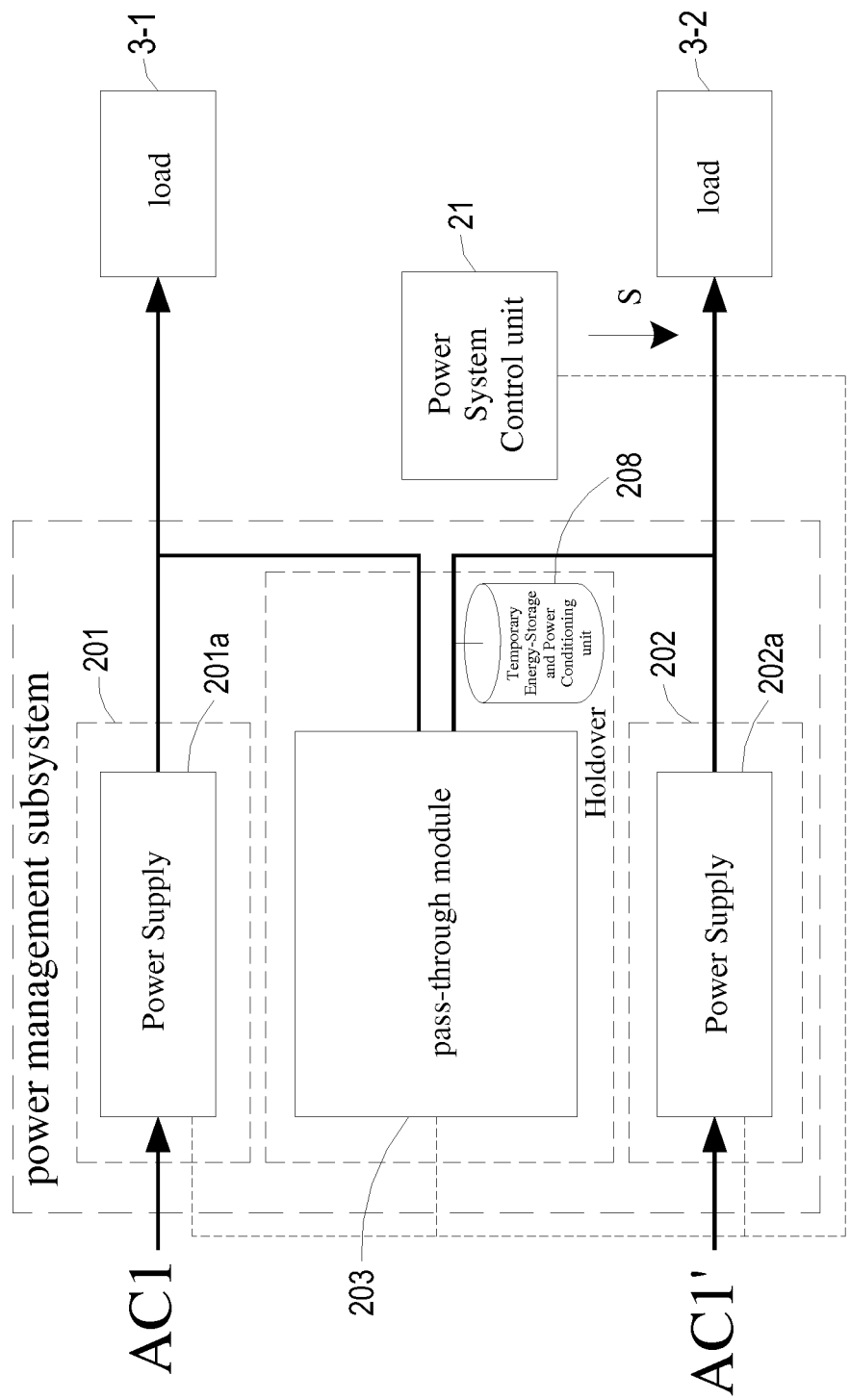

The temporary energy-storage and power conditioning unit 208 is electrically coupled between the output terminals of the two power modules 201, 202 for conditioning power and optimizing the power efficiency of the power modules 201, 202. In an embodiment, the temporary energy-storage and power conditioning unit 208 is disposed in the pass-through module 203 and electrically coupled to the bi-directional conducting path inside the pass-through module 203. Alternatively, in another embodiment, the temporary energy-storage and power conditioning unit 208 is separated from and disposed by the pass-through module 203 and electrically coupled to the bi-directional conducting path between the output terminal of the power module 201 and the first connecting terminal of the pass-through module 203, as shown in FIG. 13B. Alternatively, in some embodiment, the temporary energy-storage and power conditioning unit 208 is separated from and disposed by the pass-through module 203 and electrically coupled to the bi-directional conducting path between the output terminal of the power module 202 and the first connecting terminal of the pass-through module 203, as shown in FIG. 13C.

Taking the temporary energy-storage and power conditioning unit of FIG. 13A for example, the energy storage device of the temporary energy-storage and power conditioning unit can be any component/device that can store energy, for example capacitors, batteries, supercapacitors, flywheels, fuel cells, etc. The temporary energy-storage and power conditioning unit as shown in FIG. 13A is controlled by the pass-through module 203 and/or the power system control unit 21. Comparing with the power system of FIGS. 3A and 3B, when server 1a, 1b is operating in light load of 25% or less, in the power supply redundant mode, the load for each power supply would drop to 12.5% load, which would further lower the power supply efficiency toward about 79% or less. However, the power management system 2 of FIG. 13A according to the present invention, when the power system control unit 21 receive the information that the first load 3-1 and/or the second load 3-2 is operating in light load of for example 25% or less, the power system control unit 21 issue the control signal S to the power supply 202a and the pass-through module 203 so that the power supply 202a is turned off in response to the control signal S and power delivery directions of the pass-through module 203 is controlled to allow the power delivered from the power supply 201a to pass through the pass-through module 203 and provide to the second load 3-2. When the power supply 201a fails or its input voltage from the facility AC1 is lost, the temporary energy-storage and power conditioning unit 208 is controlled to operate in response to the control signal S from the power system control unit 21 so as to provide stored power to both of the first load 3-1 and second load 3-2. The temporary energy-storage and power conditioning unit 208 can support both loads 3-1, 3-2 long enough for the power supply 202a, which has been turned off, to be turned back on and able to support both loads 3-1, 3-2. The power supply 202a will be able to continue supporting both loads 3-1, 3-2 until the failed power supply 201a is serviced or its lost input voltage from facility AC1 is restored.

Alternatively, the temporary energy-storage and power conditioning unit 208 can also be employed to optimize operating efficiency of the power modules 201, 202. For example, when the power system control unit 21 receive the information that the first load 3-1 and/or the second load 3-2 is operating in light load of for example 25% or less, the power system control unit 21 issues the control signal S to the power supplies 201a, 202a and the pass-through module 203 so that the power supplies 201a and 202a continuously supply power to the first load 3-1 and the second load 3-2, respectively, and the power delivery directions of the pass-through module 203 is controlled to allow the power delivered from the power supply 201a to pass through the pass-through module 203 to charge the energy storage device of the temporary energy-storage and power conditioning unit 208 and the power delivered from the power supply 202a to pass through the pass-through module 203 to charge the energy storage device of the temporary energy-storage and power conditioning unit 208. Therefore, the operating efficiency of the power supplies 201a, 202a can be enhanced due to the increase of output for charging the energy storage device of the temporary energy-storage and power conditioning unit 208. When at least one of the power supplies 201a, 202a fails or its input power is lost, the power system control unit 21 issues the control signal S to the power supplies 201a, 202a and the pass-through module 203 so that the power delivery directions of the pass-through module 203 is controlled in response to the control signal S, the remaining power supply (201a or 202a) continuously supply power to both loads 3-1 and 3-2, and the energy storage device of the temporary energy-storage and power conditioning unit 208 releases the stored energy and conditions power to the load. When both of the power supplies 201a, 202a fails or their input voltages from the facility AC1, AC1' are lost, the temporary energy-storage and power conditioning unit 208 is controlled to operate in response to the control signal S from the power system control unit 21 so as to provide stored power to both of the first load 3-1 and the second load 3-2. The temporary energy-storage and power conditioning unit 208 can support both loads long enough until the failed power supplies 201a and 202a are serviced or their lost input voltages from facility AC1, AC1' are restored.

Figure 14A:
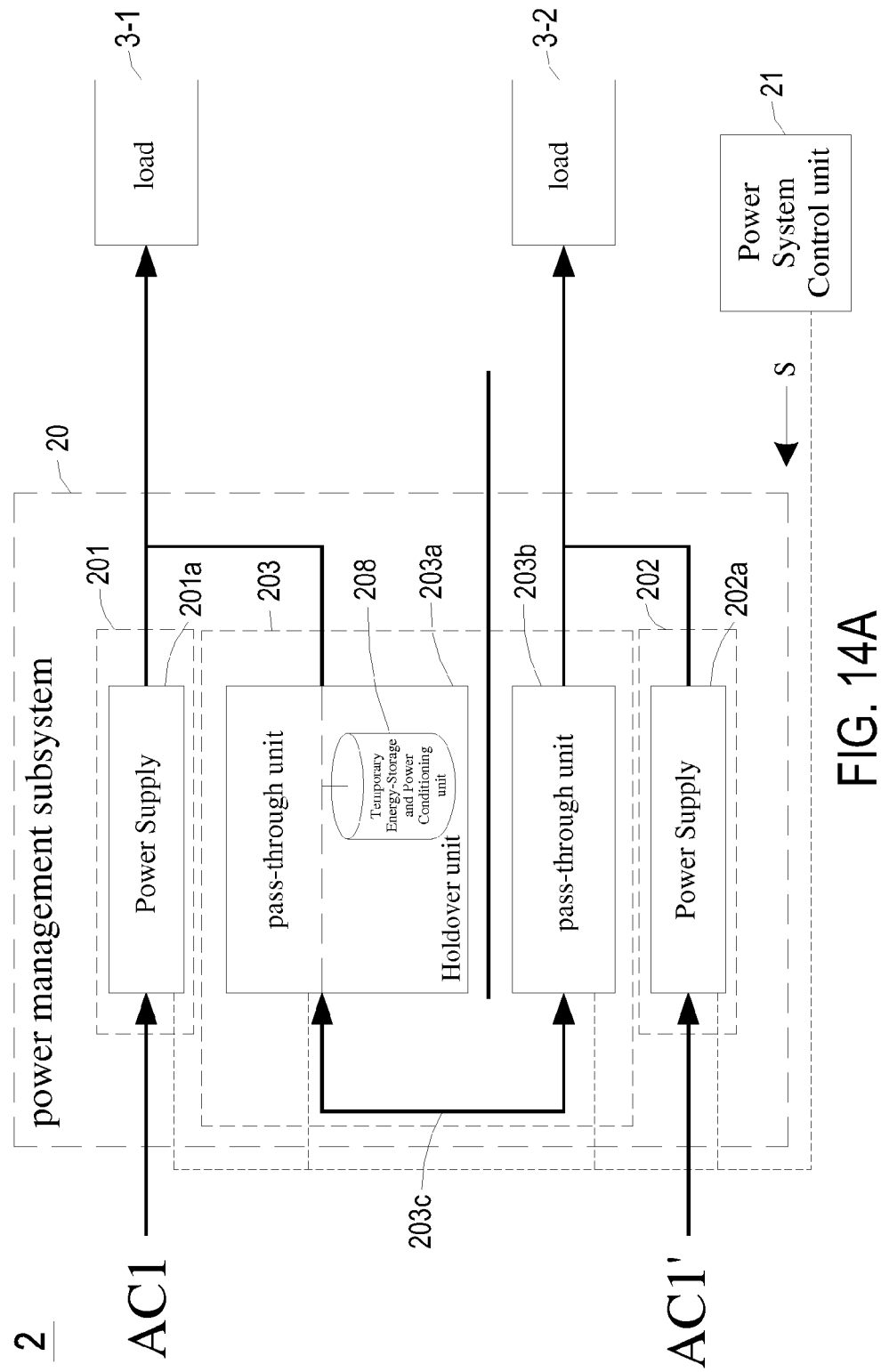
FIG. 14A schematically illustrates a power management system capable of saving power and optimizing operating efficiency of power supplies for providing power with back-up or redundancy to plural loads according to an eighth preferred embodiment of the present invention.
Figure 14B:
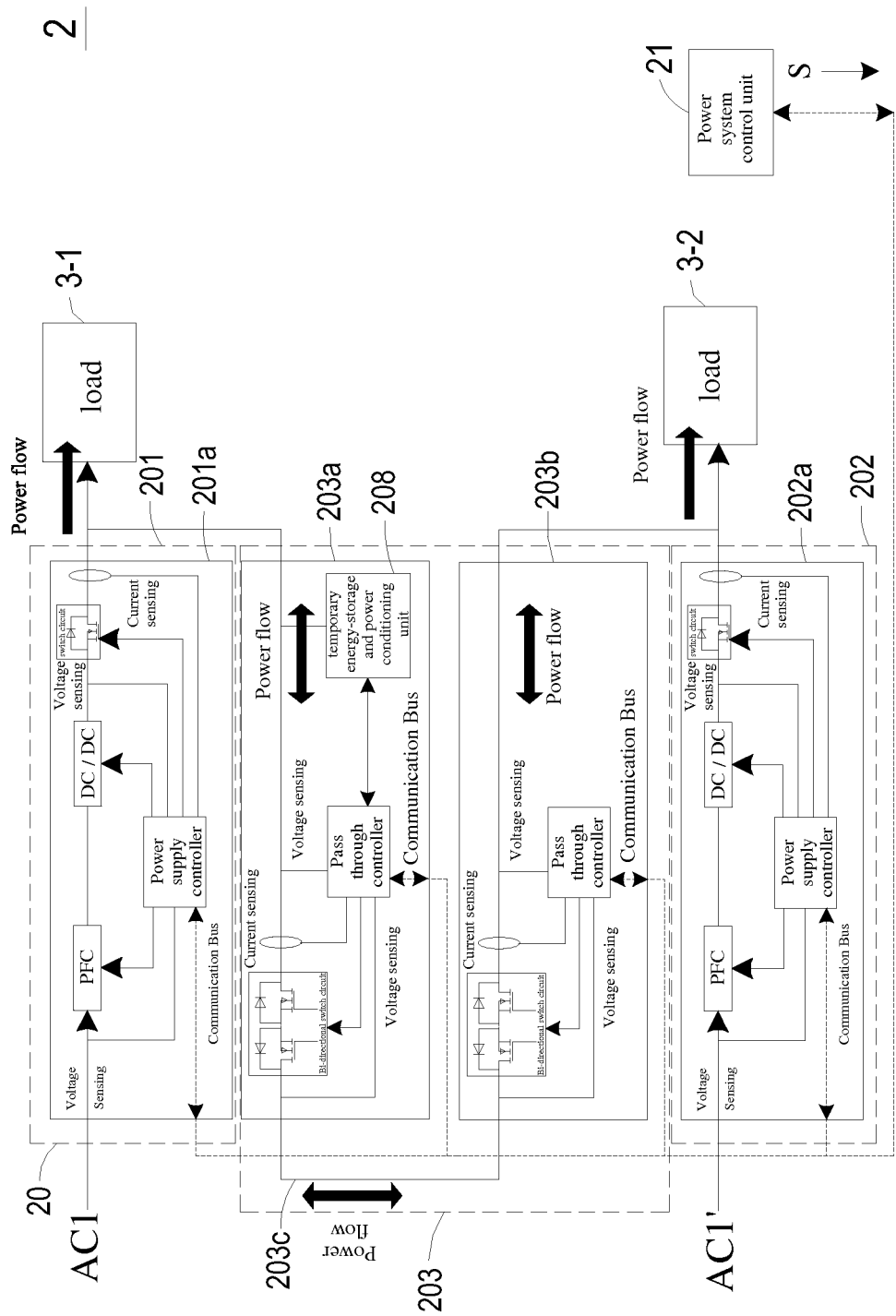
FIG. 14B shows a circuit block diagram of FIG. 14A.

FIG. 14A schematically illustrates a power management system capable of saving power and optimizing operating efficiency of power supplies for providing power with backup or redundancy to plural loads according to an eighth preferred embodiment of the present invention. FIG. 14B shows a circuit block diagram of FIG. 14A. As shown in FIGS. 14A~14B, the power management system 2 includes at least one power management subsystem 20, a power system control unit 21 and a plurality of loads. The power management subsystem 20 includes two power modules 201, 202, at least one temporary energy-storage and power conditioning unit 208, and a pass-through module 203. Each power module 201, 202 includes at least one power supply 201a, 202a, and the pass-through module 203 is electrically coupled between the output terminals of two power modules 201, 202 for providing a uni-directional or bi-directional conducting path in response to a control signal S. The temporary energy-storage and power conditioning unit 208 is electrically coupled between the output terminals of two power modules 201, 202 for conditioning power and optimizing the power efficiency of the power modules 201, 202. The power system control unit 21 is coupled to the pass-through module 203 for providing the control signal S to the pass-through module 203 and controlling the operations of turn on and turn off and the power delivery directions of the pass-through module 203 so as to enhance the power efficiency of the power management subsystem 20 and provide reliability.

Two power modules of the power management subsystem 20, for example a first power module 201 and a second power module 202, are employed for providing power to a corresponding load, for example the first load 3-1 and the second load 3-2. The operations, functions and structures of the power management subsystem 20 is similar to that of FIGS. 7A~7E, and aren't redundantly described herein.

As shown in FIGS. 14A~14B, the first power modules 201 and the second power module 202 include power supplies 201a, 202a, respectively, and the pass-through module 203 includes two pass-through units 203a and 203b. Generally, each of the power supplies 201a, 202a can be for example any single-stage or multi-stage, isolated or non-isolated ac/dc or dc/dc converter. Comparing with the power system as shown in FIG. 3, one hot-swappable power supply from each server, for example 1b and 1c, are removed and replaced with one hot-swappable pass-through unit, for example 203a and 203b. For simplicity purposes, a pass-through unit 203a, 203b is a straight electrical connection from the output of the power supply 201a to that of the power supply 202a.

As shown in FIG. 14A, the power supply 201a has an output terminal and the pass-through unit 203 has a first connecting terminal directly connected to the output terminal of the power supply 201a. The power supply 201a and pass-through unit 203a are connected together through the same connector inside the casing of the first load 3-1. In addition, the power supply 202a has an output terminal and the pass-through unit 203b has a first connecting terminal directly connected to the output terminal of the power supply 202a. The power supply 202a and pass-through unit 203b are connected together through the same connector inside the casing of the second load 3-2.

Each of the Pass-Through units 203a and 203b has a second connecting terminal opposite to the first connecting terminal. The pass-through units 203a and 203b are connected together by an external power cable 203c between their second connecting terminals. By connecting the two loads' power modules 201, 202 together, a power network for two loads 3-1, 3-2 is created.

As shown in FIGS. 14A and 14B, each power supply 201a, 202a includes, but not limited to, a PFC, a DC/DC converter, a switch circuit and a power supply controller. The operations, functions and structures of the power supply 201a, 202a are similar to that of FIG. 7C, and aren't redundantly described herein. In an embodiment, each pass-through unit 203a, 203b includes a housing, at least one conducting path, at least a bi-directional switch circuit, a pass-through controller, a first connecting terminal and a second connecting terminal. The first connecting terminals of the pass-through units 203a, 203b are coupled to the output terminals of the power supplies 201a, 202a, respectively. The second connecting terminals of the two pass-through units 203a and 203b are coupled together via an external power cable 203c. The bi-directional switch circuit of the pass-through unit 203a is electrically connected between the first connecting terminal and the second connecting terminal for selectively allowing the power delivered form the output terminal of the power supply 201a to pass through the pass-through unit 203a and flow to the pass-through unit 203b via the external power cable 203c so as to provide power to the second load 3-2 and enhance the power efficiency of the power supply 201a and selectively allowing the power delivered form the output terminal of the power supply 202a to pass through the pass-through unit 203b and flow to the pass-through unit 203a via the external power cable 203c so as to provide power to the first load 3-1 and enhance the power efficiency of the power supply 202a. The pass-through controller of each pass-through unit 203a, 203b is coupled to the bi-directional switch circuit and the power system control unit 21 of the power management system 2 for issuing the information about the power flow, receiving the control signal S from the power system control unit 21 and controlling the operations of the bi-directional switch circuit so as to control the power delivery directions between the two power modules 201, 202. The pass-through controller can obtain the information of power flow by using plural sensors to sense the voltage. The power system control unit 21 of the power management system 2 can communicate with the power supply controller of the power supply 201a, 202a and the pass-through controller of the pass-through unit 203a, 203b. In other embodiment, one of the pass-through units 203a, 203b includes only one power cable having a first connecting terminal and a second connecting terminal (not shown), and the other of the pass-through units 203a, 203b includes a bi-directional switch circuit, a pass-through controller, a first connecting terminal and a second connecting terminal.

When the power supplies 201a and 202a are normal and their input voltages AC1, AC1' are normally provided from external power source, the power system control unit 21 will receive the information from the power supply controllers and the information from the pass-through controllers and issue a control signal S to the pass-through controllers and the power supply controllers to turn off the bi-directional switch of the pass-through units 203a, 203b, allow the power supply 201a to supply power to the first load 3-1 and allow the power supply 202a to supply power to the second load 3-2. Namely, the first load 3-1 is powered by power supply 201a, the second load 3-2 is powered by power supply 202a and pass-through module 203 is turned off. Therefore, each power supply 201a, 202a now operates at server's load of near 50% rated power supply which has 4% higher efficiency than stand alone server.

In addition, power redundancy for each load is preserved. In the event either one of the power supplies 201a, 202a fails or its input voltage from facility AC1, AC1' is lost, the remaining power supply 201a, 202a will be able to continue supporting both loads 3-1, 3-2 until the failed power supply 201a, 202a is serviced or the lost input voltage from facility AC1, AC1' is restored. For example, when the power supply 201a, 202a fails and/or its input voltage from facility AC1, AC1' is lost, the power system control unit 21 will receive the information from the power supply controllers and the information from the pass-through controllers and issue a control signal S to the pass-through controllers and the power supply controllers to turn on the bi-directional switches and control the power delivery directions so that the power delivered form the output terminal of the power supply 202a can pass through the pass-through unit 203b and flow to the pass-through unit 203a via the external power cable 203c so as to provide power to the first load 3-1 and enhance the power efficiency of the power supply 202a. Therefore, the power supply 202a will be able to continue supporting both loads 3-1, 3-2 until the failed power supply 201a is serviced or the lost input voltage from facility AC1 is restored. When the power supply 202a fails and/or its input voltage from facility AC1' is lost, the power system control unit 21 will receive the information from the power supply controllers and the information from the pass-through controllers and issue a control signal S to the pass-through controllers and the power supply controllers to turn on the bi-directional switches and control the power delivery directions so that the power delivered form the output terminal of the power supply 201a can pass through the pass-through unit 203a and flow to the pass-through unit 203b via the external power cable 203c so as to provide power to the second load 3-2 and enhance the power efficiency of the power supply 201a. Therefore, the power supply 201a will be able to continue supporting both loads until the failed power supply 202a is serviced or the lost input voltage from facility AC1' is restored.

Either pass-through unit 203a or pass-through unit 203b fails, with mechanism to disconnect itself from the power supply outputs, each load 3-1, 3-2 will continue to be supported by its own power supply 201a, 202a.

In addition to the approximate 4% improvement on efficiency, the network now has only 2 ac line cords rather than 4 ac line cords on the 2 stand alone servers. Less number of line cords greatly reduces the task of cable management behind the servers in the server rack due to clutter and heat blocking of the line cords. It also expects to reduce system cost and improve system reliability. The pass-through unit is expected to be simpler to design and lower cost due to its non-power processing function comparing with a power supply.

Figure 15A:
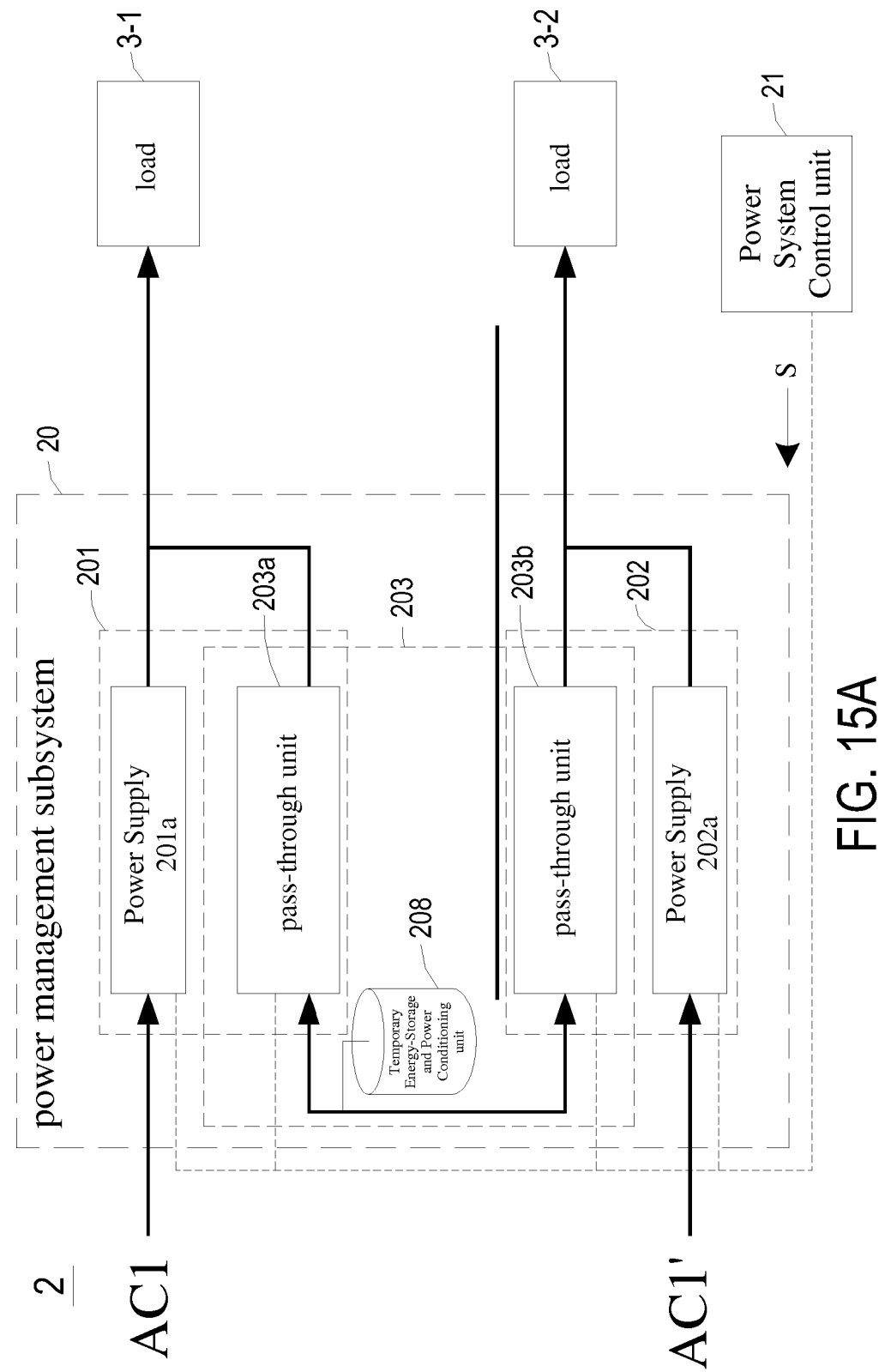
FIGS. 15A~15C schematically show the temporary energy-storage and power conditioning unit disposed in different positions according to the power management system of FIG. 14A.
Figure 15B:
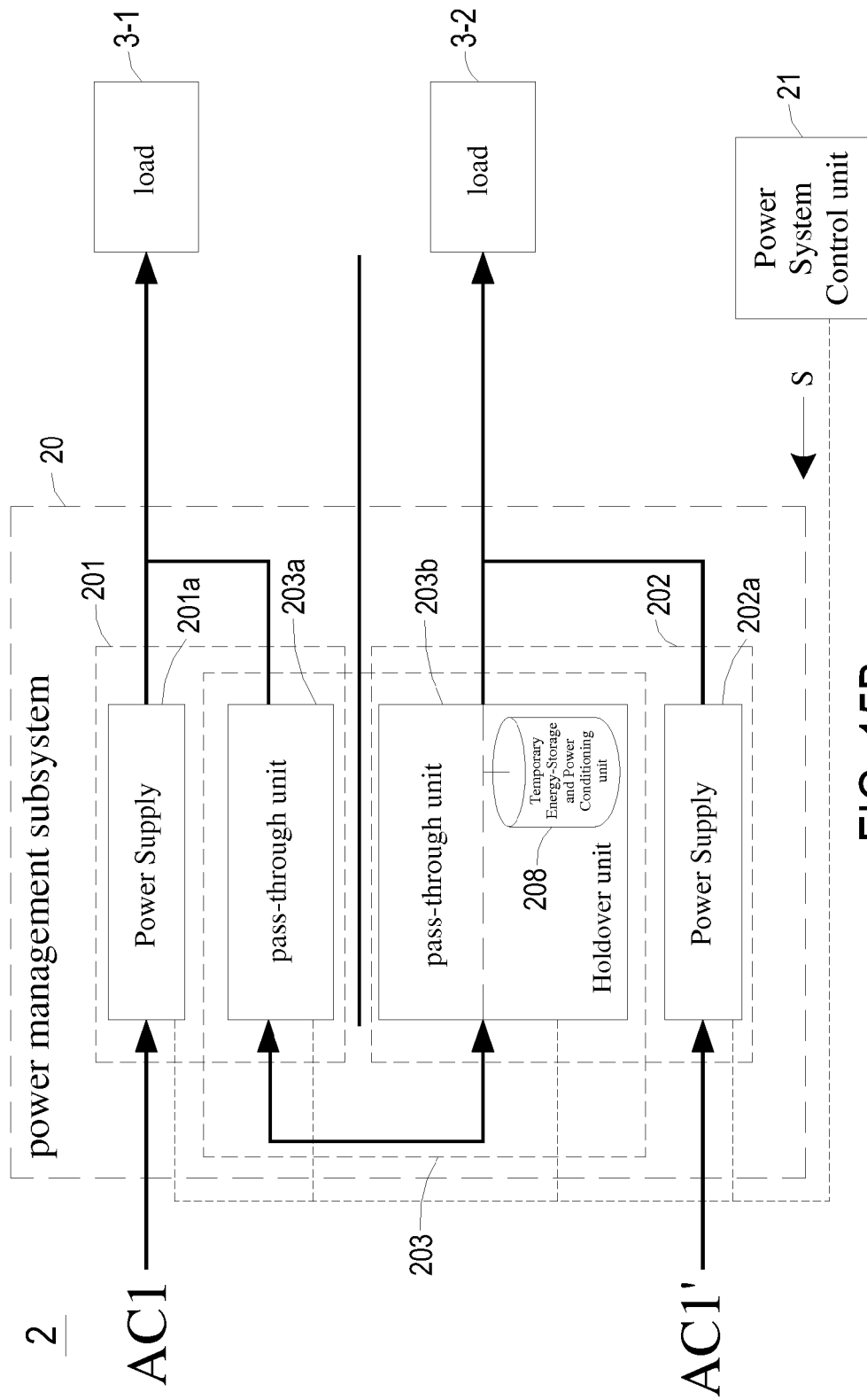
Figure 15C:
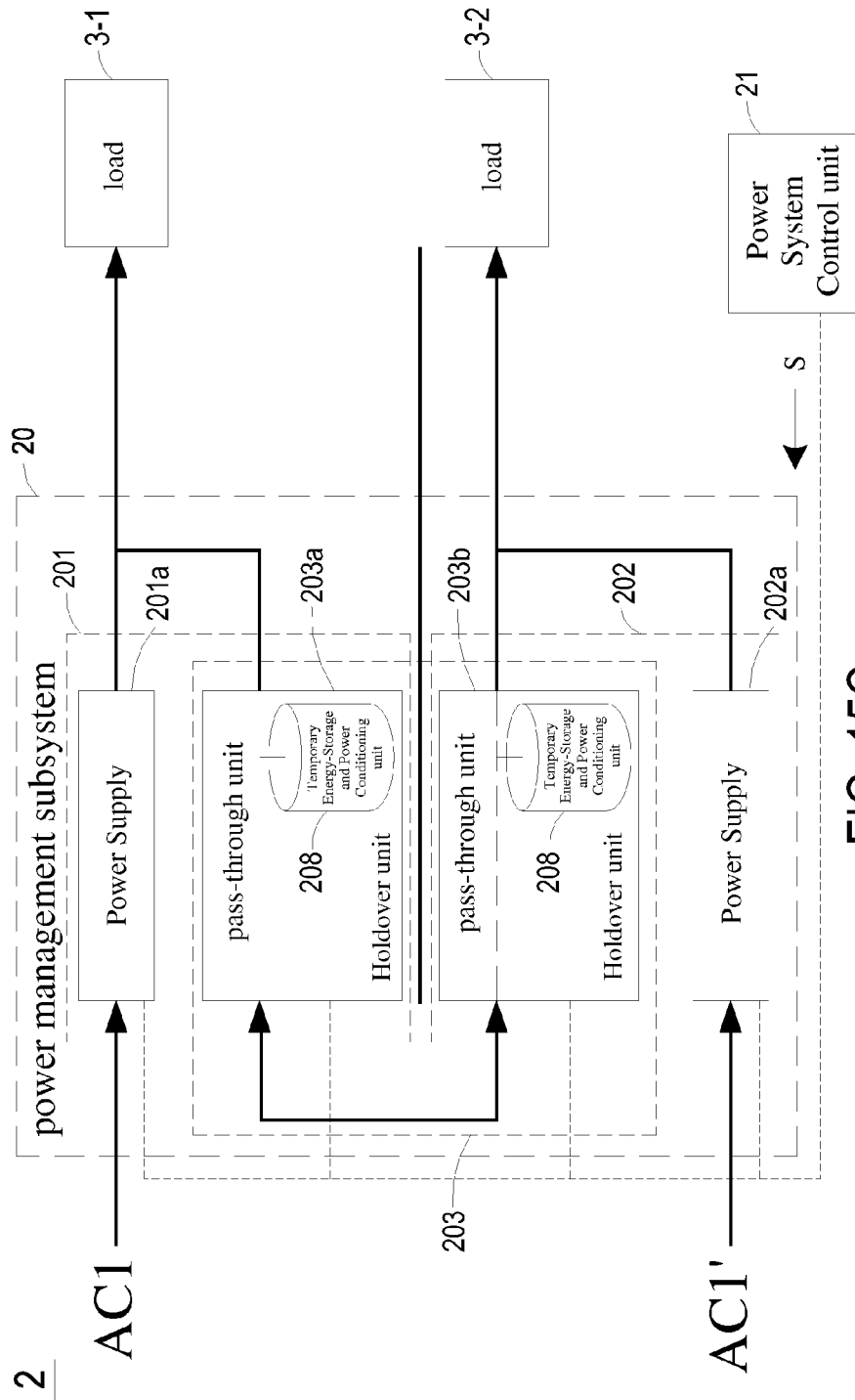

Please refer to FIGS. 14A and 14B again. The temporary energy-storage and power conditioning unit 208 is disposed in the pass-through unit 203a of the pass-through module 203 and electrically coupled to the bi-direction conducting path within the pass-through unit 203a and between the first connecting terminal and the second connecting terminal of the pass-through unit 203a for conditioning power and optimizing the power efficiency of the power modules 201, 202. Alternatively, in an embodiment, the temporary energy-storage and power conditioning unit 208 is separated from and disposed by the pass-through unit 203a and the pass-through unit 203b of the pass-through module 203 and electrically coupled to the bi-direction conducting path between the second connecting terminal of the pass-through unit 203a and the second connecting terminal of the pass-through unit 203b for conditioning power and optimizing the power efficiency of the power modules 201, 202, as shown in FIG. 15A. Alternatively, in another embodiment, the temporary energy-storage and power conditioning unit 208 is disposed in the pass-through unit 203b of the pass-through module 203 and electrically coupled to the bi-direction conducting path within the pass-through unit 203b and between the first connecting terminal and the second connecting terminal of the pass-through unit 203b for conditioning power and optimizing the power efficiency of the power modules 201, 202, as shown in FIG. 15B. Alternatively, in some embodiment, two temporary energy-storage and power conditioning units 208 are respectively disposed in the pass-through units 203a and 203b of the pass-through module 203. Each of the two temporary energy-storage and power conditioning units 208 is electrically coupled to the bi-direction conducting path within its pass-through unit 203a, 203b and between the first connecting terminal and the second connecting terminal of its pass-through unit 203a, 203b for conditioning power and optimizing the power efficiency of the power modules 201, 202, as shown in FIG. 15C.

Taking the temporary energy-storage and power conditioning unit of FIGS. 14A and 14B for example, the energy storage device of the temporary energy-storage and power conditioning unit can be any component/device that can store energy, for example capacitors, batteries, supercapacitors, flywheels, fuel cells, etc. The temporary energy-storage and power conditioning unit as shown in FIG. 14B is controlled by the pass-through controller of the pass-through module 203 and/or the power system control unit 21 and/or the power supply controllers of the power supplies 201a, 202a (not shown). Comparing with the power system of FIG. 3, when server 1a, 1b is operating in light load of 25% or less, in the power supply redundant mode, the load for each power supply would drop to 12.5% load, which would further lower the power supply efficiency toward about 79% or less. However, the power management system 2 of FIGS. 14A and 14B according to the present invention, when the power system control unit 21 receive the information that the first load 3-1 and/or second load 3-2 is operating in light load of for example 25% or less, the power system control unit 21 issue the control signal S to the power controllers of the power supplies 201a and 202a and the pass-through controllers of the pass-through units 203a, 203b so that the power supply 202a is turned off by the power supply controller in response to the control signal S and power delivery directions of the pass-through units 203a, 203b are controlled by the pass-through controller to allow the power delivered from the power supply 201a to pass through the pass-through module 203 and provide to the second load 3-2. When the power supply 201a fails or its input voltage from the facility AC1 is lost, the temporary energy-storage and power conditioning unit 208 is controlled to operate in response to the control signal S from the power system control unit 21 or the pass-through controller so as to provide stored power to both of the first load 3-1 and second load 3-2. Namely, the temporary energy-storage and power conditioning unit 208 can be served as an auxiliary power source. The temporary energy-storage and power conditioning unit 208 can support both loads 3-1, 3-2 long enough for the power supply 202a, which has been turned off, to be turned back on and able to support both loads 3-1, 3-2. The power supply 202a will be able to continue supporting both loads 3-1, 3-2 until the failed power supply 201a is serviced or its lost input voltage from facility AC1 is restored.

Alternatively, the temporary energy-storage and power conditioning unit 208 can also be employed to optimize operating efficiency of the power modules 201, 202. For example, when the power system control unit 21 receive the information that the first load 3-1 and/or the second load 3-2 is operating in light load of for example 25% or less, the power system control unit 21 issues the control signal S to the power supply controllers of the power supplies 201a, 202a and the pass-through controllers of the pass-through units 203a, 203b so that the power supplies 201a and 202a are controlled by the power supply controllers thereof to continuously supply power to the first load 3-1 and the second load 3-2, respectively, and the power delivery directions of the pass-through units 203a, 203b are controlled by the pass-through controllers to allow the power delivered from the power supply 201a to pass through the pass-through unit 203a to charge the energy storage device of the temporary energy-storage and power conditioning unit 208 and the power delivered from the power supply 202a to pass through the pass-through units 203b and 203a to charge the energy storage device of the temporary energy-storage and power conditioning unit 208. Therefore, the operating efficiency of the power supplies 201a, 202a can be enhanced due to the increase of output for charging the energy storage device of the temporary energy-storage and power conditioning unit 208. When at least one of the power supplies 201a, 202a fails or its input power is lost, the power system control unit 21 issues the control signal S to the power supply controllers of the power supplies 201a, 202a and the pass-through controllers of the pass-through units 203a, 203b so that the power delivery directions of the pass-through units 203a, 203b are controlled by the pass-through controllers in response to the control signal S, the remaining power supply (201a or 202a) is controlled by its power supply controller to continuously supply power to both loads 3-1 and 3-2 and the energy storage device of the temporary energy-storage and power conditioning unit 208 is controlled to release the stored energy and condition power to the load. When both of the power supplies 201a, 202a fails or their input voltages from the facility AC1, AC1' are lost, the temporary energy-storage and power conditioning unit 208 is controlled to operate in response to the control signal S from the power system control unit 21 so as to provide stored power to both loads 3-1 and 3-2. The temporary energy-storage and power conditioning unit 208 can support both loads long enough until the failed power supplies 201a and 202a are serviced or their lost input voltages from facility AC1, AC1' are restored.

Figure 16:
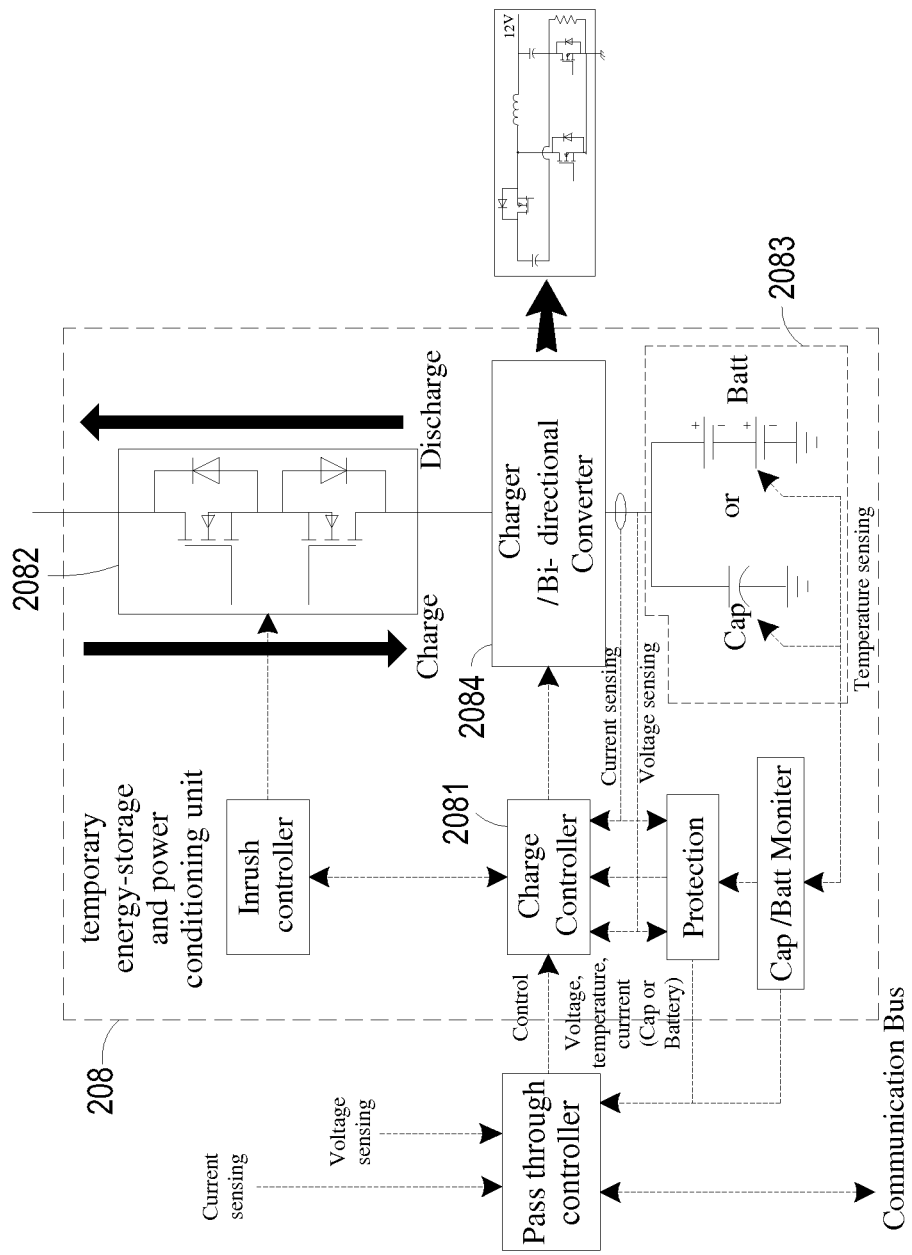
FIG. 16 shows a circuit block diagram of the temporary energy-storage and power conditioning circuit of FIGS. 14A and 14B.

The basic theorems of using the temporary energy-storage and power conditioning unit of FIGS. 14A and 14B to optimize operating efficiency of the power modules 201, 202 are briefly described hereinafter. FIG. 16 shows a circuit block diagram of the temporary energy-storage and power conditioning unit of FIGS. 14A and 14B. The temporary energy-storage and power conditioning unit includes, but not limited to, a charge controller 2081, a bi-directional switch circuit 2082, an energy-storage device 2083 and a charger/bi-directional converter 2084. The charger controller 2081 is coupled to the pass-through controller and/or the power system control unit and communicated with the pass-through controller and/or the power system control unit. The bi-directional switch circuit 2082 is coupled to the charge controller 2081 and the charging and discharging directions of the bi-directional switch circuit 2081 is controlled by the charger controller 2081. The temporary energy-storage and power conditioning unit 208 of FIGS. 14A and 14B only operates at light loads, i.e., below a certain level of load power. Above this power level up to the full load, the temporary energy-storage and power conditioning unit 208 is turned off so that at these power levels the entire load power is continuously supplied from the output of the power supply 201a, as illustrated by the power flow diagram in FIG. 17B. As can be seen from FIG. 17B, when the power supply 201a is normal, the power source is normally provided to the power supply 201a and the load 3-1 and/or 3-2 is operated at heavy loads, the both charging power $P_{CHR}$ and discharging power $P_{DIS}$ are continuously zero, whereas output power of the power supply $P_O$ is equal to load power $P_{LOAD}$.

Figure 17A:
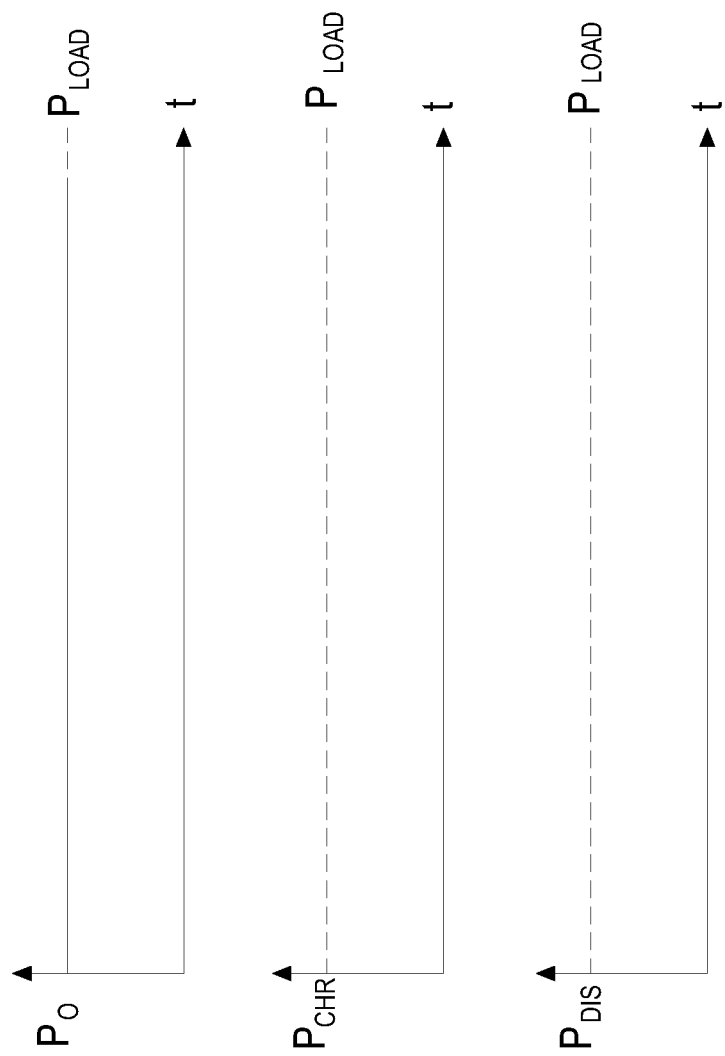
FIG. 17A shows the power flow timing diagram of the preferred embodiment in FIGS. 14A, 14B and 16 at heavy loads, wherein $P_O$ is output power, $P_{CHR}$ is charging power, and $P_{DIS}$ is discharging power.
Figure 17B:
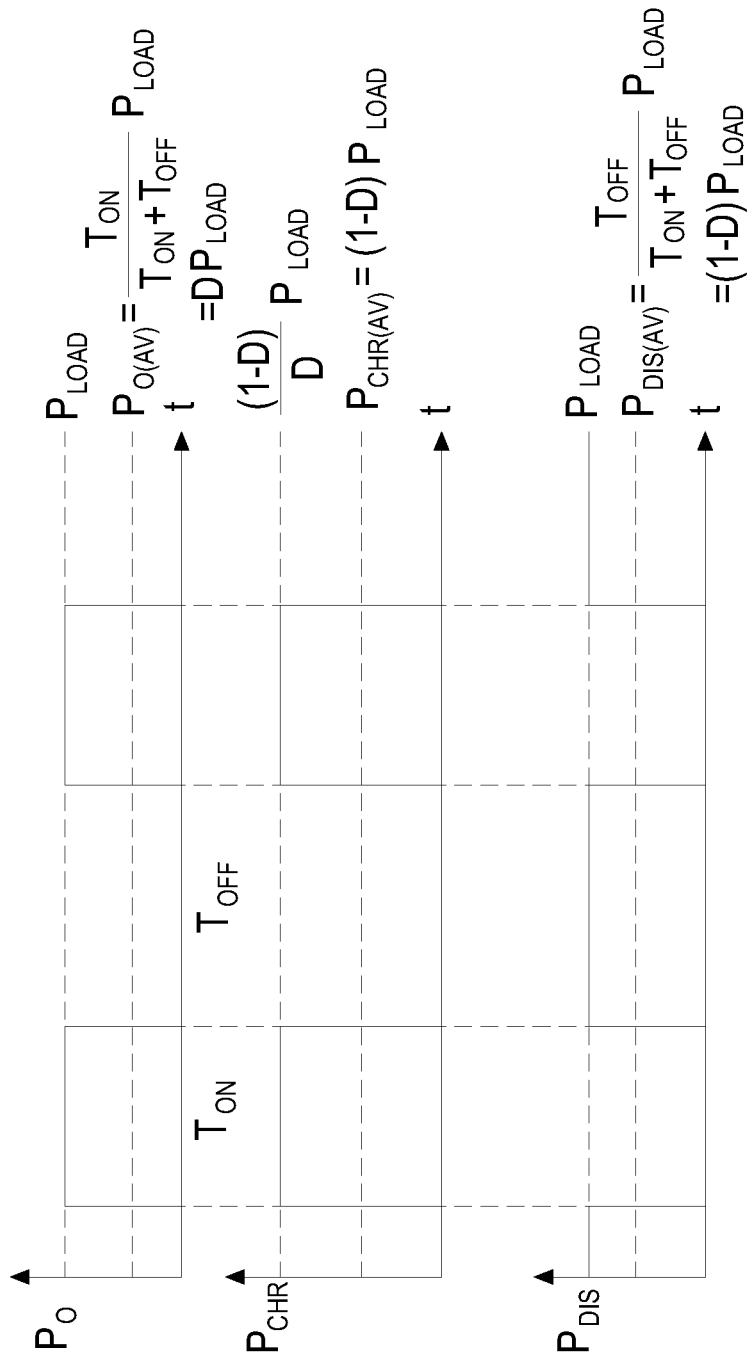
FIG. 17B shows the power flow timing diagram of the preferred embodiment in FIGS. 14A, 14B and 16 at light loads, wherein $P_O$ is output power, $P_{CHR}$ is charging power, and $P_{DIS}$ is discharging power.

When the power supply 201a is normal, the power source is normally provided to the power supply 201a and the load 3-1 and/or 3-2 is operated at light loads, the converter of the power supply 201a is periodically turned on and off to reduce switching losses and, thus, improve the light-load efficiency. During the periods the converter of the power supply 201a is off, the load power is supplied from the energy-storage device of the temporary energy-storage and power conditioning unit 208. As can be seen from the power flow timing diagram in FIG. 17C, during periods the converter of the power supply 201a is on, the power supply 201a simultaneously supplies load power $P_{LOAD}$ and charging power $P_{CHR}$ of the energy-storage device, whereas during off-times the load power is entirely supported by the discharging of the energy-storage device. Since in this mode of operation the load power is either supplied by the power supply output or by the stored energy, the instantaneous power delivered by the power supply 201a during on time $T_{ON}$ is $P_O=P_{LOAD}$ and the instantaneous power delivered from the energy-storage device during off time $T_{OFF}$ is $P_{DIS}=P_{LOAD}$. Defining duty cycle D as $D=T_{ON}/(T_{ON}+T_{OFF})$, average power delivered by the power supply output is $P_{O(AV)}=DP_{LOAD}$, whereas the average power discharged from the energy-storage device is $P_{DIS(AV)}=(1-D)P_{LOAD}$. Since average charging power $P_{CHR(AV)}$ must be equal to average discharging power $P_{DIS(AV)}$, the average charging power is $P_{CHR(AV)}=(1-D)P_{LOAD}$. As a result, the instantaneous charging power $P_{CHR}$ during on time $T_{ON}$ is $P_{CHR}=(1-D)P_{LOAD}/D$, as illustrated in FIG. 17B. Therefore, total instantaneous power P delivered by the power supply during on time is $$P = P_O + P_{CHR} = P_{LOAD} + \frac{1-D}{D}P_{LOAD} = \frac{P_{LOAD}}{D}, \tag{1}$$

i.e., $$P_{LOAD} = D \cdot P. \tag{2}$$

Figure 17C:
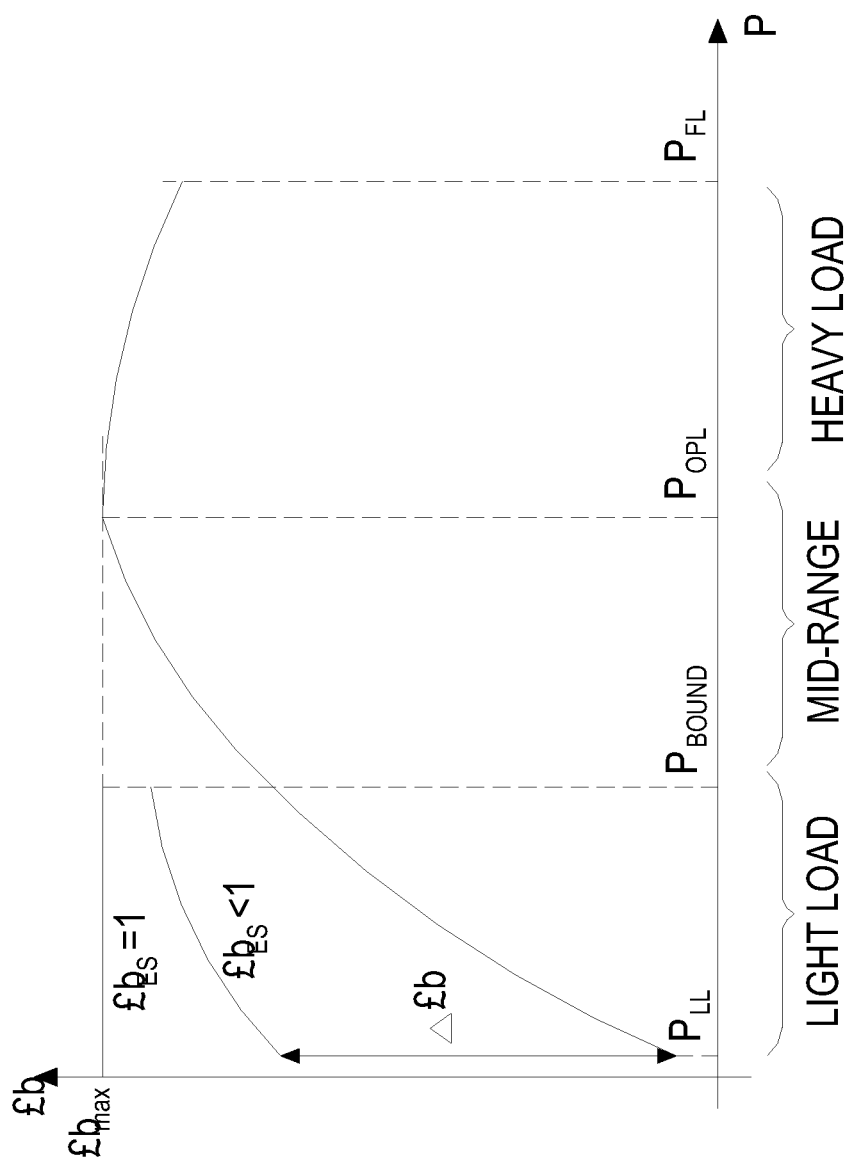
FIG. 17C shows typical efficiency profile of the converter of the power supply with respect to delivered power.

It should be noted that boundary load power between continuous and pulse operation of the power supply $P_{BOUND}$ can be set at any arbitrary level. However, to optimize the performance, the control of the converter of the power supply should be designed so that instantaneous power P delivered by the power supply 201a during on time is selected at the maximum efficiency point. As illustrated in FIG. 17C, a typical converter efficiency dependence on output power exhibits a peak at mid-range power levels. By selecting $P=P_{OPT}$, i.e., by always operating the converter of the power supply at the power level with maximum efficiency the light-load efficiency below the set level of $P_{BOUND}$ ($<P_{OPT}$) is maximized. With such a control, duty cycle D is determined by $$D = \frac{P_{LOAD}}{P_{OPT}}, P_{LOAD} \leq P_{BOUND} \leq P_{OPT}. \tag{3}$$

By assuming that the energy-storage device charging and discharging efficiencies are $\eta_{CHR}$ and $\eta_{DIS}$, respectively, the conversion efficiency at power levels below $P_{BOUND}$ is given by $$\eta = \frac{\eta_{MAX}}{D + \frac{1-D}{\eta_{CHR} \cdot \eta_{DIS}}} = \frac{\eta_{MAX}}{D + \frac{1-D}{\eta_{ES}}}, \quad (4)$$

where $\eta_{ES}=\eta_{CHR}\eta_{DIS}$ is the efficiency of the total power process by the temporary energy-storage and power conditioning unit 208.

In the ideal case when no energy is lost during the charging and discharging of the energy-storage device, i.e., when $\eta_{ES}=1$ is assumed, light-load efficiency η is equal to $\eta_{MAX}$ all the way to a minimum load, as illustrated in FIG. 17C. However, in practice, because $\eta_{ES}<1$ the light-load efficiency is lower than $\eta_{MAX}$ and exhibits a fall-off as power is reduced, as shown in FIG. 17C. Generally, to achieve light-load efficiency improvement Δη, it is necessary to make a favorable trade-off between the power saved by periodically turning-off the converter of the power supply 201A and the power lost in the charging and discharging process of the energy-storage device. By solving Eq. (4) for $\eta_{ES}$, minimum efficiency $\eta_{ES\ (MIN)}$ required to improve efficiency at load power $P_{LL}$ is $$\eta_{ES(MIN)} > \frac{(1-D)}{\frac{\eta_{OPT}}{\eta_{LL}} - D}, \quad (5)$$

where $\eta_{LL}$ is the original efficiency of the power converter at $P_{LL}$ and $D=P_{LL}/P_{OPT}$.

It should be noted that while duty cycle D is precisely defined by Eq. (3) once power level $P_{OPT}$ is set and load power $P_{LOAD}<P_{BOUND}$ is known, the frequency at which the power converter is turned on and off is less well defined. Generally, the upper frequency limit is related to the large signal dynamic response time of the converter, whereas the lower frequency limit is determined by the size and required energy-storage capacity of the energy-storage device because more stored energy is required at lower frequencies to support the load power during prolonged off time. For power levels of several hundred Watts, typical minimum frequency for electrolytic-capacitor-type energy storage is in the several Hertz to several hundred of Hertz range, whereas sub-hertz frequencies can be achieved by employing batteries, flywheels, and similar storage devices. Finally, it should be noted that it is desirable to keep the switching frequency bellow the audio range to avoid acoustic noise associated with the switching of a relatively large power.

FIGS. 14A and 14B schematically illustrate a power management system capable of saving power and optimizing operating efficiency of power supplies for providing power to plural loads using Power Supply Redundancy according to a preferred embodiment of the present invention. In this embodiment, one of the first pass-through unit 203a and the second pass-through unit 203b use a temporary energy-storage and power conditioning unit 208, which can be named as holdover unit. When the temporary energy-storage and power conditioning unit 208 is disposed in the pass-through unit 203a, the temporary energy-storage and power conditioning unit 208 in the pass-through unit 203a can be employed to enhance the power efficiency of power supply 201a and the power efficiency of power supply 202a when pass-through unit 203a and pass-through unit 203b are coupled together. Similarly, when the temporary energy-storage and power conditioning unit 208 is disposed in the pass-through unit 203b, the temporary energy-storage and power conditioning unit 208 in the pass-through unit 203b can be employed to enhance the power efficiency of power supply 202a and the power efficiency of power supply 201a when pass-through unit 203b and pass-through unit 203a are coupled together.

Figure 18A:
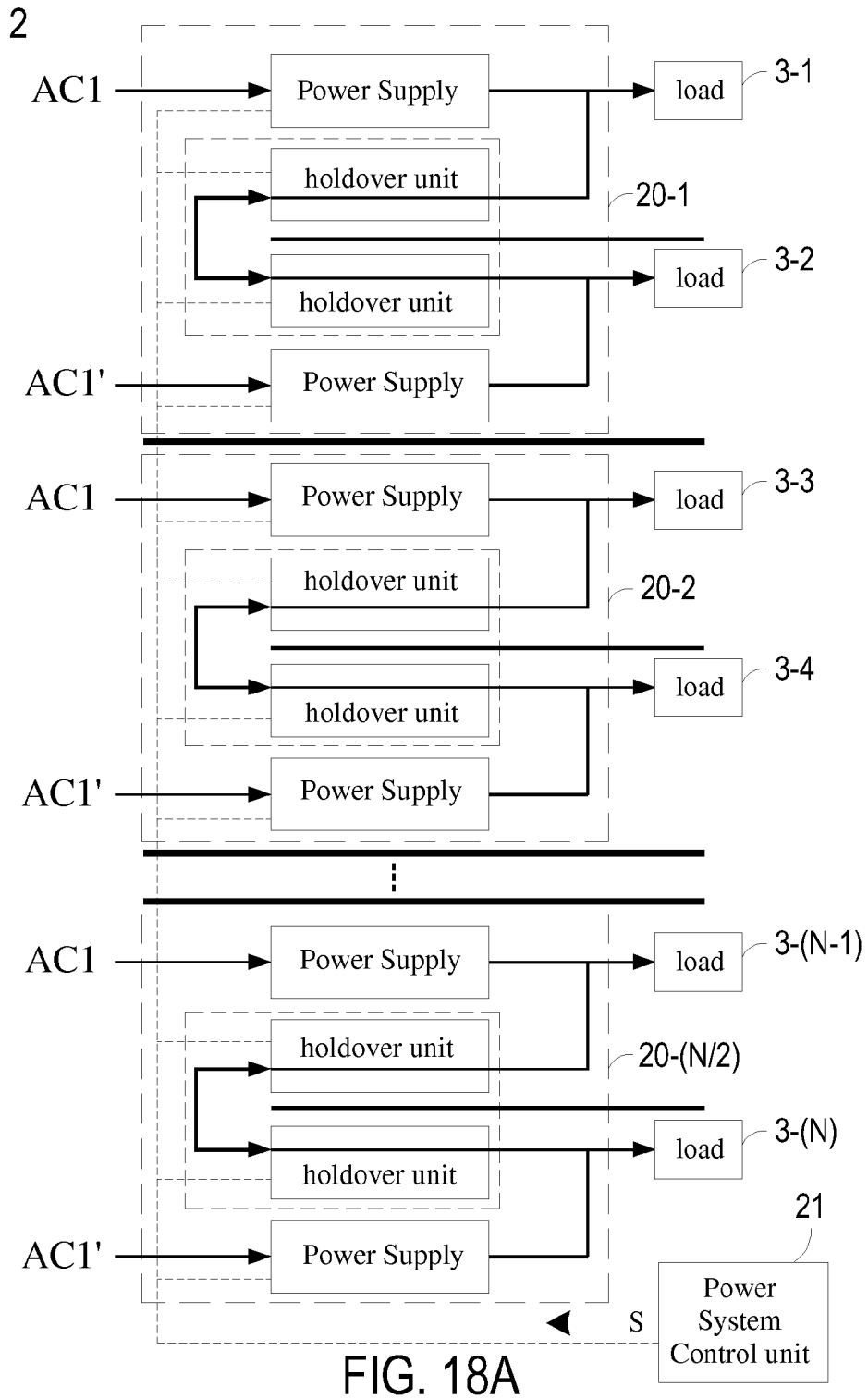
FIGS. 18A and 18B show the power management system of FIG. 15C employed as a basic cell to form a power network as similarly with the power network of FIGS. 8A and 8B.
Figure 18B:
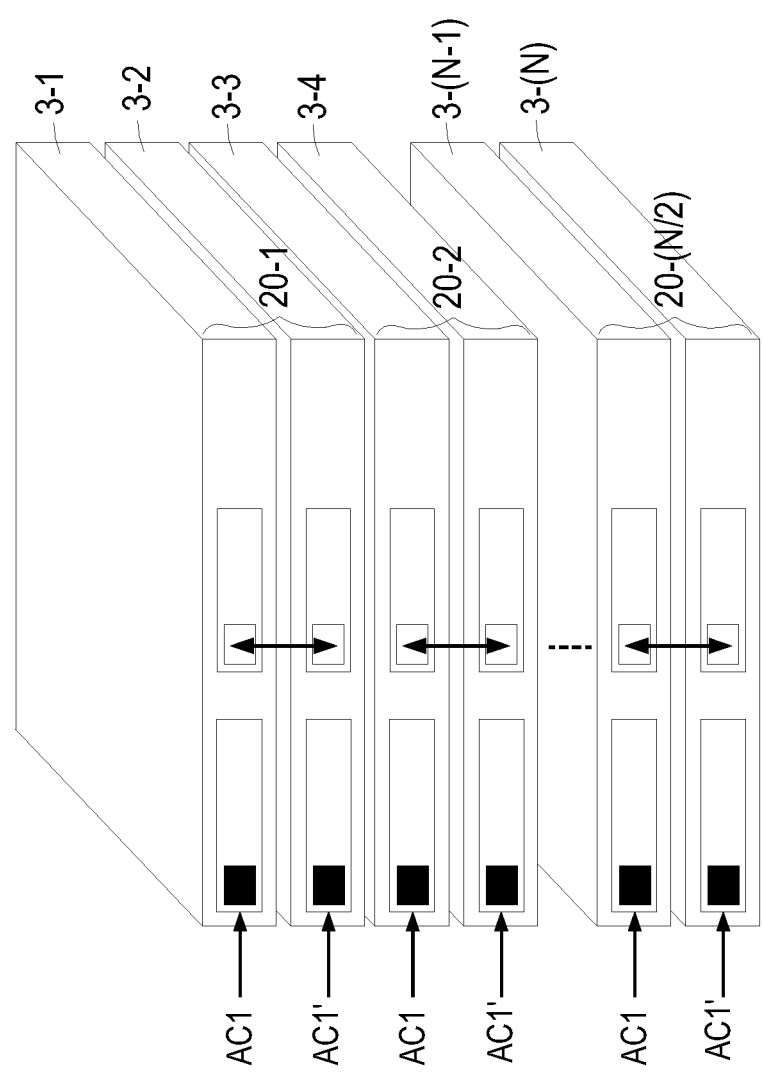

Similarly, many variations and applications of the embodiment of FIGS. 14A and 14B are possible. Some examples of these variations are shown in FIGS. 18A and 18B. As shown in FIGS. 18A and 18B, the power management system 2 of FIG. 15C can be employed as a basic cell to form a power network as similarly with the power network of FIGS. 8A and 8B. The operations, functions and structures are similar to the descriptions hereinbefore, and aren't redundantly described herein.

Figure 19A:
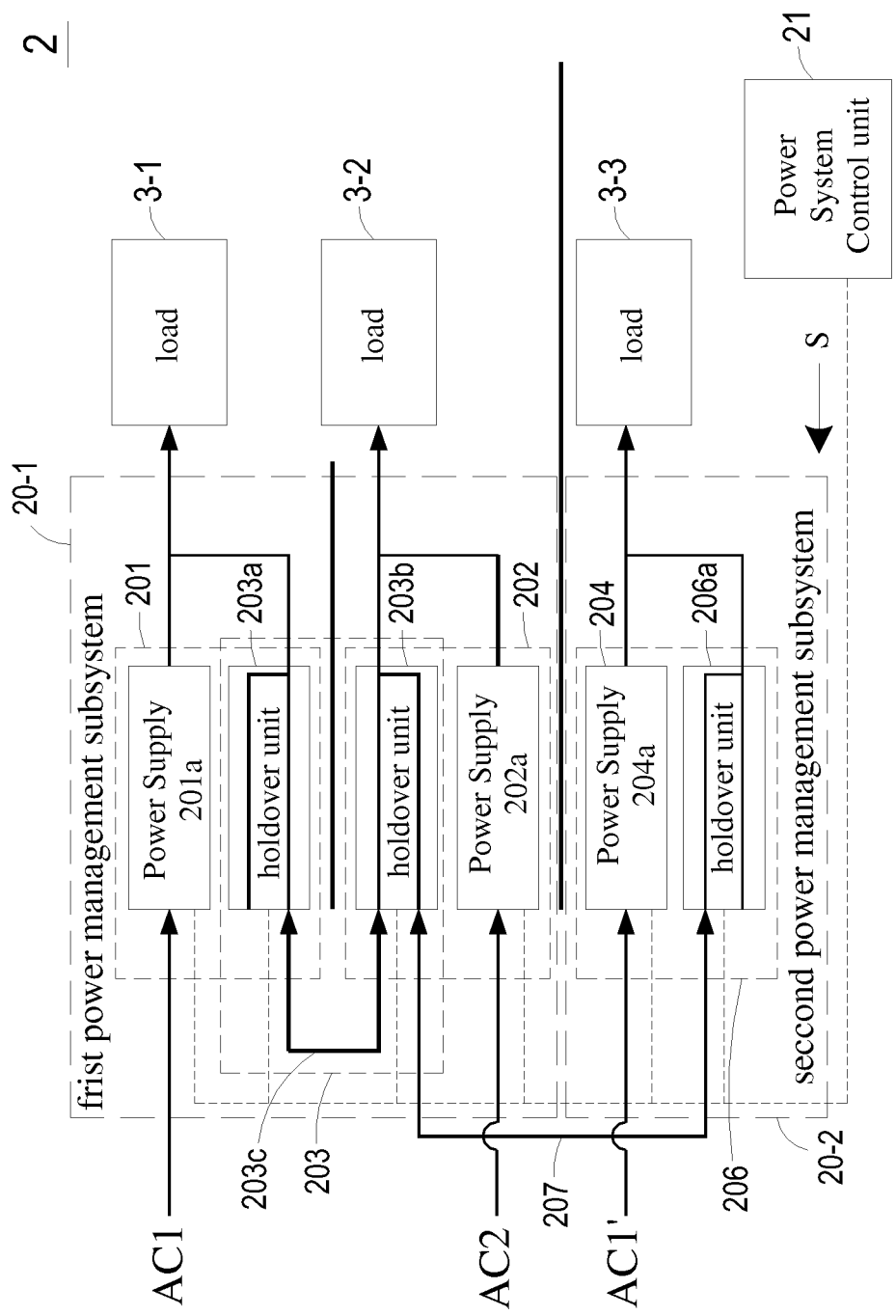
FIGS. 19A and 19B show the power management system of FIG. 15C employed as a first power management subsystem and the assembly of power supply 204a and pass-through unit 206a with holdover function employed as a second power management subsystem so as to form a power network as similarly with the power network of FIGS. 9A and 9B.
Figure 19B:
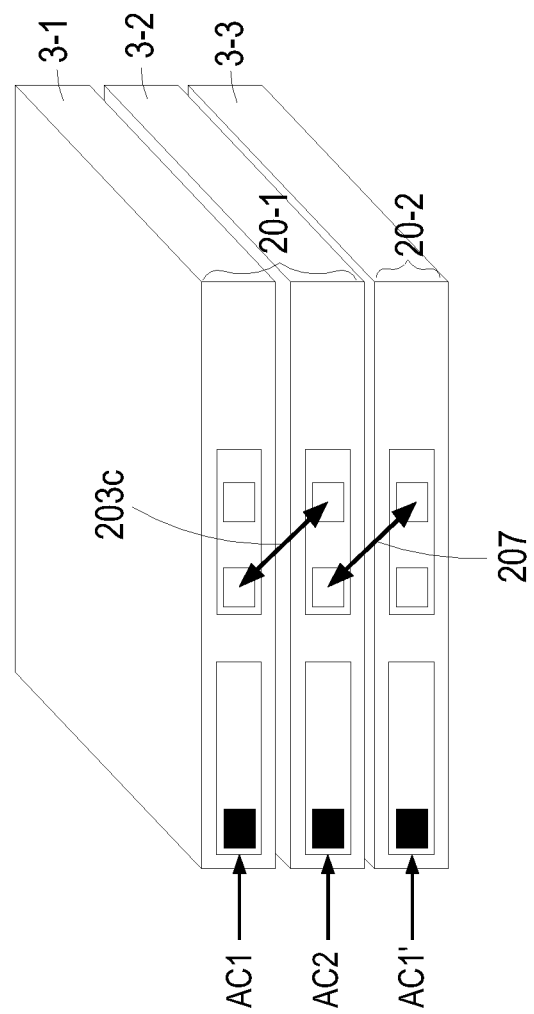

Similarly, many variations and applications of the embodiment of FIGS. 14A and 14B are possible. Some examples of these variations are shown in FIGS. 19A and 19B. As shown in FIGS. 19A and 19B, the power management system 2 of FIG. 15C can be employed as a first power management subsystem 20-1 and the assembly of power supply 204a and pass-through unit 206a with holdover function (i.e. holdover unit) can be employed as a second power management subsystem 20-2 so as to form a power network as similarly with the power network of FIGS. 9A and 9C9. The operations, functions and structures are similar to the descriptions hereinbefore, and aren't redundantly described herein.

Figure 20A:
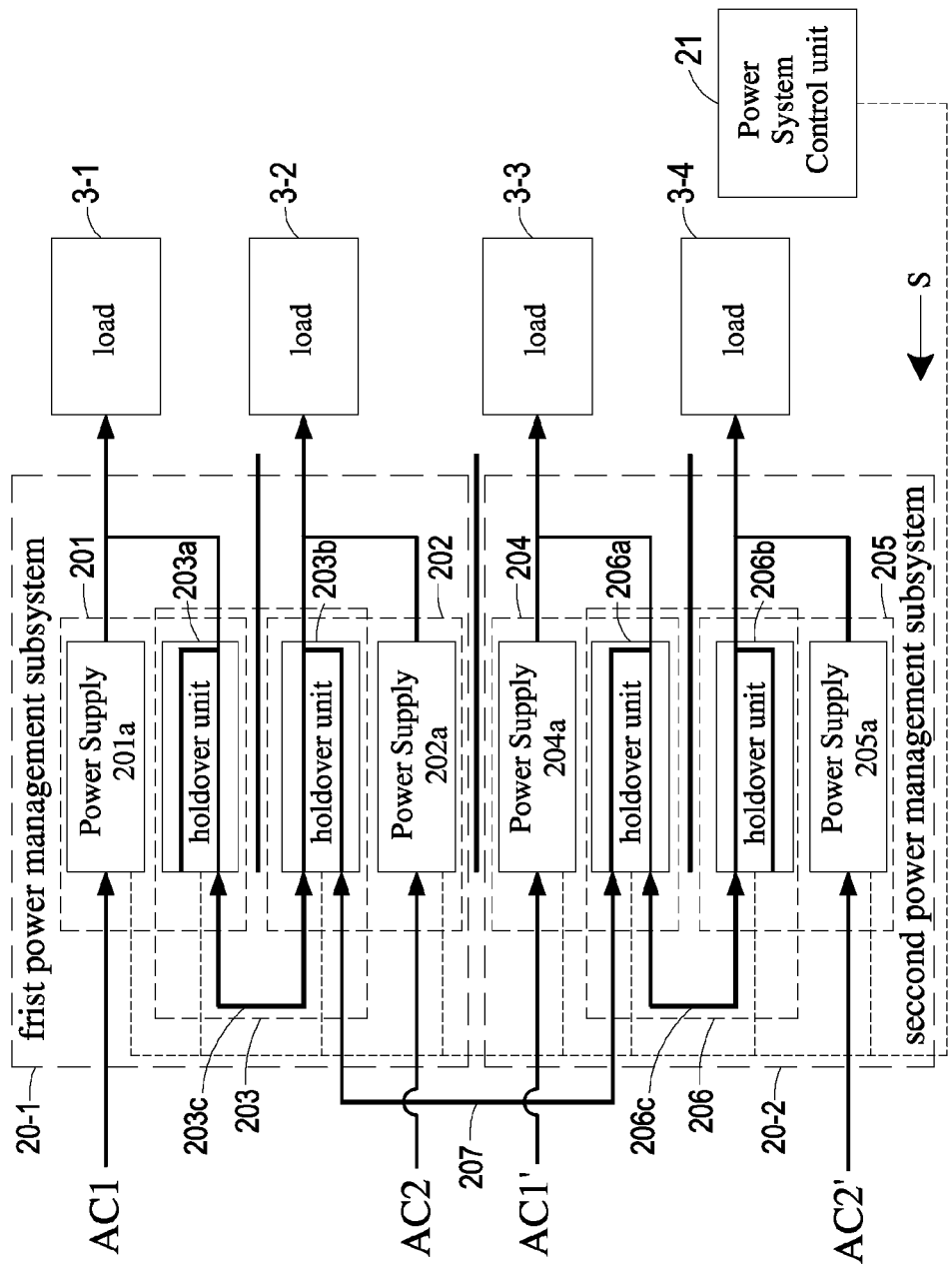
FIGS. 20A and 20B show the power management system of FIG. 15C employed as a first power management subsystem and another power management system of FIG. 15C employed as a second power management subsystem so as to form a power network as similarly with the power network of FIGS. 10A and 10B.
Figure 20B:
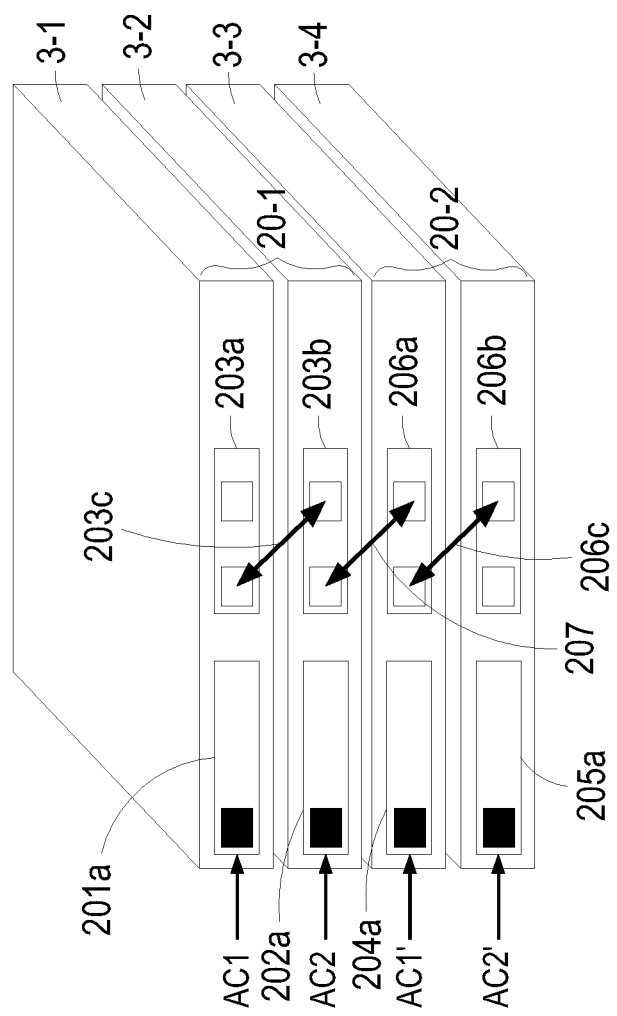

Similarly, many variations and applications of the embodiment of FIGS. 14A and 14B are possible. Some examples of these variations are shown in FIGS. 20A and 20B. As shown in FIGS. 20A and 20B, the power management subsystem of FIG. 15C can be employed as a first power management subsystem 20-1 and another power management subsystem of FIG. 15C can be employed as a second power management subsystem 20-2 so as to form a power network as similarly with the power network of FIGS. 10A and 10C. The operations, functions and structures are similar to the descriptions hereinbefore, and aren't redundantly described herein.

Figure 21A:
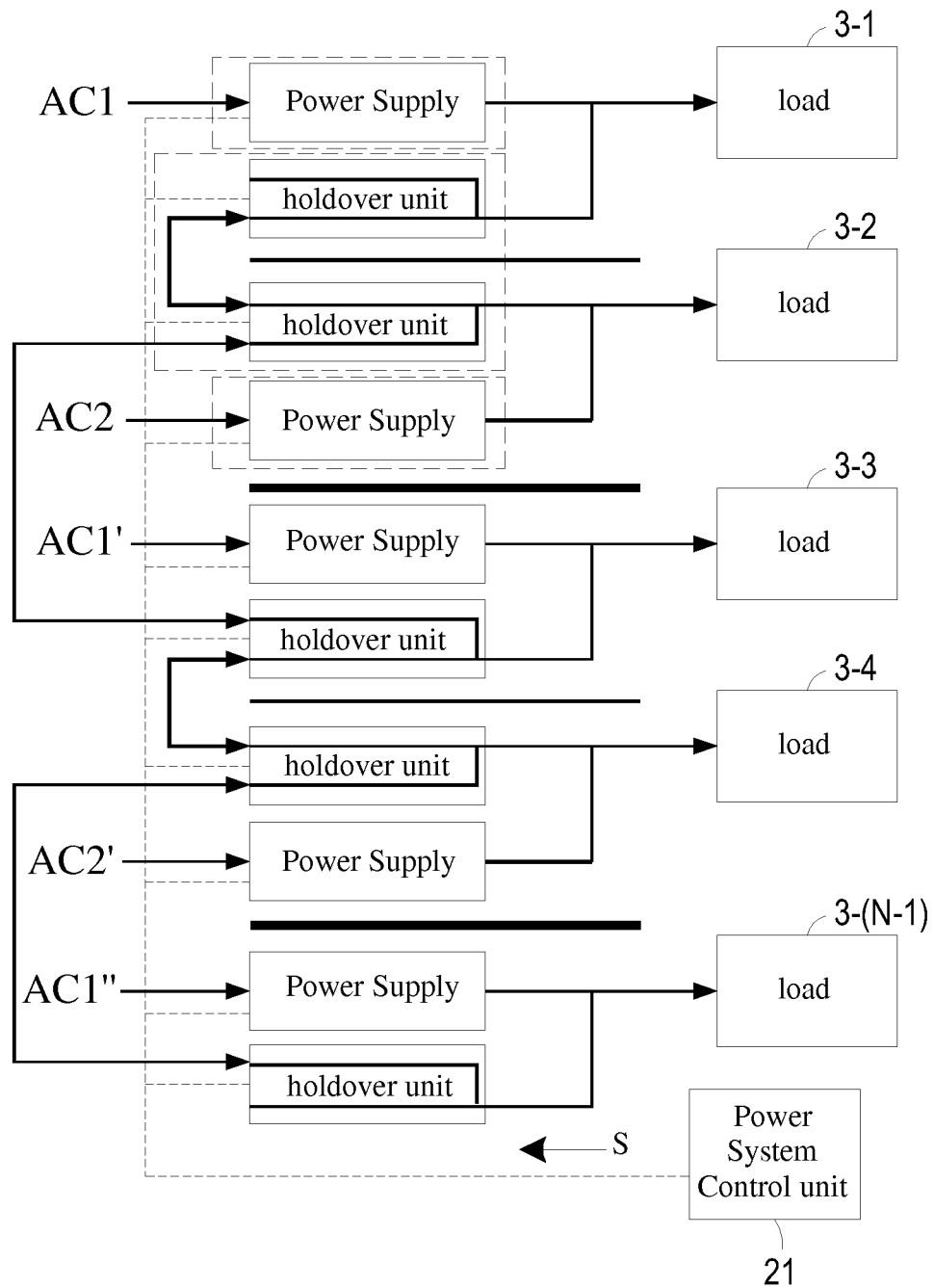
FIGS. 21A and 21B show network power sharing arrangement with the power management subsystems of FIGS. 11A and 11B according to the present invention.
Figure 21B:
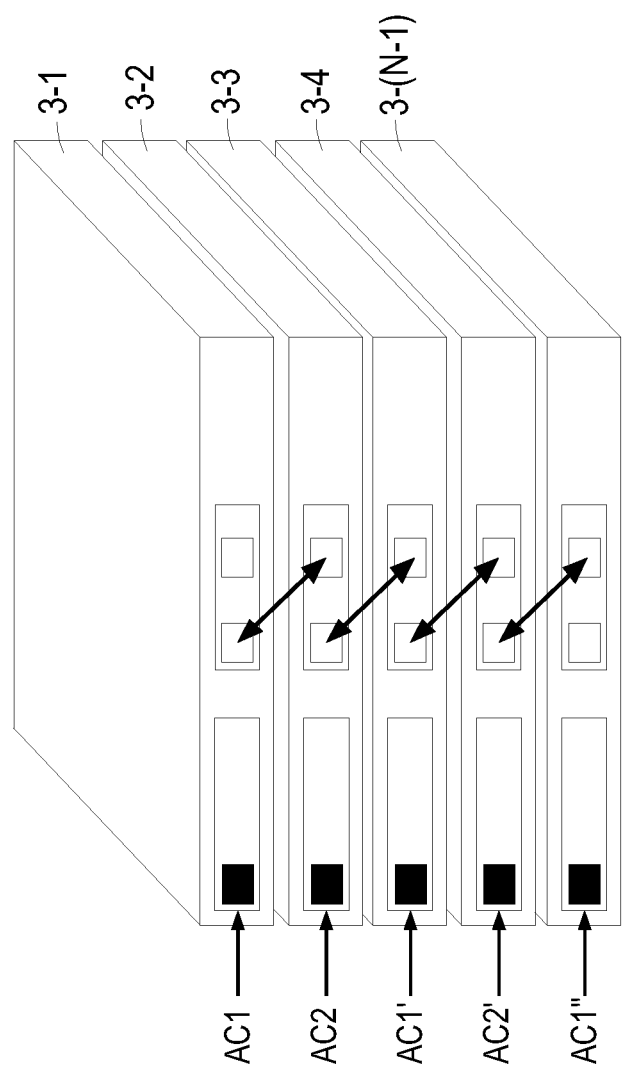

FIGS. 21A and 21B show network power sharing arrangement with the power management subsystems of FIGS. 19A and 19B according to the present invention. The operations, functions and structures of the power management subsystem are similar to that of FIGS. 11A and 11B, and aren't redundantly described herein.

Figure 22A:
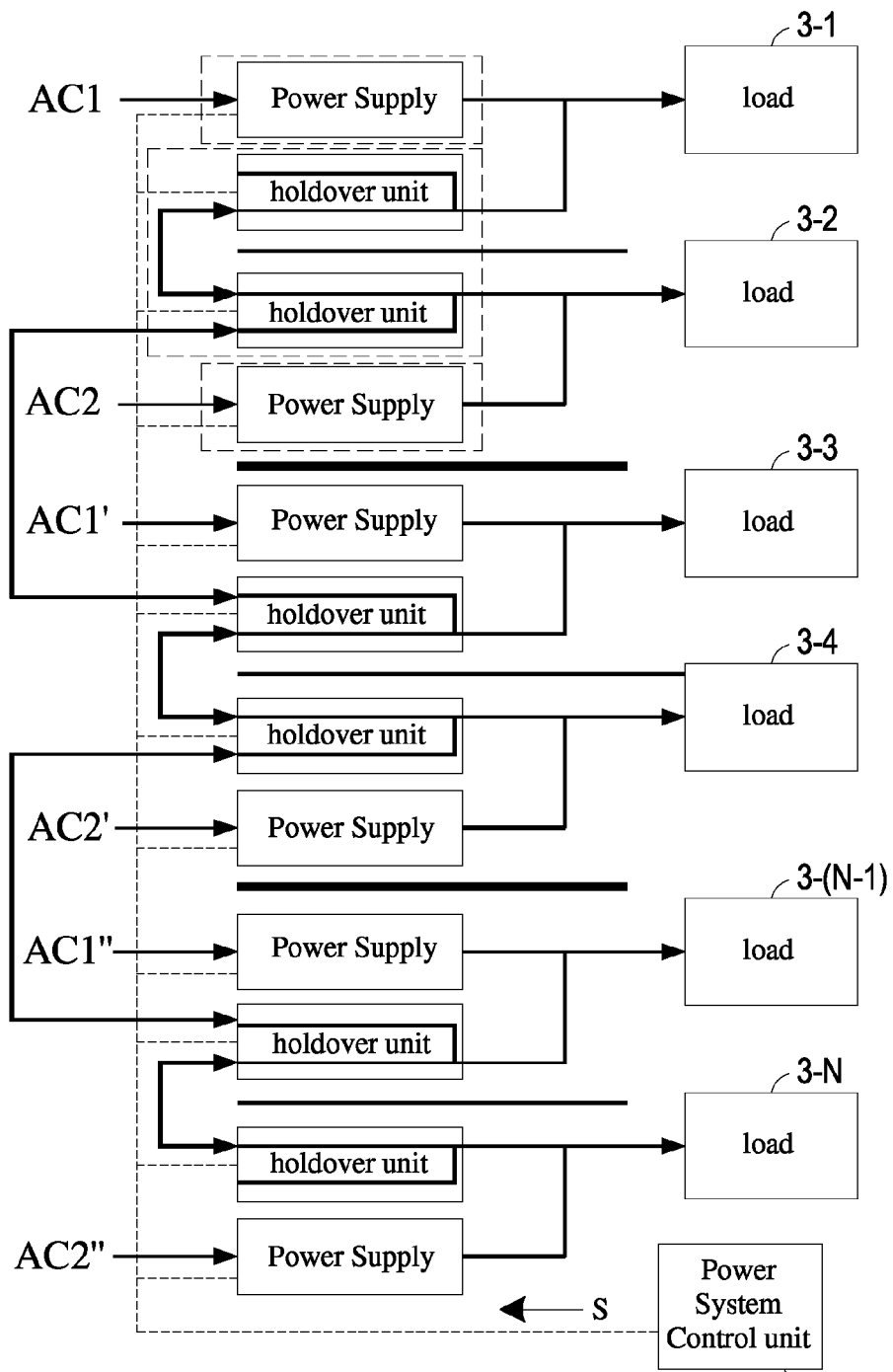
FIGS. 22A and 22B show network power sharing arrangement with the power management subsystems of FIGS. 12A and 12B according to the present invention.
Figure 22B:
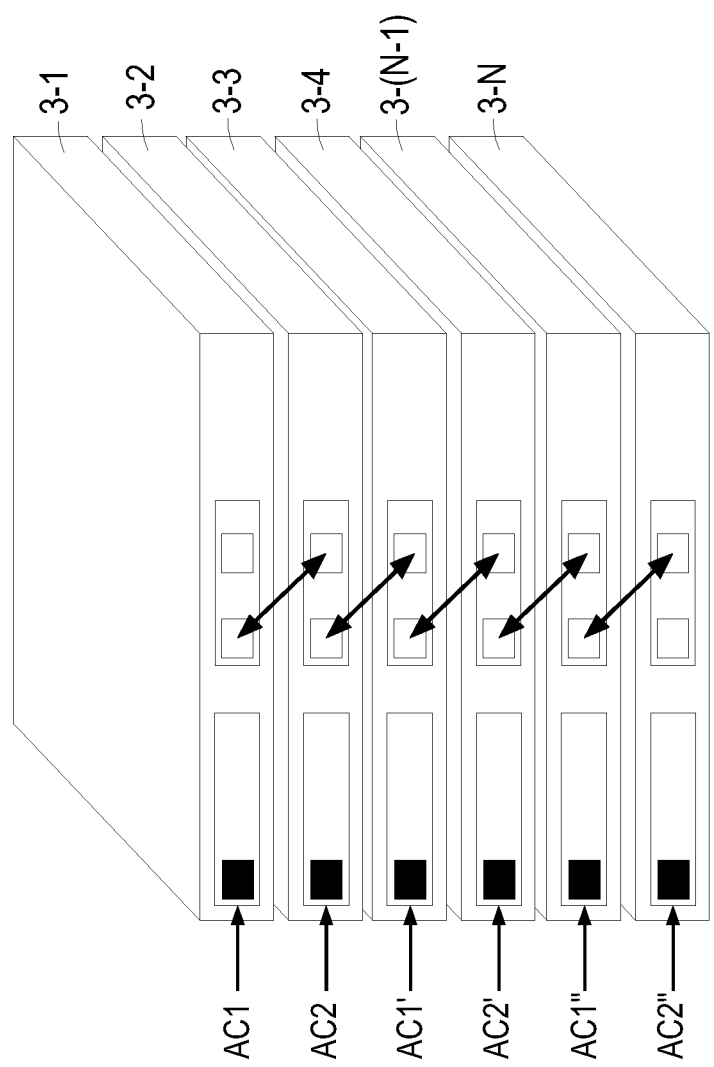

FIGS. 22A and 22B show network power sharing arrangement with the power management subsystems of FIGS. 20A and 20B according to the present invention. The operations, functions and structures of the power management subsystem are similar to that of FIGS. 12A and 12B, and aren't redundantly described herein.

The pass-through unit employed in the embodiments of the present invention can further comprise, but not limited to, the functions and circuits of Bi-directional Inrush Protection, Short-circuit Protection and/or Current Measurement. In addition, the holdover unit (i.e. the combination of pass-through unit and the temporary energy-storage and power conditioning unit) employed in the embodiments of the present invention can further comprise, but not limited to, the functions and circuits of efficiency optimization, output voltage back-up, bi-directional Inrush Protection, short-circuit protection and current Measurement.

The power management system of the present invention is capable of saving power and optimizing operating efficiency of power supplies for providing power with back-up or redundancy to plural loads, such as servers and computer systems. In addition, the power management system of the present invention is capable of distributing power delivered from plurality of power supplies to plural loads so as to provide reliability and save cost. The power management method of the present invention can combine server loads, create a power sharing network, and bring their combined loads from the typical less than 25% into the more efficient load range of for example 50%.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power management system, comprising:
   a power management subsystem comprising two power modules and a pass-through module, each said power module comprising a plurality of power supplies, said pass-through module electrically coupled between two output terminals of said two power modules for providing a uni-directional or bi-directional conducting path in response to a control signal; and
   a power system control unit coupled to said pass-through module for providing said control signal to said pass-through module and controlling said pass-through module to be turned on and turned off, and controlling power delivery directions of said pass-through module so as to condition an output of any said power module to enhance efficiency of any said power module by said pass-through module, and enhance power efficiency of said power management subsystem;
   wherein said pass-through module comprises at least one pass-through unit, and said pass-through unit is retractably installed in said corresponding power module to replace with said at least one power supply.

2. The power management system according to claim 1 wherein said pass-through module comprises two pass-through units.

3. The power management system according to claim 2 wherein each of said two pass-through units comprises a first connecting terminal and a second connecting terminal, said first connecting terminals of said two pass-through units being coupled to said two output terminals of said two power modules, respectively, and said second connecting terminals of said two pass-through units being coupled together.

4. The power management system according to claim 2 wherein each said pass-through unit comprises a pass-through controller coupled to said power system control unit for receiving said control signal from said power system control unit and controlling said pass-through unit to be turned on and turned off, and controlling power delivery directions of said pass-through unit according to said control signal.

5. The power management system according to claim 4 wherein each said pass-through unit further comprises a bi-directional switch circuit coupled to said pass-through controller and being turned on and turned off by said pass-through controller to switch power delivery directions of said pass-through unit.

6. The power management system according to claim 2 wherein each said power module comprises a casing comprising plural receptacles.

7. The power management system according to claim 6 wherein said at least one power supply of each said power module is hot-swappable in one of said receptacles, and each said pass-through unit is hot-swappable in one of said receptacles.

8. The power management system according to claim 1 wherein said power system control unit is coupled to said two power modules for controlling the operations of said two power modules.

9. The power management system according to claim 1 wherein each of said two power modules is coupled to a corresponding load for supplying power to said corresponding load.

10. A power management system, comprising:
    a first power management subsystem, said first power management subsystem comprising two power modules and a first pass-through module, each said power modules comprising a plurality of power supplies, said first pass-through module electrically coupled between two output terminals of said two power modules for providing a uni-directional or bi-directional conducting path in response to a control signal;
    a second power management subsystem, said second power management subsystem comprising at least one power module and a second pass-through module, each said power module comprising a plurality of power supplies, said second pass-through module electrically coupled to said power module and said first pass-through module of said first power management subsystem for providing a uni-directional or bi-directional conducting path in response to said control signal; and
    a power system control unit coupled to said first and second pass-through modules of said first and second power management subsystems for providing said control signal to said first and second pass-through modules and controlling said first and second pass-through modules to be turned on and turned off and power delivery directions of said first and second pass-through modules so as to enhance power efficiency of said power management system;
    wherein said first pass-through module comprises at least one pass-through unit, and said pass-through unit is retractably installed in said corresponding power module to replace with at least one of said plurality of power supplies.

11. The power management system according to claim 10 wherein said first pass-through module comprises two pass-through units, and said second pass-through module comprises one pass-through unit.

12. The power management system according to claim 11 wherein each said pass-through unit of said first and second pass-through modules comprises a first connecting terminal, a second connecting terminal and a third connecting terminal, said first connecting terminals of said two pass-through units of said first pass-through module being coupled to said two output terminals of said two power modules of said first power management subsystem, respectively, and said second connecting terminals of said two pass-through units of said first pass-through module being coupled together.

13. The power management system according to claim 12 wherein one of said third connecting terminals of said first pass-through module is electrically coupled to said third connecting terminal of said second pass-through module for providing a uni-directional or bi-directional conducting path between said first and second power management subsystems in response to said control signal.

14. The power management system according to claim 10 wherein said first pass-through module comprises two pass-through units, and said second power management subsystem comprises two power modules and said second pass-through module comprises two pass-through units.

15. The power management system according to claim 14 wherein each said pass-through unit of said first and second pass-through modules comprises a first connecting terminal, a second connecting terminal and a third connecting terminal, said first connecting terminals of said two pass-through units of said first pass-through module being coupled to said two output terminals of said two power modules of said first power management subsystem, respectively, and said second connecting terminals of said two pass-through units of said first pass-through module being coupled together.

16. The power management system according to claim 15 wherein said first connecting terminals of said two pass-through units of said second pass-through module is coupled to said two output terminals of said two power modules of said second power management subsystem, respectively, and said second connecting terminals of said two pass-through units of said second pass-through module is coupled together.

17. The power management system according to claim 16 wherein one of said third connecting terminals of said first pass-through module is electrically coupled to one of said third connecting terminals of said second pass-through module for providing a uni-directional or bi-directional conducting path between said first and second power management subsystems in response to said control signal.

18. A power management system, comprising:
a plurality of loads;
a plurality of power modules, each said power module comprising a plurality of power supplies and coupled to one of said loads for providing power to said load; and
a pass-through module comprising at least one pass-through unit, said pass-through unit selectively connecting said power module to at least one of the others of said loads for allowing said power module to supply power to said at least one of the other loads and conditioning the output of said power module to provide desired efficiency of said power module;
wherein said pass-through unit is retractably installed in one of said power modules to replace with said at least one power supply.

* * * * *